US007447647B1

(12) United States Patent
Shedlack

(10) Patent No.: US 7,447,647 B1
(45) Date of Patent: Nov. 4, 2008

(54) TECHNIQUES AND DEFINITION LOGIC EMBODIED IN A COMPUTER PROGRAM PRODUCT STORED AND PERFORMED ON A COMPUTERIZED DEVICE FOR PROVIDING A SINGULAR GRAPHICAL USER INTERFACE CONFIGURED TO ENABLE A USER TO CREATE/MANAGE/TRANSACT/REPORT AND VIEW ALL FULL GRANULAR REFERENCE PRODUCT DATA IN A CONFIGURABLE TRANSACTABLE AGGREGATE FORM

(76) Inventor: David G. Shedlack, 1 Mount Pleasant Pl., Rockport, MA (US) 01966

( * ) Notice: Subject to any disclaimer, the term of this patent is extended or adjusted under 35 U.S.C. 154(b) by 694 days.

(21) Appl. No.: 11/120,102

(22) Filed: May 2, 2005

(51) Int. Cl.
*G06Q 30/00* (2006.01)
*G06F 17/30* (2006.01)
*G07F 7/00* (2006.01)

(52) U.S. Cl. ........................................... 705/26; 705/27

(58) Field of Classification Search .................. 705/26, 705/27
See application file for complete search history.

(56) References Cited

U.S. PATENT DOCUMENTS

| | | | | |
|---|---|---|---|---|
| 6,407,761 | B1 | 6/2002 | Ching et al. | 715/835 |
| 6,820,077 | B2 | 11/2004 | Godfredsen et al. | 707/3 |
| 6,853,996 | B1 * | 2/2005 | Chen et al. | 707/10 |
| 7,003,560 | B1 | 2/2006 | Mullen et al. | 709/223 |
| 7,007,029 | B1 | 2/2006 | Chen | 707/100 |
| 7,054,880 | B2 | 5/2006 | Vishik et al. | 707/102 |
| 2008/0126221 | A1 * | 5/2008 | Swanson | 705/26 |

OTHER PUBLICATIONS

Ferriolo, Micro Warehouse finds model system in Datasource, Oct. 2003, Catalog Age, New Canaan, vol. 20, Iss. 11; p. 15 http://proquest.umi.com/pqdweb?did=424927351&sid=8&Fmt=4&clientId=19649&RQT=309&VName=PQD.*

* cited by examiner

*Primary Examiner*—Jeffrey A. Smith
*Assistant Examiner*—Mila Airapetian
(74) *Attorney, Agent, or Firm*—BainwoodHuang

(57) ABSTRACT

A technique for managing product data uses a graphical user interface which enables product data entry in a manner that drastically reduces data entry time, and which enables visual presentation of product data in a manner that alleviates the need for users to scroll through lines detailing specific product characteristics permutations. Rather, the graphical user interface enables users to view product data in aggregate form regardless of differences in particular characteristics from one permutation to another. For example, the graphical user interface enables a clothing distributor to view consolidated shirt data regardless of differences in style, sleeve length, collar size, etc.

26 Claims, 48 Drawing Sheets

Uniform Pant

3*AttV* x 3*AttV* x 4*AttV*
{IN AttF1} {In AttF2} {In AttF3}
=
36 Transactional FGR#'s

138

101

| 114 | 102 | 104 | 106 | 378 |
|---|---|---|---|---|
| ***iB #*** | *Attribute Family 1* ***Color*** *{3AttV}* | *Attribute Family 2* ***Waist*** *{3AttV}* | *Attribute Family 3* ***Inseam*** *{4AttV}* | ***System Generated FGR#*** |
| B-AUP-339841 | 1 Blue | 1 30 | 1 Short | BAUP339841-1/1/1 |
| B-AUP-339841 | 1 Blue | 1 30 | 2 Regular | BAUP339841-1/2/2 |
| B-AUP-339841 | 1 Blue | 1 30 | 3 Long | BAUP339841-1/1/3 |
| B-AUP-339841 | 1 Blue | 1 30 | 4 X-long | BAUP339841-1/1/4 |
| B-AUP-339841 | 1 Blue | 2 32 | 1 Short | BAUP339841-1/2/1 |
| B-AUP-339841 | 1 Blue | 2 32 | 2 Regular | BAUP339841-1/2/2 |
| B-AUP-339841 | 1 Blue | 2 32 | 3 Long | BAUP339841-1/2/3 |
| B-AUP-339841 | 1 Blue | 2 32 | 4 X-long | BAUP339841-1/2/4 ← 378-1 |
| B-AUP-339841 | 1 Blue | 3 34 | 1 Short | BAUP339841-1/3/1 |
| B-AUP-339841 | 1 Blue | 3 34 | 2 Regular | BAUP339841-1/3/2 |
| B-AUP-339841 | 1 Blue | 3 34 | 3 Long | BAUP339841-1/3/3 |
| B-AUP-339841 | 1 Blue | 3 34 | 4 X-long | BAUP339841-1/3/4 |
| B-AUP-339841 | 2 Red | 1 30 | 1 Short | BAUP339841-2/1/1 |
| B-AUP-339841 | 2 Red | 1 30 | 2 Regular | BAUP339841-2/1/2 |
| B-AUP-339841 | 2 Red | 1 30 | 3 Long | BAUP339841-2/1/3 |
| B-AUP-339841 | 2 Red | 1 30 | 4 X-long | BAUP339841-2/1/4 |
| B-AUP-339841 | 2 Red | 2 32 | 1 Short | BAUP339841-2/2/1 |
| B-AUP-339841 | 2 Red | 2 32 | 2 Regular | BAUP339841-2/2/2 |
| B-AUP-339841 | 2 Red | 2 32 | 3 Long | BAUP339841-2/2/3 |
| B-AUP-339841 | 2 Red | 2 32 | 4 X-long | BAUP339841-2/2/4 |
| B-AUP-339841 | 2 Red | 3 34 | 1 Short | BAUP339841-2/3/1 |
| B-AUP-339841 | 2 Red | 3 34 | 2 Regular | BAUP339841-2/3/2 |
| B-AUP-339841 | 2 Red | 3 34 | 3 Long | BAUP339841-2/3/3 |
| B-AUP-339841 | 2 Red | 3 34 | 4 X-long | BAUP339841-2/3/4 |
| B-AUP-339841 | 3 Tan | 1 30 | 1 Short | BAUP339841-3/1/1 |
| B-AUP-339841 | 3 Tan | 1 30 | 2 Regular | BAUP339841-3/1/2 |
| B-AUP-339841 | 3 Tan | 1 30 | 3 Long | BAUP339841-3/1/3 |
| B-AUP-339841 | 3 Tan | 1 30 | 4 X-long | BAUP339841-3/1/4 |
| B-AUP-339841 | 3 Tan | 2 32 | 1 Short | BAUP339841-3/2/1 |
| B-AUP-339841 | 3 Tan | 2 32 | 2 Regular | BAUP339841-3/2/2 |
| B-AUP-339841 | 3 Tan | 2 32 | 3 Long | BAUP339841-3/2/3 |
| B-AUP-339841 | 3 Tan | 2 32 | 4 X-long | BAUP339841-3/2/4 |
| B-AUP-339841 | 3 Tan | 3 34 | 1 Short | BAUP339841-3/3/1 |
| B-AUP-339841 | 3 Tan | 3 34 | 2 Regular | BAUP339841-3/3/2 |
| B-AUP-339841 | 3 Tan | 3 34 | 3 Long | BAUP339841-3/3/3 |
| B-AUP-339841 | 3 Tan | 3 34 | 4 X-long | BAUP339841-3/3/4 |

140

Plus 2 Non-Transactional FGR#'s

*No AttV Selection - #BAUP339841-0/0/0*
*All AttV Selection - #BAUP339841-00/00/00*

| | | | | |
|---|---|---|---|---|
| B-AUP-339841 | 0 None | 0 None | 0 None | BAUP339841-0/0/0 |
| B-AUP-339841 | 00 All | 00 All | 00 All | BAUP339841-00/00/00 |

Fig. 2

BASIC *type iBASKET (iB)* - DATA ELEMENT STRUCTURE

*(for BASIC type enterprise PRODUCTS)*

DIVERSE PACKAGE *type iBASKET (iB)* - DATA ELEMENT STRUCTURE
(for DIVERSE PACKAGE *type enterprise* PRODUCTS)

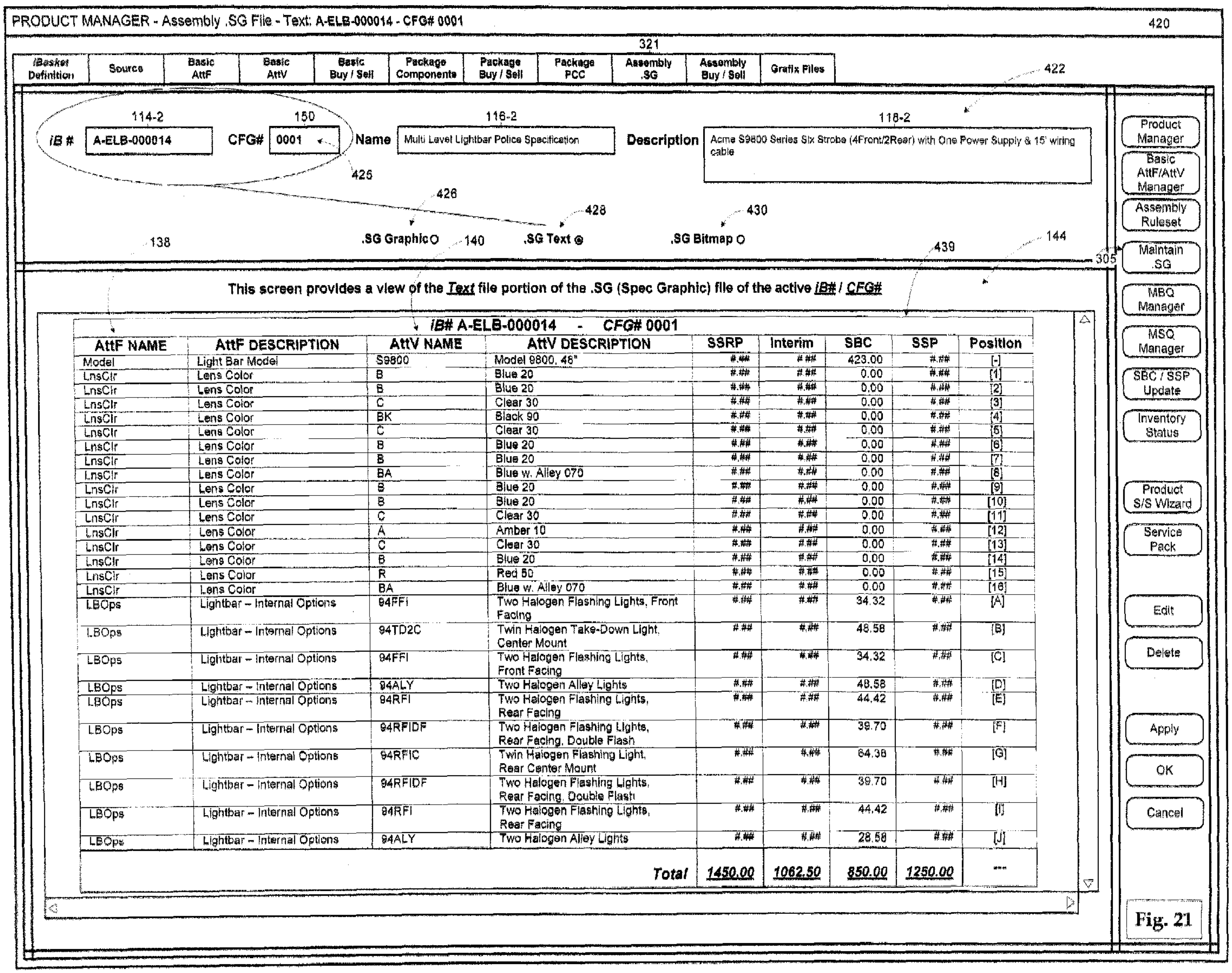

| AttF NAME | AttF DESCRIPTION | AttV NAME | AttV DESCRIPTION | SSRP | Interim | SBC | SSP | Position |
|---|---|---|---|---|---|---|---|---|
| Model | Light Bar Model | S9800 | Model 9800, 48" | #.## | #.## | 423.00 | #.## | [-] |
| LnsClr | Lens Color | B | Blue 20 | #.## | #.## | 0.00 | #.## | [1] |
| LnsClr | Lens Color | B | Blue 20 | #.## | #.## | 0.00 | #.## | [2] |
| LnsClr | Lens Color | C | Clear 30 | #.## | #.## | 0.00 | #.## | [3] |
| LnsClr | Lens Color | BK | Black 90 | #.## | #.## | 0.00 | #.## | [4] |
| LnsClr | Lens Color | C | Clear 30 | #.## | #.## | 0.00 | #.## | [5] |
| LnsClr | Lens Color | B | Blue 20 | #.## | #.## | 0.00 | #.## | [6] |
| LnsClr | Lens Color | B | Blue 20 | #.## | #.## | 0.00 | #.## | [7] |
| LnsClr | Lens Color | BA | Blue w. Alley 070 | #.## | #.## | 0.00 | #.## | [8] |
| LnsClr | Lens Color | B | Blue 20 | #.## | #.## | 0.00 | #.## | [9] |
| LnsClr | Lens Color | B | Blue 20 | #.## | #.## | 0.00 | #.## | [10] |
| LnsClr | Lens Color | C | Clear 30 | #.## | #.## | 0.00 | #.## | [11] |
| LnsClr | Lens Color | A | Amber 10 | #.## | #.## | 0.00 | #.## | [12] |
| LnsClr | Lens Color | C | Clear 30 | #.## | #.## | 0.00 | #.## | [13] |
| LnsClr | Lens Color | B | Blue 20 | #.## | #.## | 0.00 | #.## | [14] |
| LnsClr | Lens Color | R | Red 50 | #.## | #.## | 0.00 | #.## | [15] |
| LnsClr | Lens Color | BA | Blue w. Alley 070 | #.## | #.## | 0.00 | #.## | [16] |
| LBOps | Lightbar – Internal Options | 94FFI | Two Halogen Flashing Lights, Front Facing | #.## | #.## | 34.32 | #.## | [A] |
| LBOps | Lightbar – Internal Options | 94TD2C | Twin Halogen Take-Down Light, Center Mount | #.## | #.## | 48.58 | #.## | [B] |
| LBOps | Lightbar – Internal Options | 94FFI | Two Halogen Flashing Lights, Front Facing | #.## | #.## | 34.32 | #.## | [C] |
| LBOps | Lightbar – Internal Options | 94ALY | Two Halogen Alley Lights | #.## | #.## | 48.58 | #.## | [D] |
| LBOps | Lightbar – Internal Options | 94RFI | Two Halogen Flashing Lights, Rear Facing | #.## | #.## | 44.42 | #.## | [E] |
| LBOps | Lightbar – Internal Options | 94RFIDF | Two Halogen Flashing Lights, Rear Facing, Double Flash | #.## | #.## | 39.70 | #.## | [F] |
| LBOps | Lightbar – Internal Options | 94RFIC | Twin Halogen Flashing Light, Rear Center Mount | #.## | #.## | 64.38 | #.## | [G] |
| LBOps | Lightbar – Internal Options | 94RFIDF | Two Halogen Flashing Lights, Rear Facing, Double Flash | #.## | #.## | 39.70 | #.## | [H] |
| LBOps | Lightbar – Internal Options | 94RFI | Two Halogen Flashing Lights, Rear Facing | #.## | #.## | 44.42 | #.## | [I] |
| LBOps | Lightbar – Internal Options | 94ALY | Two Halogen Alley Lights | #.## | #.## | 28.58 | #.## | [J] |
| | | | Total | 1450.00 | 1062.50 | 850.00 | 1250.00 | --- |

Fig. 21

This screen provides an example of the Transactional Attachment &/or Output of the .SG (Spec Graphic) file of an active *iB# / CFG#*

560

142

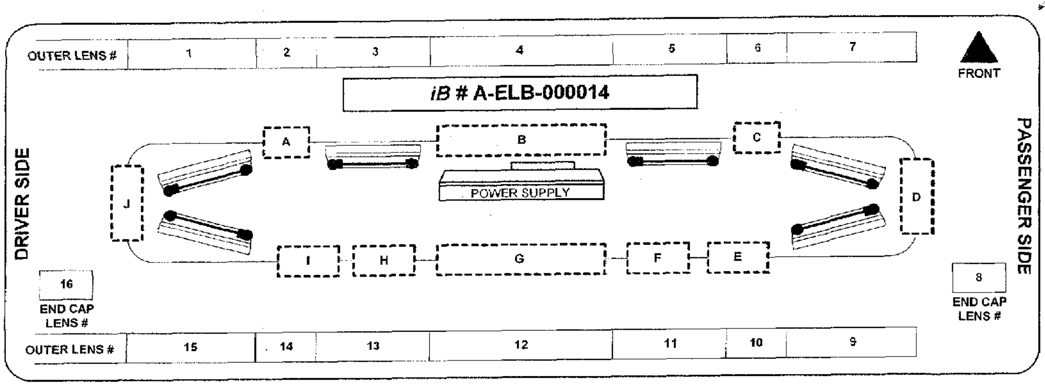

144

| *iB#* A-ELB-000014 - *CFG#* 0001 | | | | | |
|---|---|---|---|---|---|
| AttF NAME | AttF DESCRIPTION | AttV NAME | AttV DESCRIPTION | Cost | .SG Position |
| Model | Light Bar Model | S9800 | Model 9800, 48" | 423.00 | [-] |
| LnsClr | Lens Color | B | Blue 20 | 0.00 | [1] |
| LnsClr | Lens Color | B | Blue 20 | 0.00 | [2] |
| LnsClr | Lens Color | C | Clear 30 | 0.00 | [3] |
| LnsClr | Lens Color | BK | Black 90 | 0.00 | [4] |
| LnsClr | Lens Color | C | Clear 30 | 0.00 | [5] |
| LnsClr | Lens Color | B | Blue 20 | 0.00 | [6] |
| LnsClr | Lens Color | B | Blue 20 | 0.00 | [7] |
| LnsClr | Lens Color | BA | Blue w. Alley 070 | 0.00 | [8] |
| LnsClr | Lens Color | B | Blue 20 | 0.00 | [9] |
| LnsClr | Lens Color | B | Blue 20 | 0.00 | [10] |
| LnsClr | Lens Color | C | Clear 30 | 0.00 | [11] |
| LnsClr | Lens Color | A | Amber 10 | 0.00 | [12] |
| LnsClr | Lens Color | C | Clear 30 | 0.00 | [13] |
| LnsClr | Lens Color | B | Blue 20 | 0.00 | [14] |
| LnsClr | Lens Color | R | Red 50 | 0.00 | [15] |
| LnsClr | Lens Color | BA | Blue w. Alley 070 | 0.00 | [16] |
| LBOps | Lightbar – Internal Options | 94FFI | Two Halogen Flashing Lights, Front Facing | 34.32 | [A] |
| LBOps | Lightbar – Internal Options | 94TD2C | Twin Halogen Take-Down Light, Center Mount | 48.58 | [B] |
| LBOps | Lightbar – Internal Options | 94FFI | Two Halogen Flashing Lights, Front Facing | 34.32 | [C] |
| LBOps | Lightbar – Internal Options | 94ALY | Two Halogen Alley Lights | 48.58 | [D] |
| LBOps | Lightbar – Internal Options | 94RFI | Two Halogen Flashing Lights, Rear Facing | 44.42 | [E] |
| LBOps | Lightbar – Internal Options | 94RFIDF | Two Halogen Flashing Lights, Rear Facing, Double Flash | 39.70 | [F] |
| LBOps | Lightbar – Internal Options | 94RFIC | Twin Halogen Flashing Light, Rear Center Mount | 64.38 | [G] |
| LBOps | Lightbar – Internal Options | 94RFIDF | Two Halogen Flashing Lights, Rear Facing, Double Flash | 39.70 | [H] |
| LBOps | Lightbar – Internal Options | 94RFI | Two Halogen Flashing Lights, Rear Facing | 44.42 | [I] |
| LBOps | Lightbar – Internal Options | 94ALY | Two Halogen Alley Lights | 28.58 | [J] |
| | | | ***Total*** | ***850.00*** | |

Fig. 32

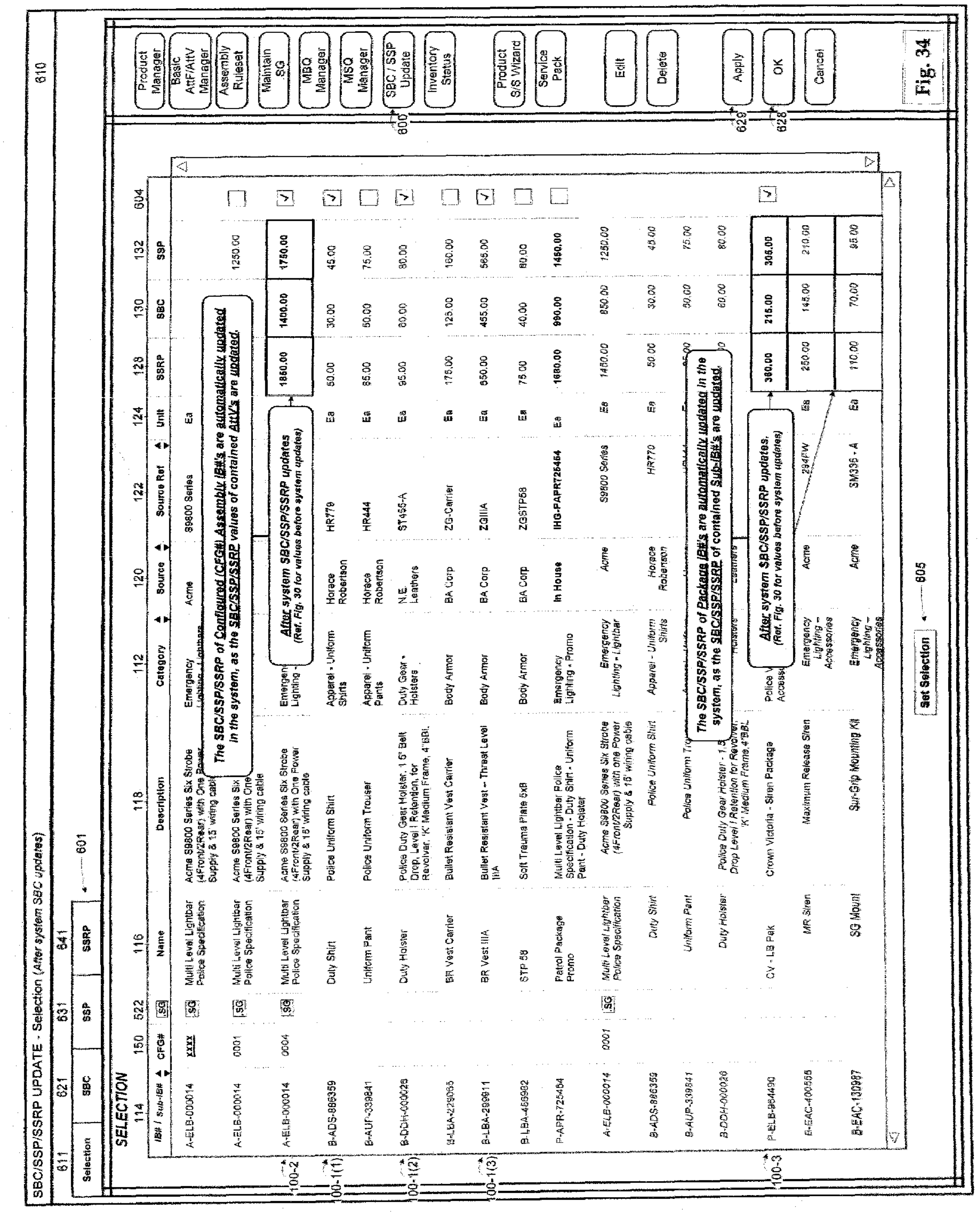

SBC/SSP/SSRP UPDATE - Selection (After system SBC updates)
Selection
SBC
SSP
SSRP
SELECTION
Product Manager
Basic AttF/AttV Manager
Assembly Ruleset
Maintain SG
MBQ Manager
MSQ Manager
SBC / SSP Update
Inventory Status
Product S/S Wizard
Service Pack
Edit
Delete
Apply
OK
Cancel
Set Selection
The SBC/SSP/SSRP of Configured (CFG#) Assembly IB#'s are automatically updated in the system, as the SBC/SSP/SSRP values of contained AttV's are updated.
After system SBC/SSP/SSRP updates (Ref. Fig. 30 for values before system updates)
The SBC/SSP/SSRP of Package IB#'s are automatically updated in the system, as the SBC/SSP/SSRP of contained Sub-IB#'s are updated.
After system SBC/SSP/SSRP updates. (Ref. Fig. 30 for values before system updates)
Fig. 34

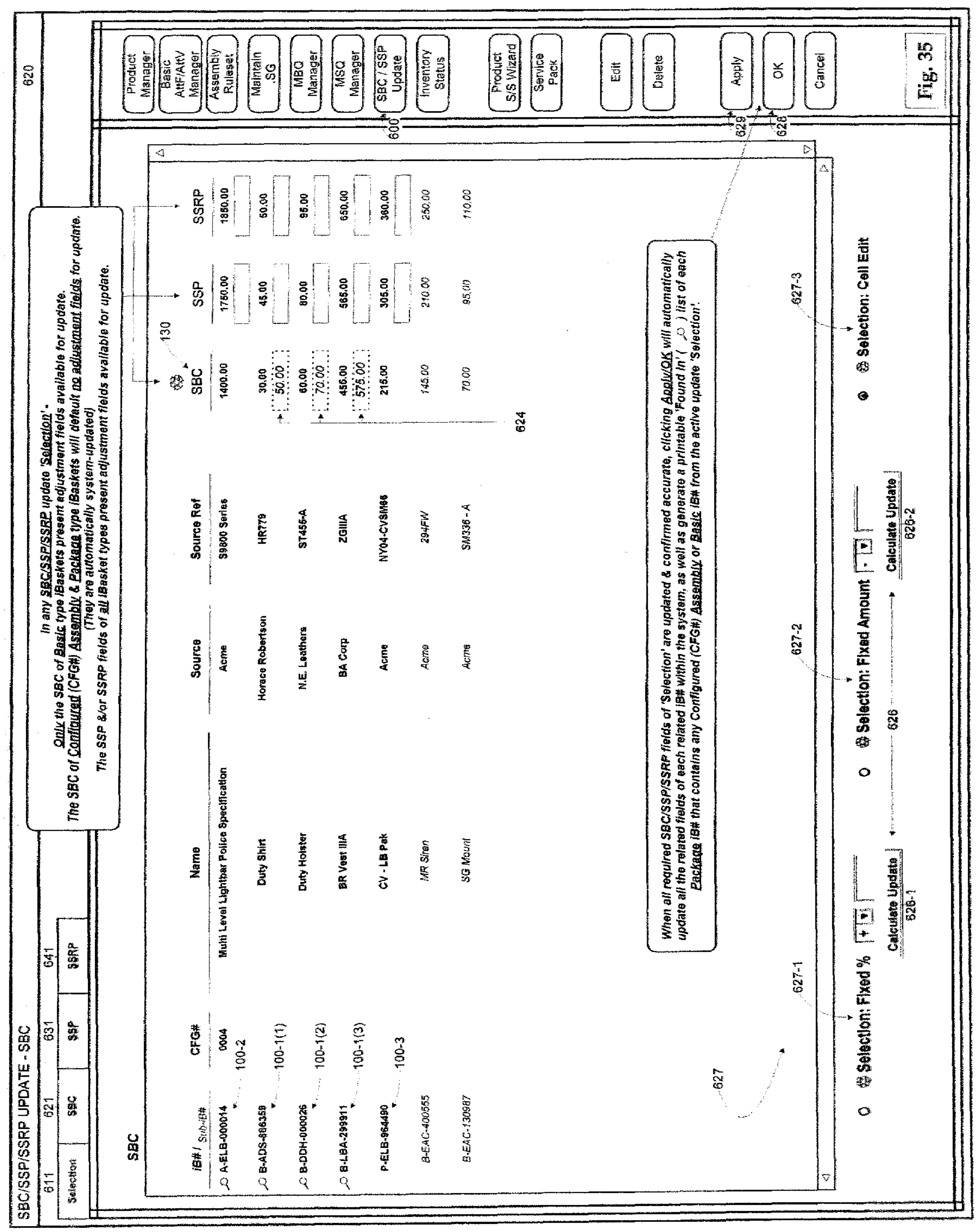
SBC/SSP/SSRP UPDATE - SBC
620
611
621
631
641
Selection
SBC
SSP
SSRP
In any SBC/SSP/SSRP update 'Selection' -
Only the SBC of Basic type IBaskets present adjustment fields available for update.
The SBC of Configured (CFG#) Assembly & Package type IBaskets will default no adjustment fields for update.
(They are automatically system-updated)
The SSP &/or SSRP fields of all IBasket types present adjustment fields available for update.
Product Manager
Basic AttF/AttV Manager
Assembly Ruleset
Maintain SG
MBQ Manager
MSQ Manager
SBC / SSP Update
Inventory Status
Product S/S Wizard
Service Pack
Edit
Delete
Apply
OK
Cancel
600
629
628
130
SBC
IB# / Sub-IB#
CFG#
Name
Source
Source Ref
SBC
SSP
SSRP
A-ELB-000014
0004
Multi Level Lightbar Police Specification
Acme
S9800 Series
1400.00
1750.00
1850.00
100-2
B-ADS-886359
Duty Shirt
Horace Robertson
HR779
30.00
50.00
45.00
50.00
100-1(1)
B-DDH-000026
Duty Holster
N.E. Leathers
ST455-A
60.00
70.00
80.00
95.00
100-1(2)
B-LBA-299911
BR Vest IIIA
BA Corp
ZGIIIA
456.00
575.00
565.00
650.00
100-1(3)
P-ELB-964490
CV - LB Pak
Acme
NY04-CVSM86
215.00
305.00
360.00
100-3
B-EAC-400555
MR Siren
Acme
294FW
145.00
210.00
250.00
B-EAC-130987
SG Mount
Acme
SM336 - A
70.00
95.00
110.00
624
When all required SBC/SSP/SSRP fields of 'Selection' are updated & confirmed accurate, clicking Apply/OK will automatically update all the related fields of each related IB# within the system, as well as generate a printable 'Found In' list of each Package IB# that contains any Configured (CFG#) Assembly or Basic IB# from the active update 'Selection'.
627
627-1
627-2
627-3
Selection: Fixed %
Selection: Fixed Amount
Selection: Cell Edit
Calculate Update
626-1
626
Calculate Update
626-2
Fig. 35

| iBasket (Product) Type | Attribute Descriptive | AttF per iBasket | AttV per AttF | AttV Cost Definition | Attribute Configuration Formation | SBC/SSP Definition | FGR# Format |
|---|---|---|---|---|---|---|---|
| 100-1 **BASIC** (B) | Particular<br>Attribute Families (AttF)<br>each with particular included and selectable<br>Attribute Values (AttV)<br>associated with<br>and<br>included in<br>the referenced<br>configurable transactable<br>**BASIC iBasket**<br>◊<br>Established through<br>**Product Manager - Basic AttF/AttV Manager**<br>interface of system GUI | **Limited Number**<br>At least 1<br>associated with<br>and<br>included in<br>the referenced<br>configurable<br>transactable<br>**BASIC iBasket** | at least 1 | Cost **Neutral** | **Transactional**<br>◊<br>1<br>AttV<br>selection<br>from each<br>AttF<br>associated with<br>and<br>included in<br>the referenced<br>configurable<br>transactable<br>**BASIC iBasket** | **Fixed Universal**<br>transactable monetary<br>value-default<br>when in<br>**Unconfigured Status**<br>(Configurable)<br>◊<br>**Fixed Universal**<br>transactable monetary<br>value-default<br>when in<br>**Configured Status** | On demand<br>**System-generated**<br>**Alpha-Numeric String:**<br>Referenced<br>**BASIC iB#**<br>+<br>**Sequenced AttF/AttV**<br>**Reference Integers**<br>of<br>1<br>particular<br>Attributes Configuration<br>of the referenced<br>configurable<br>transactable<br>**BASIC iBasket** |
| 100-2 **ASSEMBLY** (A) | Particular<br>Attribute Families (AttF)<br>each with particular included and selectable<br>Attribute Values (AttV)<br>associated with<br>and<br>included in<br>the referenced<br>configurable transactable<br>**ASSEMBLY iBasket**<br>◊<br>Established through<br>**Product Manager - Assembly Ruleset**<br>interface of system GUI | **Unlimited Number**<br>At least 1<br>associated with<br>and<br>included in<br>the referenced<br>configurable<br>transactable<br>**ASSEMBLY iBasket** | at least 1 | Cost **Variable**<br>AND/OR<br>Cost **Neutral** | **Pre-Configured**<br>(prior to transaction)<br>(scalable to transactional)<br>◊<br>1<br>**Assigned**<br>unique and different<br>Attributes Configuration<br>Reference<br>**- CFG# -**<br>(Configuration Number)<br>referring to<br>each<br>established<br>unique and different<br>Attributes Configuration<br>of the referenced<br>configurable<br>transactable<br>**ASSEMBLY iBasket**<br>-<br>User-assigned<br>or sequentially<br>System-generated<br>and<br>appended<br>to the<br>**ASSEMBLY iB#**<br>(Separate field suffix)<br>◊<br>**Multiple**<br>AttV<br>selection<br>from same<br>AttF<br>enabled through<br>**Product Manager - Assembly Ruleset**<br>interface of system GUI | **No**<br>transactable monetary<br>value-default<br>when in<br>**Unconfigured Status**<br>(Configurable)<br>◊<br>**Variable Individual**<br>transactable monetary<br>value-default<br>when in<br>**Configured Status**<br>-<br>1 SBC and 1 SSP<br>transactable monetary<br>value-default<br>for each<br>established<br>unique and different<br>Attributes Configuration<br>of the referenced<br>configurable<br>transactable<br>**ASSEMBLY iBasket** | On demand<br>**System-generated**<br>**Alpha-Numeric String:**<br>Referenced<br>**ASSEMBLY iB#**<br>+<br>**associated**<br>**- CFG# -**<br>(Configuration Number)<br>of<br>1<br>unique and different<br>Attributes Configuration<br>of the referenced<br>configurable<br>transactable<br>**ASSEMBLY iBasket** |

Fig. 44

| | iBasket (Product) Type | Attribute Descriptive | AttF per iBasket | AttV per AttF | AttV Cost Definition | Attribute Configuration Formation | SBC/SSP Definition | FGR# Format |
|---|---|---|---|---|---|---|---|---|
| 100-3 | **SIMPLE PACKAGE** *(P)* | Particular<br>*Attribute Families* (**AttF**)<br>each *with particular included and selectable*<br>*Attribute Values* (**AttV**)<br>associated with<br>and<br>included in<br>each of<br>**2** or more<br>*configurable transactable*<br>**Basic Sub-iBaskets**<br>(*Package Componentry*)<br>of the referenced<br>*configurable transactable*<br>**SIMPLE PACKAGE iBasket**<br>◊<br>Established through<br>**Product Manager - Package Components**<br>interface of system GUI | **Limited Number**<br>*At least 1*<br>associated with<br>and<br>included in<br>each of<br>**2** or more<br>*configurable*<br>*transactable*<br>**Basic Sub-iBaskets**<br>(*Package Componentry*)<br>of the referenced<br>*configurable*<br>*transactable*<br>**SIMPLE PACKAGE**<br>**iBasket** | *at least 1* | *Cost Neutral* | **Transactional**<br>**1**<br>*AttV*<br>selection<br>from each<br>*AttF*<br>associated with<br>and<br>included in<br>each of<br>**2** or more<br>*configurable*<br>*transactable*<br>**Basic Sub-iBaskets**<br>(*Package Componentry*)<br>of the referenced<br>*configurable*<br>*transactable*<br>**SIMPLE PACKAGE**<br>**iBasket** | **Fixed Universal**<br>*transactable monetary*<br>*value-default*<br>when in<br>**Unconfigured Status**<br>(*Configurable*)<br>◊<br>**Fixed Universal**<br>*transactable monetary*<br>*value-default*<br>when in<br>**Configured Status** | *On demand*<br>**System-generated**<br>**Alpha-Numeric String**<br>*Referenced*<br>**SIMPLE PACKAGE IB#**<br>+<br>**Sequenced AttF/AttV**<br>**Reference Integers**<br>*of*<br>**1**<br>*Attributes Configuration*<br>*from each*<br>*configurable*<br>*transactable*<br>**Basic Sub-iBasket**<br>(*Package Componentry*)<br>of the referenced<br>*configurable*<br>*transactable*<br>**SIMPLE PACKAGE**<br>**iBasket** |
| 100-4 | **DIVERSE PACKAGE** **(I) or (II)** *(P)* | Particular<br>*Attribute Families* (**AttF**)<br>each *with particular included and selectable*<br>*Attribute Values* (**AttV**)<br>associated with<br>and<br>included in<br>each of<br>**(I)** .................. *1* or more<br>*configurable transactable*<br>**Basic Sub-iBaskets**<br>(*Package Componentry*)<br>+<br>*1* or more<br>*configured status configurable transactable*<br>**Assembly Sub-iBaskets**<br>(*Package Componentry*)<br>of the referenced<br>*configurable transactable*<br>**DIVERSE PACKAGE (I) iBasket**<br>**OR**<br>**(II)** .................. 2 or more<br>*configured status configurable transactable*<br>**Assembly Sub-iBaskets**<br>(*Package Componentry*)<br>of the referenced<br>*pre-configured transactable*<br>**DIVERSE PACKAGE (II) iBasket**<br>◊<br>**1 Fixed**<br>*Referenced Attributes Configuration per*<br>**Assembly Sub-iBasket**<br>(*Package Componentry*)<br>◊<br>Established through<br>**Product Manager - Package Components**<br>interface of system GUI | **Limited Number**<br>*At least 1*<br>associated with<br>and<br>included in<br>each referenced<br>*configurable*<br>*transactable*<br>**BASIC**<br>**Sub-iBasket**<br>(*Package Componentry*)<br>of the referenced<br>*configurable*<br>*transactable*<br>**DIVERSE PACKAGE**<br>**(I)**<br>**iBasket**<br>**AND**<br>**Unlimited Number**<br>*At least 1*<br>associated with<br>and<br>included in<br>each referenced<br>*configured status*<br>*configurable*<br>*transactable*<br>**Assembly**<br>**Sub-iBaskets**<br>(*Package Componentry*)<br>of the referenced<br>*configurable*<br>*transactable*<br>**DIVERSE PACKAGE**<br>**(I)**<br>**OR**<br>*pre-configured*<br>*transactable*<br>**DIVERSE PACKAGE**<br>**(II)**<br>**iBasket** | *at least 1* | *Cost Neutral*<br>In<br>each referenced<br>*configurable*<br>*transactable*<br>**Basic**<br>**Sub-iBasket**<br>(*Package Componentry*)<br>of the referenced<br>*configurable*<br>*transactable*<br>**DIVERSE PACKAGE**<br>**(I)**<br>**iBasket**<br>**AND**<br>*Cost* **Variable**<br>**AND/OR**<br>*Cost* **Neutral**<br>In<br>each referenced<br>*configured status*<br>*configurable*<br>*transactable*<br>**Assembly**<br>**Sub-iBasket**<br>(*Package Componentry*)<br>of the referenced<br>*configurable*<br>*transactable*<br>**DIVERSE PACKAGE**<br>**(I)**<br>**OR**<br>*pre-configured*<br>*transactable*<br>**DIVERSE PACKAGE**<br>**(II)**<br>**iBasket** | **Transactional**<br>In<br>each referenced<br>*configurable*<br>*transactable*<br>**Basic**<br>**Sub-iBasket**<br>(*Package Componentry*)<br>of the referenced<br>*configurable*<br>*transactable*<br>**DIVERSE PACKAGE**<br>**(I)**<br>**iBasket**<br>**AND**<br>**Pre-Configured**<br>(*prior to transaction*)<br>(*scalable to transactional*)<br>In<br>each referenced<br>*configured status*<br>*configurable*<br>*transactable*<br>**Assembly**<br>**Sub-iBasket**<br>(*Package Componentry*)<br>of the referenced<br>*configurable*<br>*transactable*<br>**DIVERSE PACKAGE**<br>**(I)**<br>**OR**<br>*pre-configured*<br>*transactable*<br>**DIVERSE PACKAGE**<br>**(II)**<br>**iBasket** | **Fixed Universal**<br>*transactable monetary*<br>*value-default*<br>when in<br>**Unconfigured Status**<br>(*Configurable*)<br>◊<br>**Fixed Universal**<br>*transactable monetary*<br>*value-default*<br>when in<br>**Configured Status** | *On demand*<br>**System-generated**<br>**Alpha-Numeric String**<br>*Referenced*<br>**DIVERSE PACKAGE IB#**<br>+<br>**Sequenced AttF/AttV**<br>**Reference Integers**<br>*of*<br>**1**<br>*Attributes Configuration*<br>*from each*<br>*configurable*<br>*transactable*<br>**Basic**<br>**Sub-iBasket**<br>(*Package Componentry*)<br>+<br>**each associated**<br>**- CFG# -**<br>(*Configuration Number*)<br>*of*<br>**1**<br>*unique and different*<br>*Attributes Configuration*<br>*of*<br>**each**<br>*configured status*<br>*configurable*<br>*transactable*<br>**Assembly**<br>**Sub-iBasket**<br>(*Package Componentry*)<br>of the referenced<br>*configurable*<br>*transactable*<br>**DIVERSE PACKAGE**<br>**(I)**<br>**OR**<br>*pre-configured*<br>*transactable*<br>**DIVERSE PACKAGE**<br>**(II)**<br>**iBasket** |

Fig. 45

TECHNIQUES AND DEFINITION LOGIC EMBODIED IN A COMPUTER PROGRAM PRODUCT STORED AND PERFORMED ON A COMPUTERIZED DEVICE FOR PROVIDING A SINGULAR GRAPHICAL USER INTERFACE CONFIGURED TO ENABLE A USER TO CREATE/MANAGE/TRANSACT/REPORT AND VIEW ALL FULL GRANULAR REFERENCE PRODUCT DATA IN A CONFIGURABLE TRANSACTABLE AGGREGATE FORM

BACKGROUND

A product distribution enterprise (or simply product distributor) buys and sells products. The company structure for such an enterprise typically takes the form of individual departments which are separated by organizational function such as sales, purchasing, product definition, merchandise profile, distribution/logistics, and finance, among others. To facilitate and coordinate information exchange between these departments and with customers as well, the enterprise typically employs an electronic Enterprise Resource Planning (ERP) system (i.e., a computer system running business solutions software).

Typical ERP systems include graphical user interfaces (GUIs) and databases which operate to enable distributors to manage products (e.g., coordinate product movement from purchase orders into inventory and then to sales orders). To this end, these ERP systems require distributors to assign unique tracking numbers (sometimes called product, item, or SKU numbers) to various characteristics permutations available in the same product. Once the distributors assign these unique tracking numbers, users may visually access product data through the GUIs by referencing specific data from the databases based on these unique tracking numbers. For instance, a user may scroll through GUI lists which report quantities of particular characteristics permutations of the same product; on order, currently in inventory, or recently sold. The lines on each GUI list provide details for respective and particular product characteristics permutations (e.g., each line may include the assigned tracking number for a specific attribute characteristics permutation, a quantity in inventory for that permutation, a short description of that permutation, etc.) of the same product. Further details of such an ERP system will now be provided with reference to the following example.

Suppose that a distributor is in the business of buying and selling clothing products such as shirts. Further suppose that there are many shirt products available, each with varying attribute characteristics, and available in multiple permutations of those attribute characteristics. In particular, suppose that a particular shirt product is available in multiple colors (e.g., white, blue, tan, etc.), multiple sleeve lengths (e.g., 32 inch, 33 inch, etc.) and multiple collar sizes (e.g., 14½ inch, 15 inch, etc.), among other things (e.g., the attributes of the shirt products being color, collar size, and sleeve length).

To track the particular shirt product within the above-described conventional ERP system, the distributor typically assigns a unique tracking number to each attribute characteristics permutation of the particular shirt product. Accordingly, a white shirt having a 34-inch sleeve length and 17-inch collar size would have a first assigned tracking number in the ERP system. Additionally, a white shirt having the same sleeve length but a different collar size would have another (e.g., distinct) assigned tracking number in the ERP system. Furthermore, a white shirt having a different sleeve length but the same collar size would have yet another assigned tracking number.

Users of the conventional ERP system then manage shirts within the enterprise (e.g., from purchase order, to inventory, to sales order, etc.) using these assigned tracking numbers. For example, once the distributor has assigned tracking numbers to each attribute characteristics permutation of each shirt product, users may visually assess the quantity of each of these (as handled by the distributor), by scrolling through lines of a GUI list (e.g., an inventory report) where each line includes an assigned tracking number and associated information for a particular attribute characteristics permutation of a particular shirt product.

One conventional ERP system which is suitable for managing shirts for a distributor in this manner is the computer system running an off-the-shelf business solutions software package called Axapta® which is offered by Microsoft Corporation of Redmond, Wash.

In some situations, a distributor may wish to obtain certain functionality which is not offered by an off-the-shelf business solutions software package. In such cases, the distributor may contract with one or more third-party companies who can provide additional software packages which will provide the required additional functionality and also compliment the operation of the off-the-shelf business solutions software package. An example of such an additional software package which is similar to that described above is the CS-Enterprise (formerly called e-Logia) product configurator which is offered by Configuration Solutions of Portage, Mich.

SUMMARY

Unfortunately, one of several deficiencies to conventional ERP systems is that they require users to reference product data using only unique tracking numbers respectively assigned to each attribute characteristics permutation of each product; with the user charged not only with assigning these individual tracking numbers, but also with creating them in the system. In particular, it is extremely burdensome for users, operating within such a system, to scroll through lines of GUI lists where each line includes a unique individually assigned tracking number and associated information for each of the multiple and particular attribute characteristics permutations that are available in the same product. For instance, in connection with the above-described clothing distributor example, the distributor provides a different tracking number for each attribute characteristics permutation of the shirt product, as necessitated, for example, by each change in the shirt's color (e.g., white, blue, tan, etc.), each change in the shirt's sleeve length (e.g. short, regular, long, etc.), each change in the shirt's collar size (e.g. 14, 14½, 15, 15½/etc.), and so on. This results in an abundance of different tracking numbers. In order to then utilize the conventional ERP system, a user must uncomfortably, and as a result, sometimes inefficiently, scroll through line after line on a GUI list where each line and the inclusive tracking number represents one unique attribute characteristics permutation of the same particular shirt product.

One will appreciate that there may be other shirt attribute characteristics which the distributor might need to track such as button finish (e.g. bone, transparent, pearl, etc.), cut (e.g. fitted, regular, full, etc.), and so on, resulting in an even greater abundance of different tracking numbers, and thus a proliferation of GUI lines that the user must painstakingly scroll through when using the conventional ERP system. In particular, the number of attribute characteristics permutations, and thus the number of tracking numbers and the number of GUI lines of the conventional ERP system, increases in an exponential manner with each additional attributes characteristic.

Furthermore, this propagation of tracking numbers is exacerbated if the distributor carries numerous and/or different products. For example, suppose that the clothing distributor carries pants and full uniforms in addition to shirts. These additional types of products simply compound the tracking number burden yet again in an exponential manner.

Moreover, a distributor may desire a report on a particular shirt product in aggregate form. For instance, the above-described clothing distributor may want to know, for only one shirt product, the total number of units currently in stock, regardless of sleeve length, collar size, etc. Unfortunately, owing to the aforementioned approach of referencing product data using a unique tracking number for each product attribute characteristics permutation, the conventional ERP system does not provide a way to tabulate such information in a convenient manner. Rather, a user must add together all the quantities of all the different tracking numbers of the same shirt product in order to obtain such counts.

In contrast to the above-described conventional ERP system, certain embodiments of the invention are directed to techniques for managing product data using a graphical user interface that enables visual presentation of the product data in a manner that alleviates the need for users to scroll through excessive lines for specific same-product attribute characteristics permutations. Rather, the graphical user interface also enables users to reference and view all data of the same product in an aggregate form (e.g., as a collection), regardless of differences in particular attribute characteristics from permutation to permutation. For instance, the graphical user interface provides single point access for a clothing distributor to reference, view, manage, transact, and report the consolidated data of any one shirt product, regardless of the available differences in sleeve length, collar size, color etc. (e.g., those attribute characteristics permutations or 'attribute configurations' resulting from each different attribute value selection from each attribute family associated with the one shirt product).

Again in reference to the above, one embodiment of the invention is directed towards an improved technique for managing product data which includes i) receiving a product type selection associated with a product, ii) defining a particular representative "buy cost/sell price value-defaulted configurable transactable consolidation entry" (e.g., hereinafter referred to as "configurable transactable consolidation entry", "iBasket", or simply "consolidation entry") embodied in a particular data format (e.g., 'data element structure') and associated with the product type selection and the product, and iii) storing the configurable transactable consolidation entry in a memory location; the configurable transactable consolidation entry having (i) a collection of associated attributes; sequenced attribute families, each attribute family having specifically included, referenced, cost defined, and selectable attribute values, representing multiple attribute characteristics permutations or 'attribute configurations' of the product, (ii) a single consolidation entry reference or 'identifier' referring to the configurable transactable consolidation entry, and (iii) particular core defining and descriptive data elements of the product (e.g., such as applied buy quotes, applied sell quotes, specification graphic files, and attributes configuration references, to name a few). The use of the transactable consolidation entry allows a user to reference, view, manage, transact, and report all data of the same product, including all attribute configurations, in an aggregate form (e.g., as a collection), regardless of the differences in particular attribute characteristics from permutation to permutation.

BRIEF DESCRIPTION OF THE DRAWINGS

Certain objects, features and advantages of the invention will be apparent from descriptions of particular embodiments of the invention listed below (and subsequently herein), as well as illustrated in the accompanying drawings, wherein like reference characters refer to the same parts throughout the different views. The drawings are not necessarily to scale, emphasis instead being placed upon illustrating the principles of the invention.

FIG. 2 illustrates an example of particular features (i.e., attribute family, 'cost neutral' attribute values, and system-generated full granular reference numbers) of a basic type consolidation entry as used by the computerized resource planning system of FIG. 1.

FIG. 21 illustrates an arrangement of the assembly .SG (spec graphic) interface of FIG. 18 when a user selects the associated .SG Text menu entry.

FIG. 32 illustrates the transactional attachment or output format of the associated .SG bitmap to an assembly type consolidation entry as produced by the computerized resource planning system of FIG. 1.

FIG. 34 illustrates an Update Selection interface as used by the computerized resource planning system of FIG. 1.

FIG. 35 illustrates an Update Standard Buy Cost interface as used by the computerized resource planning system of FIG. 1.

FIG. 44 illustrates a table summarizing a basic type product consolidation entry and an assembly type product consolidation entry within the system of FIG. 1.

FIG. 45 illustrates a table summarizing a simple package type product consolidation entry and a diverse package type product consolidation entry within the system of FIG. 1.

DETAILED DESCRIPTION

Certain embodiments of the invention are directed to techniques for managing, transacting, and reporting product data using a graphical user interface which enables introduction, reference and visual presentation of all product data in a manner that drastically reduces the excessive time required by users to these ends; as well, alleviating the need for users to only be able to scroll through excessive lines uniquely referencing and detailing each and every available attribute characteristics permutation of the same particular enterprise product. Rather, the graphical user interface alternatively enables users to reference, view, manage, transact, and report product data in an aggregate form, regardless of differences between each of the available selectable attribute characteristics permutations of the same product. For example, the graphical user interface provides a clothing distributor single point access to reference, view, manage, transact, and report all the consolidated data of one particular shirt product, regardless of available selectable differences in color, sleeve length, and collar size, etc, and the resulting different available selectable attribute characteristics permutations that these produce in the same particular shirt product.

Figure 1:
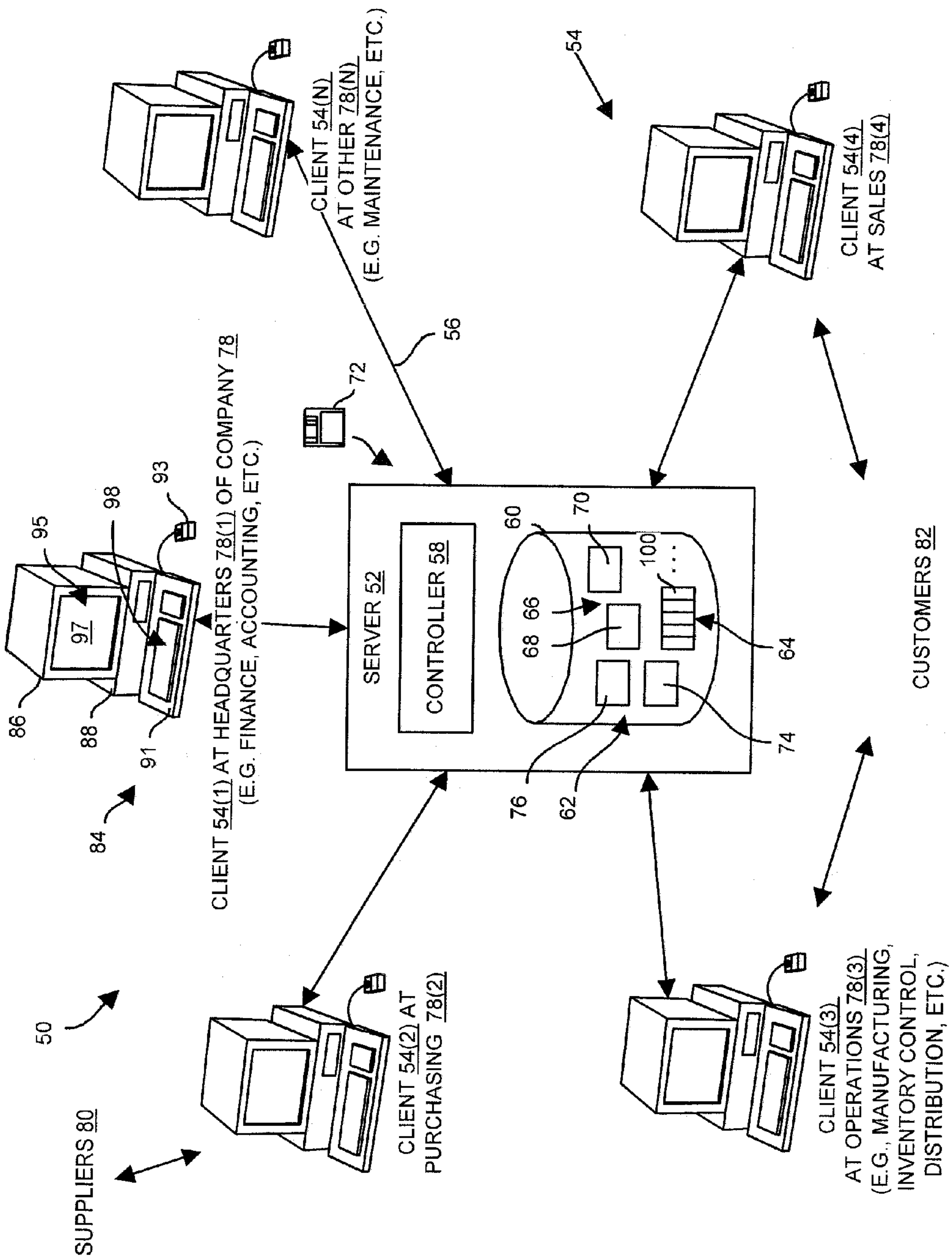
FIG. 1 is a diagram of a computerized resource planning system suitable for use by the invention.

FIG. 1 shows a computerized resource planning system 50 that is suitable for use by the invention. The computerized resource planning system 50 allows one or more users to define, create, and then reference, view, manage, transact and report actual inventoriable and non-inventoriable products in any product distribution enterprise inclusive of full accounting functionality and full e-commerce scalability.

As shown in FIG. 1, the computerized resource planning system 50 includes a server 52 and multiple clients 54(1), . . . , 54(N), (collectively, clients 54). The server 52 and clients 54 communicate with each other through a communications medium 56 (e.g., electrical circuitry, fiber optic equipment, wireless communications, combinations thereof, etc.). Accordingly, the server 52 and the clients 54 of the system 50 are capable of residing in a centralized location (e.g., in a local area network configuration within an office building or a campus, etc.) or in a distributed manner (e.g., across cities/towns, coast-to-coast, across countries, etc.).

As further shown in FIG. 1, the server 52 includes a controller 58 (e.g., a microprocessor, a set of processors, etc.) and memory 60 (illustrated by a storage device symbol). Preferably, the memory 60 is a combination of relatively fast semiconductor memory and large capacity non-volatile storage (e.g., disk drives). The memory 60 stores a resource planning application 62, a database 64 and other supporting software constructs 66 such as an operating system 68, other data and applications 70, and the like. The resource planning application 62 installs on the server from a computer program product 72. In some arrangements, the computer program product 72 is available in a standard off-the-shelf form such as a shrink wrap package (e.g., CD-ROMs, diskettes, tapes, etc.). In other arrangements, the computer program product 72 is available in a different form (e.g., propagated signals, a network installation, purchasable and downloadable online media, etc.).

Furthermore, in some arrangements, the resource planning application 62 resides as a single, integrated set of programs thus enabling the user to obtain the application 62 from a single source (e.g., from a single software provider). In other arrangements, the resource planning application 62 is divided into multiple parts, namely, a backbone portion 74 and a front-end configurator portion 76 which may be available separately (e.g., a backbone portion from one software provider and a front-end configurator portion from another software provider). In some arrangements, the server 52 is configured with load balancing and fault tolerant features (e.g., redundancy, error checking and recovery subsystems, etc.) to provide more robust and reliable resource planning functionality.

By way of example only, the clients 54 of the system 50 are distributed among various organizational departments of a company 78 dealing with suppliers 80 and customers 82. In particular, as shown in FIG. 1, the client 54(1) resides at a headquarters 78(1) of the company 78, the client 54(2) resides at a purchasing department 78(2), the client 54(3) resides at an operations department 78(3), the client 54(4) resides at a sales department 78(4), and so on. Other company configurations and organization structures are suitable for use as well.

As further shown in FIG. 1, each client 54 is essentially a general purpose computer and configured to operate as a user interface, i.e., an input/output (I/O) apparatus, to the server 52. To this end, each client 54 includes an input device 84, an output device 86, and client circuitry 88. The input device 84 includes a keyboard 91 and a mouse 93. The output device 86 includes a display 95 (e.g., a CRT monitor) and optionally a printer (not shown). The client circuitry 88 is configured to render a graphical user interface (GUI) 97 of the resource planning application 62 on the display 95 in response to user commands 98 entered into the input device 84 (e.g., keystrokes and mouse movements). In one arrangement, the resource planning application 62 includes application routines that run either remotely at the server 52, locally on the client circuitry 88 of each client 54, or both, when providing the GUI 97 to provide independency from third-party web browser applications. In another arrangement, the resource planning application 62 is configured to operate through web browsers running on the clients 54 using web based communications (e.g., HTML, XML, Java, Perl/CGI scripts, etc.) to enable convenient access from virtually any networked computer device. In either arrangement, users at the clients 54 are capable of effectively exchanging information with the server 52. Other I/O and client/server arrangements are suitable for use by the system 50 as well.

In contrast to conventional ERP systems (e.g., conventional ERP backbones and configurators), the computerized resource planning system 50 provides user interface enhancements that enable users at the various departments within the company 78 to effectively and efficiently manage, transact, and report product information without having to reference and view an overwhelming number of individual attribute characteristics permutations of the same product, solely on a line-by-line basis on the output device 86. Rather, the GUI 97 provided by the system 50 additionally allows users at the various departments within the company 78 to manage product information in consolidated or aggregate form using specialized configurable transactable consolidation entries 100 (e.g., as embodied by particular data element structures) within the database 64 stored in the memory 60.

By design, the 'configurable' transactable consolidation entry construct is that of an aggregated data element structure which functions as a referenced repository for all product defining data inclusive of all selectable attribute values included in each associated attribute family common to a given enterprise product.

By definition, and for the purpose of relevant clarification regarding embodiments of the invention described herein, the term 'configurable' means 'that which can be configured', and can reflect either an 'unconfigured' or a 'configured' status. Each 'configurable' transactable consolidation entry, as one embodiment of the invention, can and does by design reflect an 'unconfigured' status when initially created within the computerized resource planning system 50. It remains so until as and when a 'selection' of attribute values from those included in the associated attribute families of the 'configurable' transactable consolidation entry is made. When made, this 'selection' defines one 'attributes configuration' of the enterprise product represented in the system 50 by the associated 'configurable' transactable consolidation entry, and confers a 'configured' status upon the associated 'configurable' transactable consolidation entry, though by design, the 'configurable' transactable consolidation entry, as representing all the data of the associated enterprise product in the system 50, still retains the same 'consolidation entry reference' value and continues to enable full 'configurable' functionality.

The 'configurable' transactable consolidation entry, representing as such an enterprise product within the system 50, is referenced or 'identified' in the system 50, by a 'consolidation entry reference'. The functional property 'configurable' of the 'configurable' transactable consolidation entry, as one embodiment of the invention, ascribes a unique, more flexible, and more accurately defining product identifier format than those found in conventional ERP systems.

In conventional ERP systems, what is often regarded and described as a 'product' identifier (e.g., product, item, or sku number, etc.) is really an 'attribute characteristics permutation' identifier or a 'variation of product' identifier (e.g., still often referred to as product, item, or sku number, etc.). In conventional ERP systems, a 'selection' is made from attribute characteristics which 'have not been collectively established' as such within the system. Rather, by means of 'external of system' product assessment, these attribute characteristics have been determined by the enterprise or a user to be available to the product. Once a 'selection' has been determined, it is then introduced into the conventional ERP system with a 'product' identifier, individually, uniquely referenced (e.g., product, item, or sku number, etc.), and apart from all other attribute characteristics permutations that are common to the given product. Effectively with each 'selection' and creation of an associated individual and different 'product' identifier (e.g., product, item, or sku number, etc.), an enterprise or user is creating and introducing into the conventional ERP system what becomes identified by virtue of a different product 'identifier' (e.g., product, item, or sku number, etc.) as a 'different' product, when in reality it is a 'variation' of the 'same' product.

By contrast, as one embodiment of the invention, the 'configurable' transactable consolidation entry with it's aggregated format and it's functional flexibility within a system designed to utilize these properties, enables an enterprise to manage all the data of the same enterprise product including attribute characteristics and attribute characteristics permutations, more accurately, more easily in functional terms, and more economically than the current art of conventional ERP systems affords. For example, the labor intensity of introducing a distribution enterprise's full product range into a conventional ERP system is enormous both in terms of time and money, and inflates the related operating costs of an enterprise using such a conventional ERP system many many times over what it would be employing a system such as the system 50 described herein as one embodiment of the invention, in turn employing the 'configurable' transactable consolidation entry design, itself one embodiment of the invention.

Finally, by definition, and for the purpose of relevant clarification regarding embodiments of the invention described herein, 'transactable' means 'that which carries an assigned monetary value-default for the purpose of executing enterprise transactional activities such as for example, quotes, purchases, sales, buy cost contract management, sell price contract management, etc. . . . '.

Each configurable transactable consolidation entry 100 fully defines a corresponding actual product at an additional higher or broader level (e.g., at an "available options for" attribute characteristics permutations), rather than only at an attribute characteristics permutation level which is the lowest level of granularity. The use of such configurable transactable consolidation entries 100 enables users of the system 50 to manage and navigate full same product data in the aggregate rather than always at the attribute characteristics permutation level as in conventional ERP systems. That is, the system 50 tracks full same product information at the lowest level of granularity in a system-generated "behind the scenes" manner, while at the same time, the GUI 97 utilizes configurable transactable consolidation entries 100; enabling users to work with full same product data at higher, aggregated or consolidated levels (e.g., with less line entries), thus maintaining detailed product data integrity and accuracy, lessening the navigation burden, drastically reducing data entry time as well as enterprise accountant's audit time, and providing users with an effective, enhanced freedom of operation as will now be explained in further detail.

FIG. 2, for example, illustrates certain particular features 101 provided by a single configurable transactable consolidation entry 100 (e.g., basic type configurable transactable consolidation entry that defines a particular uniform pant product. As illustrated, at the lower attribute characteristics permutation level, the uniform pant product includes 36 separate attribute characteristics permutations (e.g., the same uniform pant is configured in 36 separate versions: a blue pair of uniform pants having a 30 inch waist and a short inseam, a blue pair of pants having a 30 inch waist and a regular inseam, etc.). At the higher aggregate or consolidated level, the same uniform pant product is represented by a single configurable transactable consolidation entry 100, which corresponds to the particular uniform pant product, includes a particular collection of attribute characteristics (e.g., the particular attribute families 138 of color 102, waist size 104, and inseam 106; each with specifically included and selectable attribute values 140), and is referenced by a single identifier or consolidation entry reference (e.g., the particular consolidation entry number or "iB#" 114 of "B-AUP-339841"). As a result, by providing a user with a single configurable transactable consolidation entry 100, that represents multiple versions of the same product at the attribute characteristics permutation (e.g., attributes configuration) level, the system 50 minimizes the amount of time required by the user when navigating through the system 50, by limiting the user's need to scroll endlessly through lines of attribute characteristics permutations for one or more versions of the same product, and by drastically reducing the amount of 'set-up' time taken to fully create or establish representation of an enterprise product within the system 50. Rather, users are capable of more conveniently managing product data in consolidated form when desired. For example, the system 50 is capable of generating useful reports that show merchandise information in the aggregate without burdening the user with having to calculate and tabulate such information by hand; in an individualized, same product, multiple attribute characteristics permutations (e.g., attribute configurations) tracking identifier format.

It should be understood that the configurable transactable consolidation entries 100 are well suited for performing the dual role of enabling user navigation at the aggregate level or user navigation at the attribute characteristics permutation level. In one arrangement, the configurable transactable consolidation entries 100 are configured to contain both aggregate information and attribute characteristics permutation information thus allowing the system 50 to handle configurable transactable consolidation entries 100, without any need to handle conventional database entries for attribute characteristics permutation data, when manipulating product data. In another arrangement, the configurable transactable consolidation entries 100 are configured to handle only aggregate information and to work in conjunction with conventional database entries for attribute characteristics permutation data when manipulating product data. In either arrangement, the user enjoys the capability of selectively navigating through product data in consolidated form (e.g., more convenient navigation, fewer lines, and reduced 'set-up' time) when desired, or at the attribute characteristics permutation level (e.g., the lowest level of granularity with details of specific attribute characteristics permutations) when desired. Further details of particular embodiments of the invention will now be provided with reference to FIGS. 3 through 6.

Data Formats/Product Types

The computerized resource planning system 50 (FIG. 1) is configurable to represent actual products fully (e.g., shirts, pants, uniforms for the clothing industry, etc.) using configurable transactable consolidation entries 100 having a variety of different data formats (i.e., data element structures). The use of such data formats enables the system 50, inclusive of full accounting functionality and full e-commerce scalability, to define, create, manage, transact and report full same product data in aggregate form, of both inventoriable and non-inventoriable products in any product distribution enterprise.

Within one arrangement of the system 50 (FIG. 1), the configurable transactable consolidation entries 100 are configurable as one of four different data formats each representing one of four different product types. The four data formats include a basic type format 90, an assembly type format 92, a simple package type format 94, and a diverse package type format 96 which are respectively illustrated in FIGS. 3, 4, 5, and 6. It should be understood that, hereinafter, a configurable transactable consolidation entry 100 may be referred to simply as a consolidation entry 100. Additionally, it should be understood that, hereinafter, a configurable transactable consolidation entry 100 may also be referred to as an "iBasket" 100 or simply an "iB" 100 since the configurable transactable consolidation entry 100 operates as an ingredients basket of information (i.e., the terms configurable transactable consolidation entry and iBasket or iB are interchangeable terms). The basic type data format 90 is well-suited for representing individual products (e.g., pant products, shirt products, etc.) within an enterprise where each product has a limited number of attribute characteristics (e.g., a limited number of associated sequenced attribute families each with specifically included, referenced, cost defined, and selectable attribute values). For example, in one arrangement, the basic type format 90 represents a product having up to seven distinct attribute characteristics (e.g., a limited number of associated sequenced attribute families each with specifically included, referenced, cost defined, and selectable attribute values), which provide for a related number of attribute configurations, where the enterprise offers all of these attribute configurations. The assembly type data format 92 is well-suited for representing individual products (e.g., an emergency vehicle light bar assembly) within an enterprise where each product can include an unlimited number of attribute characteristics (e.g., an unlimited number of associated sequenced attribute families each with specifically included, referenced, cost defined, and selectable attribute values). For example, in one arrangement, the assembly type format 92 represents a product having an unlimited number of distinct attribute characteristics (e.g., an unlimited number of associated sequenced attribute families each with specifically included, referenced, cost defined, and selectable attribute values), which provide for a related number of attribute configurations, where the enterprise can elect to offer only specific of these attribute configurations.

A basic type product, from the perspective of the enterprise, is a single "entity" not composed of multiple products. Similarly, an assembly type product, from the perspective of the enterprise, is a single "entity" not composed of multiple products. For example, for an enterprise engaged in apparel distribution, a pair of pants is a basic type product considered as a single "entity" from the enterprise's perspective. The apparel distribution enterprise would not necessarily consider the pair of pants as the sum of multiple, individual products forming the pair of pants (e.g., a zipper, one or more buttons, pockets, etc.)

The simple package type data format 94 is well-suited for representing products that are combinations of two or more basic type products. For example, a simple package type product includes a uniform having a pair of pants (e.g., a first basic type product) and (e.g., "bundled" with) a shirt (e.g., a second basic type product). The diverse package type data format 96 is well-suited for representing a product having i) an assembly type product and ii) at least (e.g., "bundled" with) one other product which is either a basic type product or another assembly type product, as will be described below.

As an enterprise or a user within the enterprise, having initially configured the computerized resource planning system 50, prepares to introduce a particular enterprise product into the system for operation, the enterprise or user determines how the particular enterprise product can be most efficiently and effectively be defined, represented and handled within the system 50 (e.g., either as a basic, or an assembly, or a simple package, or a diverse package product type). Based upon this determination, the enterprise or user selects one of the data formats 90, 92, 94, 96 (e.g., representative of a basic, or an assembly, or a simple package, or a diverse package product type) for creation of a particular and representative consolidation entry (iBasket or iB) 100 within the system 50. The data format 90, or 92, or 94, or 96, as selected by the user, dictates the form and function of all the operational activities of the associated product within the system 50. For example, such operational activities include the manner of creation of the consolidation entry (iBasket or iB) 100 for the product within the system 50, the management relating to the product, the transaction of the product and the reporting relating to the product, etc.

It should be understood that the data formats 90, 92, 94, 96 are illustrated in FIGS. 3, 4, 5, and 6 in logical form only and that the data formats 90, 92, 94, 96 physically reside in the memory 60 (also see FIG. 1) in one of a variety of suitable arrangements, (e.g., in a contiguous manner, in a distributed manner, on a block-by-block or page-by-page basis, as true memory locations with direct addressing, as a list of pointers to memory locations using an indirect addressing scheme, as linked lists, as doubly-linked lists, arrays, combinations thereof, etc.). Additionally, it should be understood that, hereinafter, a particular attribute family, sequenced and associated with a particular consolidation entry may be referred to as a sequenced attribute family; or more simply as an attribute family, and that a particular cost defined, referenced, and selectable attribute value specifically included in an attribute family, may be referred to as only one of either a cost neutral referenced selectable attribute value or a cost variable referenced selectable attribute value; or more simply as either a cost neutral attribute value or a cost variable attribute value.

Figure 3:
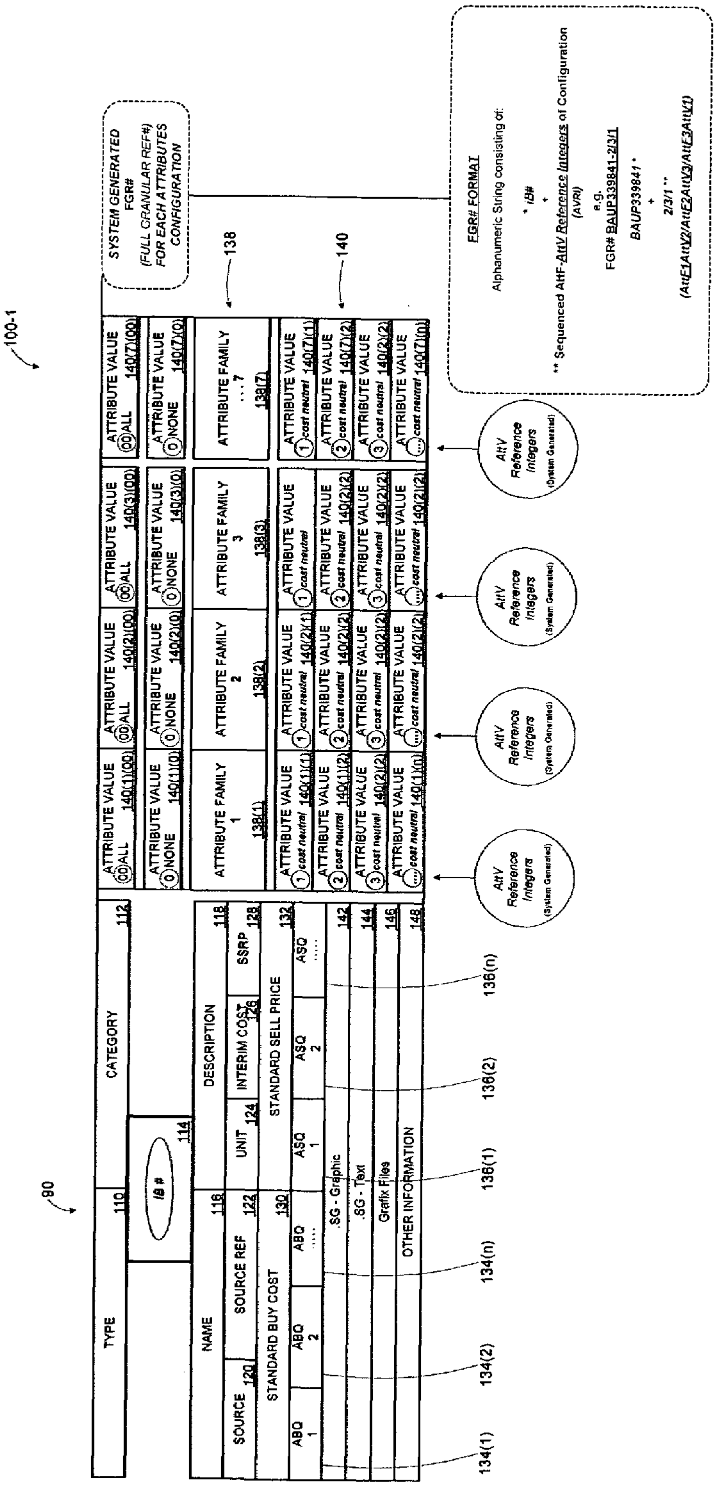
FIG. 3 is a block diagram of the data elements that form a basic type consolidation entry as used by the computerized resource planning system of FIG. 1.

FIG. 3 shows the layout for the basic type data format 90 for creation of a basic type consolidation entry 100-1. The basic type data format 90 includes a type field 110, a product category field 112, a consolidation entry reference field 114 (e.g., a consolidation entry number or an iB# field), a name field 116, a description field 118, a source field 120, a source reference field 122, a unit field 124, an interim cost field 126, a SSRP (e.g., source suggested retail price) field 128, a standard buy cost field 130, a standard sell price field 132, a set of applied buy quote fields 134(1), 134(2), **134(*n*) (collectively, applied buy quote fields 134), a set of applied sell quote fields 136(1), 136(2), 136(*n*) (collectively, applied sell quote fields 136), an .SG graphic field 142, an .SG text field 144, a grafix files field 146, a set of attribute family fields 138(1), 138(2), . . . , 138(7) (collectively, attribute family fields 138), and a set of 'cost neutral' attribute value fields 140(1)(1), . . . , 140(1)(n), 140(2)(1), . . . , 140(2)(n), . . . , 140(7)(1), . . . , 140(7)(n) (collectively, 'cost neutral' attribute value fields 140**).

It should be understood that each attribute family field 138 has an associated group of 'cost neutral' attribute value fields 140. For example, the attribute family field 138(1) has an associated group of 'cost neutral' attribute value fields 140(1)(1), 140(1)(2), . . . 140(1)(n). Additionally, the next attribute family field 138(2) has an associated group of 'cost neutral' attribute value fields 140(2)(1), 140(2)(2), . . . , 140(2)(n), and so on.

Additionally, it should be understood that each attribute family field 138 can be associated with two additional 'cost neutral' attribute value fields 140 to designate selection of either (i) all 'cost neutral' attribute value fields 140 or (ii) no 'cost neutral' attribute value fields 140 for that attribute family field 138. In one arrangement, if one of these associations has been made, the attribute family field 138(1) then has an associated 'cost neutral' attribute value field 140(1)(00) that, when selected, associates all available 'cost neutral' attribute value fields 140 with the attribute family 138(1). In one arrangement, if one of these associations has been made, the attribute family field 138(1) then has an associated 'cost neutral' attribute value field 140(1)(0) that, when selected, associates none of the available 'cost neutral' attribute value fields 140 with the attribute family 138(1). Finally, in one arrangement, if both of these associations have been made, the attribute family field 138(1) then has an associated 'cost neutral' attribute value field 140(1)(00) that, when selected, associates all available 'cost neutral' attribute value fields 140 with the attribute family 138(1), and additionally, the attribute family field 138(1) also has an associated 'cost neutral' attribute value field 140(1)(0) that, when selected, associates none of the available 'cost neutral' attribute value fields 140 with the attribute family 138(1).

Furthermore, it should be understood that the basic type data format 90 includes additional fields (e.g., other information fields) 148 for storage of additional information related to the consolidation entry 100-1. For example, the additional fields 148 can include data relating to ancillary functions associated with the consolidation entry 100-1 (e.g., tracking data, time stamping, error checking, authentication, etc.).

Each field within the basic type consolidation entry 100-1, which is configured as a basic type data format 90, includes data relating to some aspect of a basic type product being defined and represented within the system 50 by the consolidation entry 100-1. The following outlines the use and function of each field within the consolidation entry 100-1.

The contents of the type field 110 identify the data format type (e.g., basic, simple package, etc.) of a consolidation entry 100. For a basic type consolidation entry, (e.g., 100-1 of FIG. 3), a user enters the contents of the type field 110 as "Basic". The contents of the category field 112 identify a product category for the particular basic type product being defined by the particular basic type consolidation entry 100-1. For example, the contents of the category field 112 can include "Apparel—Uniform Pants", "Apparel—Uniform Shirts", etc.). The contents of the consolidation entry reference field 114 identify a system generated consolidation entry reference (e.g., a consolidation entry number or an iB#) referencing the particular basic type consolidation entry 100-1 of the particular basic type product it defines. For example, the system 50 generates the consolidation entry number or iB# (e.g., "B-AUP-3399841" or "B-AUP-3399872", etc.) for the consolidation entry reference field 114. The consolidation entry number or iB# within the consolidation entry reference field 114 references the particular consolidation entry 100-1 of the particular product it defines. It does not reference any attribute characteristics permutation of the product. For example, in the present case, the iB# within the consolidation entry reference field 114 references the consolidation entry 100-1 of the particular basic type product it defines, but does not reference any particular attribute characteristics configuration of the product, as defined by the attribute families 138 or 'cost neutral' attribute values 140.

The contents of the name field 116 identify a name for the particular product being defined (e.g., "Uniform Pant", "Uniform Shirt", etc.) by the particular consolidation entry 100-1. The contents of the description field 118 identify a description for the particular product (e.g., Police Uniform Trouser", "Police Uniform Shirt", etc.) being defined by the particular consolidation entry 100-1. The contents of the source field 120 identify a source for the particular product being defined by the particular consolidation entry 100-1. The contents of the source reference field 122 identify the product reference used by a source for the particular product being defined by the particular consolidation entry 100-1. The contents of the unit field 124 identify a quantity of measure for the particular product being defined (e.g., an amount to be sold, purchased, stocked, transferred, etc.) by the particular consolidation entry 100-1.

The contents of the SSRP field 128 identify a source (e.g., manufacturer) suggested retail price (SSRP) for the particular product being defined by the particular consolidation entry 100-1. For example, the SSRP represents a suggested retail price for the product as set by either the enterprise as source, or an external source for the product (e.g., a supplier to the enterprise). The contents of the interim cost field 126 identify an interim or transitional cost for the particular product being defined by the particular consolidation entry 100-1. For example, the interim cost represents a calculating cost factor for the product as set by an agreement between the enterprise and a product source. The contents of the standard buy cost field 130 identify the enterprise's standard or monetary value-default purchase cost (e.g., standard buy cost) from a source, for the particular product being defined by the particular consolidation entry 100-1. The contents of the standard sell price field 132 identify the enterprise's standard or monetary value-default selling price (e.g., standard sell price) to a customer, for the particular product being defined by the particular consolidation entry 100-1. The contents of each applied buy quote field 134 identify an applied buy quote (e.g., a purchase contract number and an assigned special or negotiated cost for the product under that purchase contract number, etc.) for the particular product. The contents of each applied sell quote field 136 identify an applied sell quote (e.g., a sales contract number and an assigned special or negotiated price for the product under that sales contract number, etc.) for the particular product.

The contents of the .SG Graphic field 142 include an identifier for particular graphical information associated with the basic type product. In one arrangement, the contents of the .SG Graphic field 142 is a pointer or directory/file pathway to a graphical representation for the product (e.g., a scanned pictorial representation of the product in a bitmap, JPEG, computer generated or similar form or a computer aided drawing {CAD} representation of the product) defined by the particular consolidation entry 100-1. The contents of the .SG Text field 144 identify particular descriptive text for the product (e.g., a specifications-inclusive text/table description of the product in a file bitmap, JPEG, or a computer generated or similar form) defined by the particular consolidation entry 100-1. The contents of the grafix files field 146 identify other descriptive files for the product (e.g., additional pictures, text, marketing documents, etc. for the product) defined by the particular consolidation entry 100-1.

The contents of each attribute family field 138 identify an attribute family (e.g., color, waist, or inseam for pants) for the product defined by the particular consolidation entry 100-1. The contents of each attribute value field 140 identify a 'cost neutral' attribute value (e.g., 30-inch, 32-inch, and 34-inch waist sizes for the pants) for an associated attribute family 138 for the product defined by the particular consolidation entry 100-1.

Figure 4:
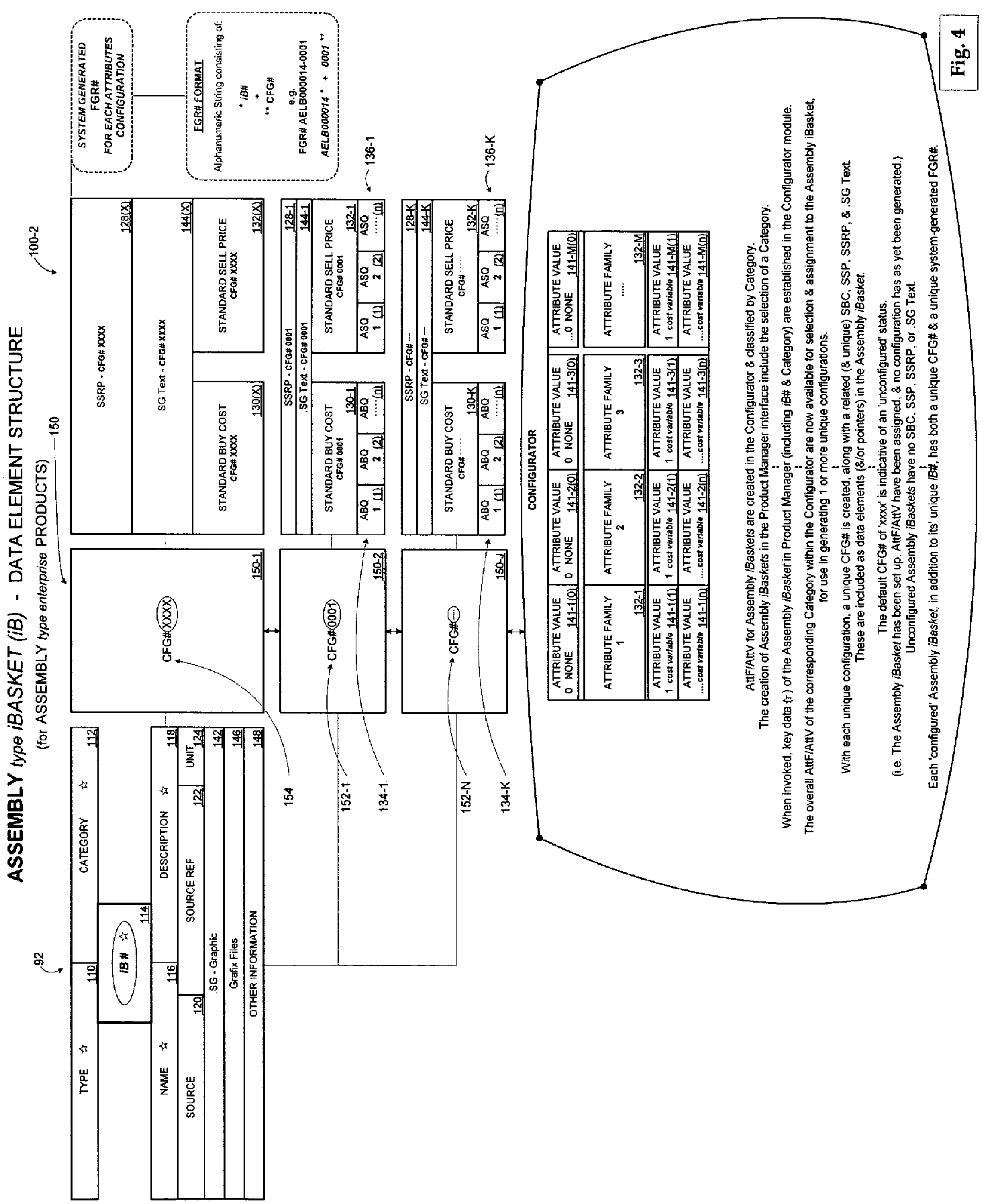
FIG. 4 is a block diagram of the data elements which form an assembly type consolidation entry as used by the computerized resource planning system of FIG. 1.

FIG. 4 shows the layout for the assembly type data format 92 for creation of an assembly type consolidation entry 100-2. The assembly type data format 92 includes a type field 110, a product category field 112, a consolidation entry reference field 114, a name field 116, a description field 118, a source field 120, a source reference field 122, a unit field 124, an .SG graphic field 142, and other fields 148. The operations of these fields are similar to those described above in connection with the basic type data format 90 (FIG. 3).

As indicated by the assembly type data format 92 of FIG. 4, and by contrast to the basic type data format 90, the assembly type data format 92 is well-suited for representing individual products (e.g., such as an emergency vehicle light bar assembly) within an enterprise, where each individual product can include an unlimited number of attribute characteristics (e.g., an unlimited number of associated sequenced attribute families each with specifically included, referenced, cost defined, and selectable attribute values). Additionally, each of the unlimited number of associated sequenced attribute families which can be included in the represented individual product, in turn can include 'cost variable' attribute values (e.g., attribute values with an assigned variable cost), or 'cost neutral' attribute values, or 'cost variable' attribute values and 'cost variable' attribute values; thereby allowing for virtually unlimited attribute configurations of the product, each possibly with a different total variable cost, one from the other. The assembly type data format 92 allows an enterprise to represent an assembly product within the system 50 as a single assembly type consolidation entry 100-2 without having to list or track every possible attribute characteristics permutation (e.g., every possible attributes configuration) of the product.

An assembly type consolidation entry 100-2, created in the assembly type data format 92 allows an enterprise to represent an assembly type product within the system 50 in an 'unconfigured' state as well as a 'configured' state. For example, when an enterprise creates an assembly type consolidation entry 100-2 for a particular assembly type product within the system 50, it associates particular sequenced attribute families 138, and their respective and included 'cost variable' attribute values, or 'cost neutral' attribute values, or 'cost variable' attribute values and 'cost variable' attribute values (e.g., uniquely grouped by and included in each of the attribute families 138) with the particular assembly type consolidation entry 100-2. Further, it does not make any selection from the 'cost variable' attribute values 141 or 'cost neutral' attribute values 140 included in each of the particular attribute families 138, which have been associated with the particular assembly type consolidation entry 100-2. These two actions, taken by the enterprise at the time of 'set-up' of the particular assembly type consolidation entry 100-2 within the system 50, define the particular assembly type configurable transactable consolidation entry 100-2 as having an 'unconfigured' status. Finally, each subsequent and particular selection (e.g., attributes configuration) of 'cost variable' attribute values 141 or 'cost neutral' attribute values 140, from the attribute families 138 as associated with a particular assembly type consolidation entry 100-2, will define the particular assembly type configurable transactable consolidation entry 100-2 as having a 'configured' status (e.g., the number of attribute configurations being either 'limited' or 'unlimited', as determined by the enterprise or a user).

FIG. 4 illustrates the assembly type data format 92 as further including one or more configuration fields 150-1, 150-2, . . . , 150-J (collectively configuration fields 150). Each configuration field 150 has an associated SSRP field 128, a standard buy cost field 130, a standard sell price field 132, and a .SG Text field 144. Content within the configuration field 150 identifies the assembly type consolidation entry 100-2 as representing either a 'configured' assembly or an 'unconfigured' assembly within the system 50.

When configuration fields 150, such as configuration fields 150-2, . . . , 150-J, represent an assembly type product in a 'configured' state, they include 'configured' text content 152-1, . . . , 152-N (generally 'configured' text content 152). For example, the configured text content 152-1 of configuration field 150-2 includes the 'configured' text content "0001". The 'configured' text content 152-1 of the configuration field 150-2 indicates that the particular assembly type product, represented by consolidation entry 100-2, has a particular 'selection' (e.g., attributes configuration) of 'cost variable' attribute values 141, or 'cost neutral' attribute values 140, or 'cost variable' attribute values 141 and 'cost neutral' attribute values 140 (e.g., 'cost variable' attribute values 141-1{1-*n*} through 141-M{1-*n*}), as individually grouped, specifically included in, referenced, and then finally selected from each of the unlimited number of attribute families 138 (e.g., attribute families 138-1 through 138-M) which were associated with the particular consolidation entry 100-2 when it was created in the system 50.

The assembly type data format 92 having the 'configured' text content 152-1, 152-N, therefore, indicates that the consolidation entry 100-2 can represent either a limited or an unlimited number of configurations of an assembly type product within the system 50.

In the case where the assembly type consolidation entry 100-2 represents a 'configured' assembly type product (e.g., represented by configuration entry fields 150-2, . . . , 150-J including 'configured' text content 152-1, . . . , 152-N), the SSRP fields 128-1 through 128-K, the standard buy cost fields 130-1 through 130-K, the standard sell price fields 132-1 through 132-K, the .SG Text fields 144-1 through 144-K, the set of applied buy quote fields 134-1{1-*n*} through 134-K{1-*n*}, the set of applied sell quote fields 136-1{1-*n*} through 136-K{1-*n*}, include information related to the corresponding configuration fields 150-2, . . . , 150-J (e.g., including 'configured' text content 152-1, . . . , 152-N). For example, the SSRP field 128-1 includes a text string representing a suggested retail price for the assembly type product having the configuration field 150-2, the standard buy cost field 130-1 includes a text string representing a monetary value-default purchase cost for the assembly type product having the configuration field 150-2, the standard sell price field 132-1 includes a text string representing a monetary value-default selling price for the assembly type product having the configuration field 150-2, the .SG Text field 144-1 includes a unique identifying descriptive (e.g., a specifications-inclusive text/table description, etc.), the set of applied buy quote fields 134-1{1-*n*} through 134-K{1-*n*}, include text strings representing applied buy quotes (e.g., a purchase contract number and an assigned special or negotiated cost for the product, under that purchase contract number, etc.), the set of applied sell quote fields 136-1{1-*n*} through 136-K{1-*n*}, include text strings representing applied sell quotes (e.g., a sales contract number and an assigned special or negotiated price for the product under that sales contract number, etc.) of the assembly type product having the configuration field 150-2. That is, the enterprise or an external third party or configurator has defined (e.g., selected) a particular selection (e.g., attributes configuration) from those 'cost variable' attribute values 141, or 'cost neutral' attribute values 140, or 'cost variable' attribute values 141 and 'cost neutral' attribute values 140 included in each of the attribute families 138, which are associated with the particular consolidation entry 100-2.

When a configuration field 150, such as configuration field 150-1 represents an assembly type product in an 'unconfigured' state, the configuration field 150-1 includes 'unconfigured' text content 154 (e.g., text that represents the assembly type product in an 'unconfigured' state). For example, the 'unconfigured' text content 154 of configuration field 150-1 includes the 'unconfigured' text content "XXXX". The 'unconfigured' text content 154 of the configuration field 150-1 indicates that the particular assembly type product, represented by the consolidation entry 100-2, has a particular selection (e.g., attributes configuration) of 'no selection' of any of the 'cost variable' attribute values 141, or 'cost neutral' attribute values 140, or 'cost variable' attribute values 141 and 'cost neutral' attribute values 140 (e.g., 'cost variable' attribute values 141-1{1-*n*} through 141-M{1-*n*}, or 'cost neutral' attribute values 140-1{1-*n*} through 140-M{1-*n*}, or 'cost variable' attribute values 141-1 {1-*n*} through 141-M{1-*n*} and 'cost neutral' attribute values 140-1{1-*n*} through 140-M{1-*n*}), as individually grouped, included in, and then finally drawn from each of the unlimited number of sequenced attribute families 138 (i.e., attribute families 138-1 through 138-M) which were associated with the particular consolidation entry 100-2 when it was created in the system 50.

In the case where the consolidation entry 100-2 represents an 'unconfigured' assembly type product, the SSRP field 128(X) includes no text string representing a suggested retail price for the assembly type product having the configuration field 150-1, the standard buy cost field 130(X) includes no text string representing a monetary value-default purchase cost for the assembly type product having the configuration field 150-1, the standard sell price field 132(X) includes no text string representing a monetary value-default selling price for the assembly type product having the configuration field 150-1, and the .SG Text field 144(X) includes no unique identifying descriptive (e.g., a specifications-inclusive text/table description, etc.) of the assembly type product having the configuration field 150-1. That is, neither the enterprise nor an external third party or configurator has made any selection (e.g., defined an attributes configuration) from those 'cost variable' attribute values 141, or 'cost neutral' attribute values 140, or 'cost variable' attribute values 141 and 'cost neutral' attribute values 140, included in each of the attribute families 138 which are associated with the particular consolidation entry 100-2.

An 'unconfigured' text content 154 in a configuration entry 150, of a particular assembly type consolidation entry 100-2, created utilizing the assembly type data format 92, therefore indicates that the particular assembly type consolidation entry 100-2 (e.g., with an 'unconfigured' text content 154 within the configuration entry 150), by definition, has an 'unconfigured' status (e.g., no selected attributes configuration). And finally, by providing for an unlimited number of selections from the 'cost variable' attribute values 141, or 'cost neutral' attribute values 140, or cost variable' attribute values 141 and 'cost neutral' attribute values 140, included in each of the unlimited number of sequenced attribute families 138 associated with the same particular consolidation entry 100-2 when created in the system 50, the assembly type data format 92 enables the creation (e.g., selection) of any, all, or none of the possible attributes configurations of the particular assembly type product within the system 50.

Figure 5:
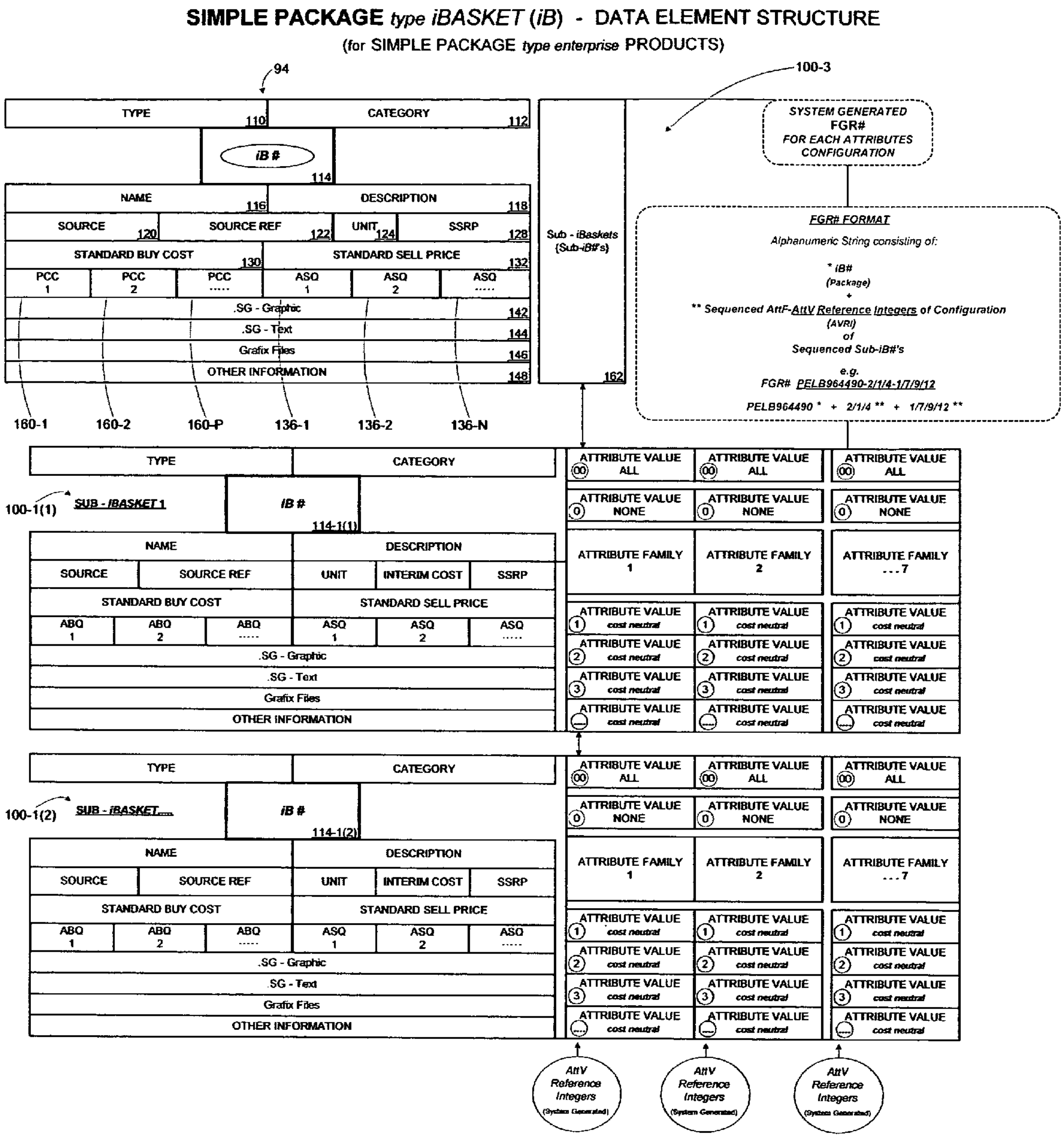
FIG. 5 is a block diagram of the data elements which form a simple package type consolidation entry as used by the computerized resource planning system of FIG. 1.

FIG. 5 shows the layout for the simple package type data format 94 for creation of a simple package type consolidation entry 100-3. The simple package type data format 94 includes a type field 110, a product category field 112, a consolidation entry reference field 114, a name field 116, a description field 118, a source field 120, a source reference field 122, a unit field 124, an SSRP field 128, a standard buy cost field 130, a standard sell price field 132, a set of applied sell quote fields 136-1, 136-2, 136-N (collectively, applied sell quote fields 136), a .SG Graphic field 142, a .SG Text field 144, a grafix files field 146, and other fields 148. The operations of these fields are similar to those described above in connection with the basic type data format 90. The simple package type data format 94 also includes a set of package cost configuration fields 160-1, 160-2, 160-P, (collectively package cost configuration fields 160). The package cost configuration fields 160, in one arrangement, operate similarly to the applied buy quote fields 134 as described above in connection with the basic type data format 90.

The simple package type data format 94 also includes a sub-consolidation entry field 162. As indicated above, a simple package type product includes a combination of two or more basic type products. As such, the content of the sub-consolidation entry field 162 lists each of the basic type consolidation entries 100-1 (e.g., 100-1 {1}, 100-1 {2}, . . . 100-1{n}, representing each of the basic type products) that form the simple package type consolidation entry 100-3. For example, as illustrated in FIG. 5, the simple package type consolidation entry 100-3 has a first basic type consolidation entry 100-1(1) and a second basic type consolidation entry 100-1(2). The first basic type consolidation entry 100-1(1) and second basic type consolidation entry 100-1(2) form the content of the sub-consolidation entry field 162. Furthermore, the content (e.g., the iB#) of each consolidation entry reference field 114-1(1), 114-1(2) identifies each respective basic type consolidation entry 100-1(1), 100-1(2) as a sub-consolidation entry within the sub-consolidation entry field 162.

Figure 6:
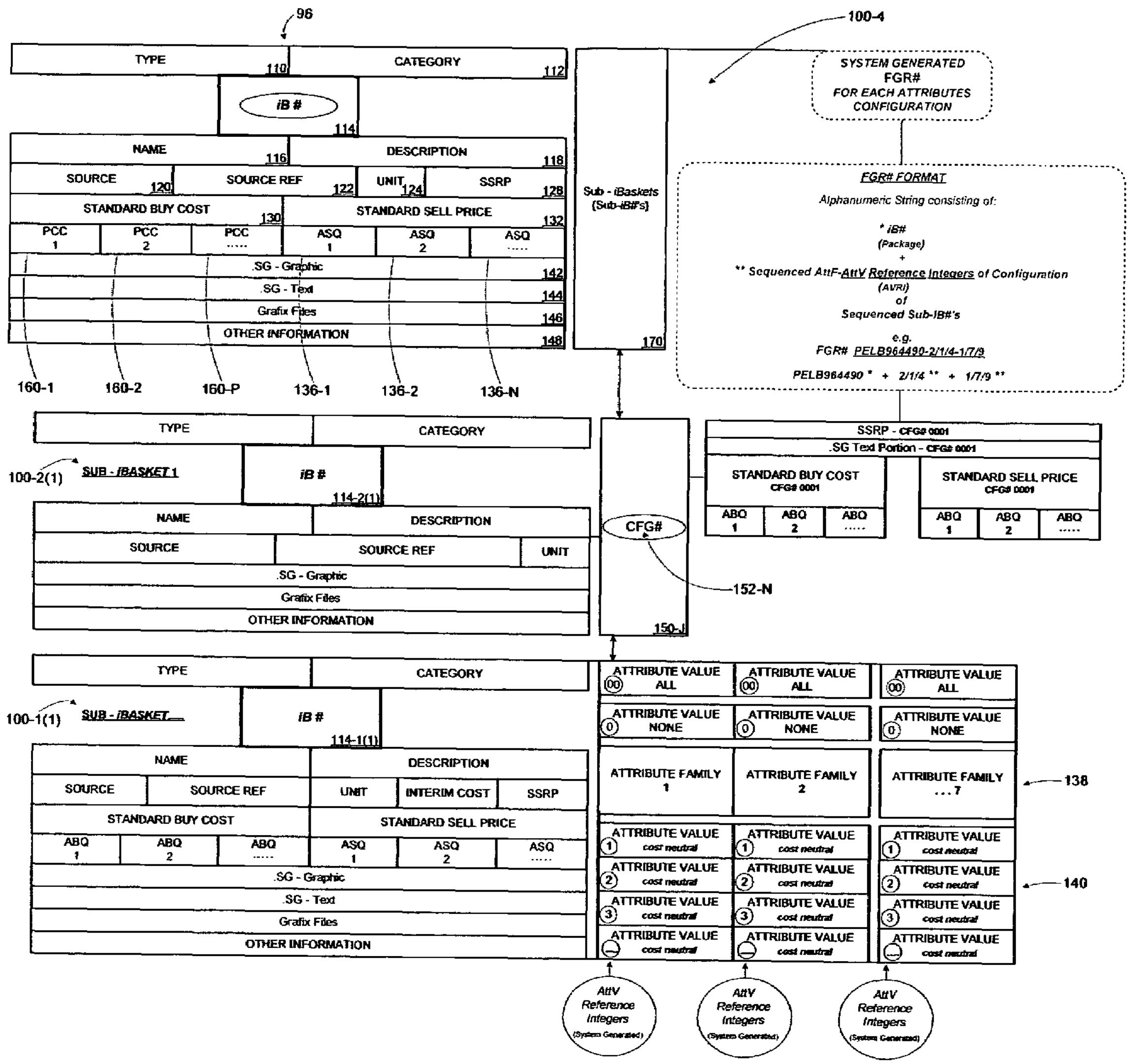
FIG. 6 is a block diagram of the data elements which form a diverse package type consolidation entry as used by the computerized resource planning system of FIG. 1.

FIG. 6 shows the layout for the diverse package type data format 96 for creation of a diverse package type consolidation entry 100-4. The diverse package type data format 96 includes a type field 110, a product category field 112, a consolidation entry reference field 114, a name field 116, a description field 118, a source field 120, a source reference field 122, a units field 124, an SSRP field 128, a standard buy cost field 130, a standard sell price field 132, a set of package cost configuration fields 160-1, 160-2, 160-P, (collectively package cost configuration field 160), a set of applied sell quote fields 136-1, 136-2, 136-N (collectively, applied sell quote fields 136), a .SG Graphic field 142, a .SG Text field 144, a grafix files field 146, and other fields 148. The operations of these fields are similar to those described above in connection with the basic type data format 90 and the simple package type data format 94.

The diverse package type data format 96 also includes a sub-consolidation entry field 170. As indicated above, the diverse package type data format 96 is well suited for representing products having i) an assembly type product and ii) at least (e.g., "bundled" with) one other product which is either a basic type product or another assembly type product. Further, it should be understood that the assembly type configurable transactable consolidation entry, representing any assembly type product included in a diverse package type product is included therein reflecting only a 'configured status' for each inclusion of the assembly type configurable transactable consolidation entry, and in turn referencing only one attributes configuration for each inclusion of the assembly type configurable transactable consolidation entry as a sub-consolidation entry. As such, the content of the sub-consolidation entry field 170 lists each of the "configured status" assembly type consolidation entries 100-2 and/or each of the basic type consolidation entries 100-1 that form the diverse package type consolidation entry 100-4. For example, as illustrated in FIG. 6, the diverse package type consolidation entry 100-4 includes one "configured status" assembly type consolidation entry 100-2(1), and one basic type consolidation entry 100-1(1). The "configured status" assembly type consolidation entry 100-2(1) and the basic type consolidation entry 100-1(1) form the content of the sub-consolidation entry field 170. Furthermore, the content (e.g., the iB#) of each consolidation entry reference field 114-2(1), 114-1(1) identifies the "configured status" assembly type consolidation entry 100-2(1) and the basic type consolidation entry 100-1(1) as sub-consolidation entries within the sub-consolidation entry field 170.

It should be understood that a variety of data types are suitable for use for each field of the basic format 90, the assembly format 92, the simple package type data format 94, or the diverse package type data format 96. Furthermore, it should be understood that the contents are capable of being stored in character string form (e.g., ASCII, alphanumeric text, etc.), numerical form (integer, real number, floating point, etc.), unique values, pointers to other memory locations containing the actual information or other pointers, combinations thereof, etc.

A summary of the basic type consolidation entry 100-1, assembly type consolidation entry 100-2, simple package type consolidation entry 100-3, and diverse package type consolidation entry 100-4, as representative of basic, assembly, simple package, and diverse package product types respectively is illustrated in FIGS. 44 and 45.

Attribute Families and Attribute Values

Within the system 50, an attribute family 138 is an attribute characteristic associated with an enterprise product. Within the system 50, an attribute family 138 is represented by a name, description, and group classification, and after establishment in the system 50, is available for sequenced association with various and particular enterprise products (e.g., for the uniform pant product of FIG. 2, the associated sequenced attribute families are color, waist, and inseam). Particular referenced, cost defined, and selectable attribute values are included in each particular sequenced attribute family 138 associated with a particular enterprise product, and are represented within the particular sequenced attribute family 138, by a user-selectable list of the unique name and description of each value. Generally, the referenced, cost defined, and selectable attribute values included in each particular sequenced attribute family 138 associated with a particular enterprise product relate to and are drawn from the name and description list of all the available attribute values for a specific attribute family in the system 50. There are two cost definition types of attribute value; an attribute value is either i) a 'cost neutral' attribute value 140, or ii) a 'cost variable' attribute value 141. Basic type enterprise products, for example, have attribute families 138 inclusive of only 'cost neutral' attribute values 140. A 'cost neutral' attribute value 140 selection (e.g., the selection of a 30-inch, 32-inch, or 34-inch waist size for the uniform pant product of FIG. 2) has no effect on the transactional value of a basic type product as defined by a basic type consolidation entry 100-1. Assembly type enterprise products, for example, have attribute families 138 that are inclusive of either i) only 'cost variable' attribute values 141, or ii) only 'cost neutral' attribute values 140 or iii) a mix of both 'cost neutral' attribute values 140 and 'cost variable' attribute values 141.

Figure 7:
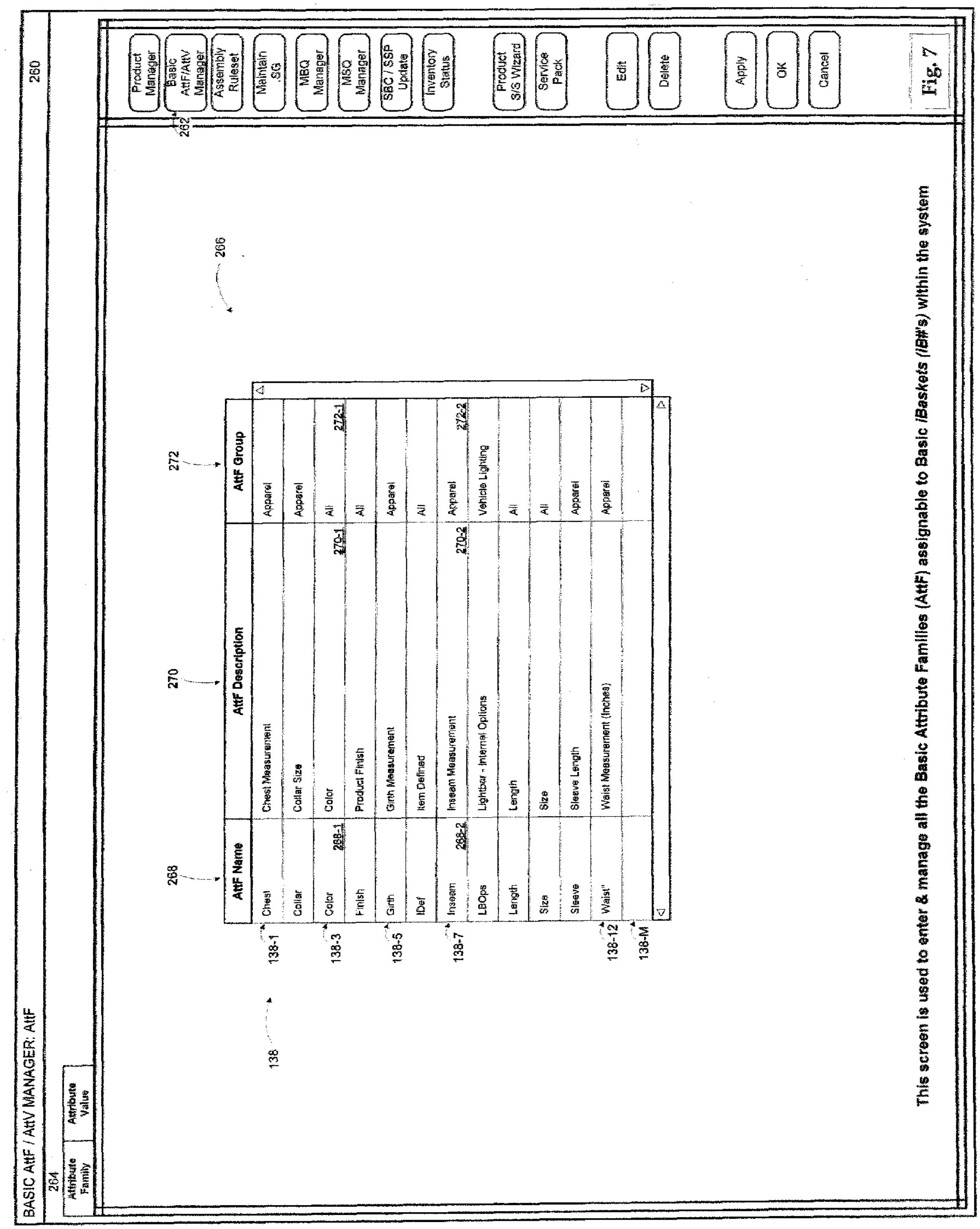
FIG. 7 illustrates a basic attribute family manager interface as used by the computerized resource planning system of FIG. 1.
Figure 8:
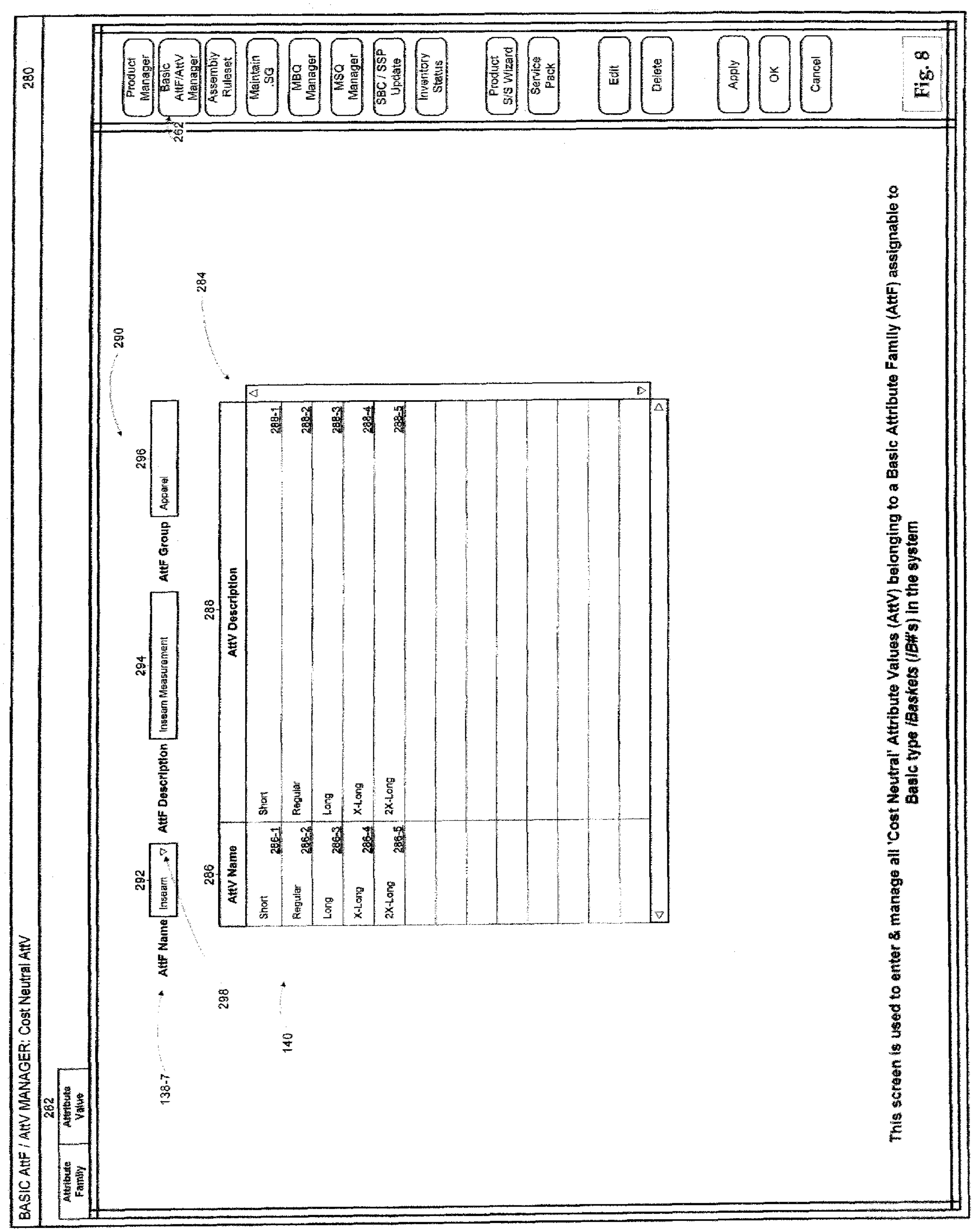
FIG. 8 illustrates a basic 'cost neutral' attribute value manager interface as used by the computerized resource planning system of FIG. 1.

In one arrangement, before a user defines a basic type product within the system 50 by creating a basic type consolidation entry 100-1 and populating the fields of that basic type consolidation entry 100-1 with information, certain features of the system 50 are preferably set up or pre-configured to enable the user to conveniently select specific criteria of these features during product definition. In particular, to define basic type products using basic type consolidation entries 100-1 within the system 50, a user first establishes or defines attribute families 138, each with included user-selectable 'cost neutral' attribute values 140, and each within the system 50. For example, to define attribute families 138 with included user-selectable 'cost neutral' attribute values 140 for a basic type product within the system 50, a user selects a basic attribute family/attribute value manager (e.g., basic AttF/AttV manager) entry 262 on a graphical user interface (GUI) 97 provided to the user by the system 50. FIGS. 7 and 8 illustrate examples of particular GUI dialog boxes (e.g., displayed by the system 50 when the user selects the basic attribute family/attribute value manager entry 262) that allow a user to establish or define attribute families 138 and their included user-selectable 'cost neutral' attribute values 140 within the system 50.

It should be understood that the system 50 will be explained from time to time as being used in the context of a clothing distributor (e.g., police uniforms and accessories) for illustration purposes. The system 50 is well suited for a variety of other industries and enterprises as well including any company or operation dealing with products.

FIG. 7 illustrates an attribute family manager interface 260 that allows a user to enter and manage attribute families 138 assignable to basic type consolidation entries 100-1 within the system 50. To access the attribute family interface 260, the user selects the basic AttF/AttV manager entry 262 on a graphical user interface (GUI) 97 and selects an attribute family entry 264 to display the attribute family manager interface 260.

The attribute family manager interface 260 includes an attribute family manager table 266 that lists the elements that form or define an attribute family 138. The attribute family manager table 266 includes attribute family name fields 268, attribute family description fields 270, and attribute family group fields 272. The attribute family name fields 268 indicate a characteristic of a product, such as color, finish, or size of a product. The attribute family description fields 270 include content that further describes the characteristic of the corresponding attribute family name field. The attribute family group fields 272 include content which indicates an association between a particular product group and the attribute family indicated in the corresponding attribute family name field 268. For example, the content "All" within the attribute family group field 272-1, indicates that the content of the attribute family name field 268-1, "Color", may be applied to any and all product groups (e.g., any and all product groups may be associated with the attribute family "Color").

In one arrangement, the user manually enters content within the attribute family name field 268, attribute family description field 270, and the attribute family group field 272 to define an attribute family 138. As illustrated, the attribute family manager table 266 includes multiple attribute families 138-1 through 138-M (given generally as attribute family entries 138). During operation, the user selects particular attribute families 138 from the attribute family manager table 266 when, for example, defining a basic type consolidation entry 100-1 within the system 50, as will be described below.

FIG. 8 illustrates an attribute value manager interface 280 that allows a user to enter and manage those particular user-selectable 'cost neutral' attribute values 140 included in particular attribute families 138 defined within the system 50. To access the interface 280, the user selects the basic AttF/AttV entry 262 on GUI 97 (also see FIG. 1) and selects an attribute value entry 282 to display the attribute value manager interface 280.

The attribute value manager interface 280 displays an attribute value manager table 284 and attribute family fields 290. The attribute value manager table 284 includes attribute value name fields 286 and attribute value description fields 288 (e.g., descriptors of the associated attribute value name fields 286) for a particular, user-selected attribute family 138. The attribute family fields 290 include a name field 292, a description field 294, and a group field 296 of the particular, user-selected attribute family 138.

During operation, a user selects an attribute family 138 from the attribute family display 290 (e.g., using a menu icon 298 associated with the attribute family display 290). Activation of the menu icon 298, in one arrangement, causes the resource planning application 62 to display the attribute families 138 listed within the attribute family table 266 (e.g., as shown in FIG. 7) to the user. In response to the user selecting an attribute family 138, such as attribute family 138-7, the resource planning application 62 provides, as default, content from the name 268-2, description 270-2 and group 272-2 fields of the attribute family table 266 within the name field 292, description field 294 and group field 296 of the attribute family fields 290.

After selecting a particular attribute family 138-7, the user enters or inputs, within the table 284, those possible attribute value names 286 associated with the attribute family (e.g., with the "inseam" attribute family entry 138-7) along with associated attribute value descriptions 288. For example, the user enters, within the attribute value name fields 286, the attribute value names short 286-1, regular 286-2, long 286-3, x-long 286-4, and 2×-long 286-5 associated with the "inseam" attribute family entry 138-7. The user also enters within the corresponding attribute description fields 288, the attribute value descriptions short 288-1, regular 288-2, long 288-3, x-long 288-4, and 2×-long 288-5 associated with the "inseam" attribute family 138-7.

Finally, it should be understood, that during operation, the resource planning application 62, provides as default values in the attribute family fields 290 (e.g., as illustrated in FIG. 8), those values representing an 'active' attribute family 138, currently being established (e.g., as shown in FIG. 7) in the attribute family table 266 within the system 50.

Defining Consolidation Entries

When a user enters products into the system 50, the user defines a consolidation entry 100 associated with the product. To define consolidation entries in the system 50, the user selects a product manager entry from the GUI 97, provided to the user by the system 50, to display a product manager interface.

Figure 9:
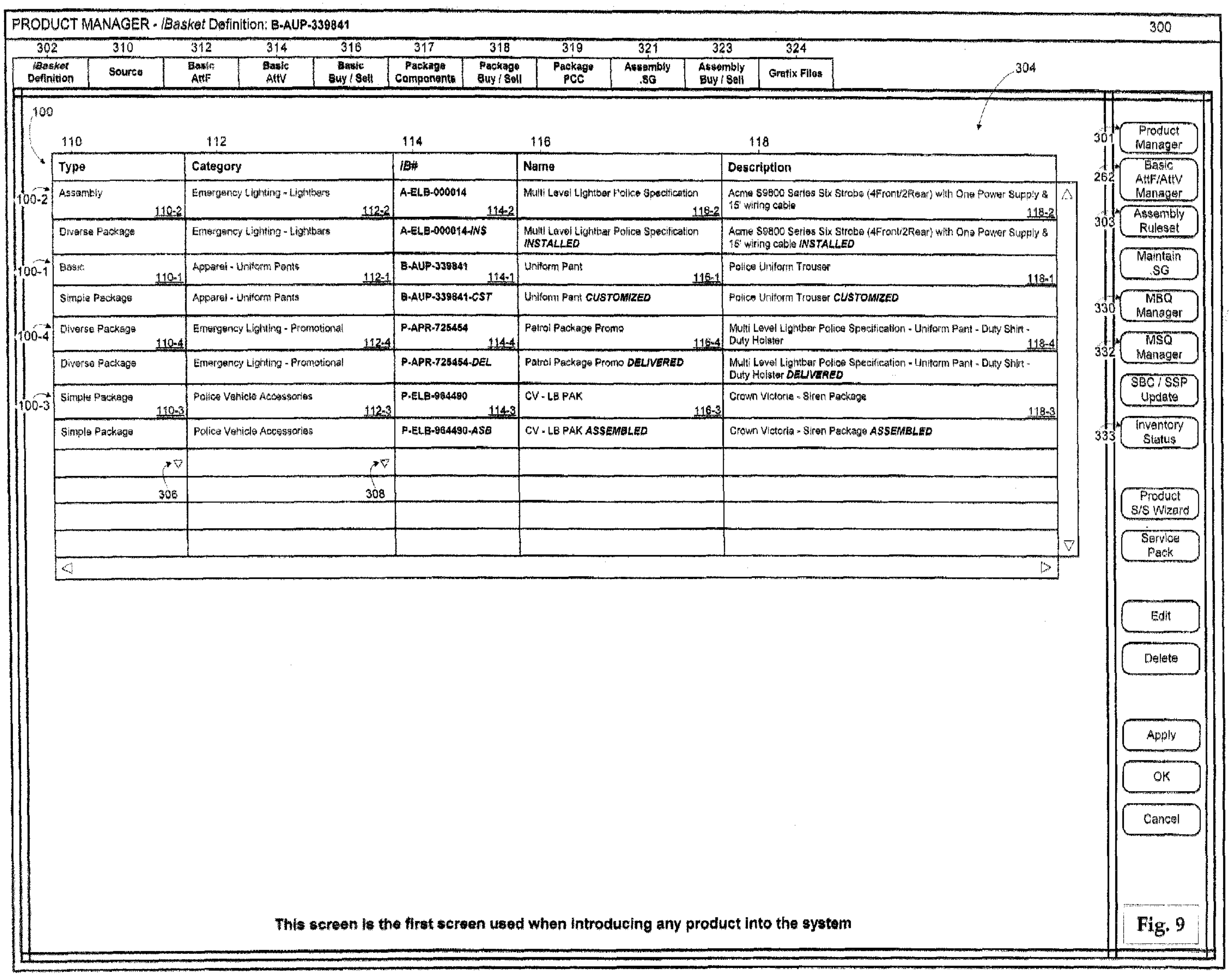
FIG. 9 illustrates a consolidation entry definition interface as used by the computerized resource planning system of FIG. 1.

FIG. 9 shows a consolidation entry definition interface 300 of the GUI 97 that is suitable for use by the invention. When the user activates a Product Manager entry 301 and activates an "iBasket Definition" entry 302, the resource planning application 62 presents to the user the consolidation entry definition interface 300. The consolidation entry definition interface 300 allows the user to define consolidation entries 100 within the system 50 (e.g., where the consolidation entries 100 represent products transacted by the enterprise).

The consolidation entry definition interface 300 provides a consolidation entry display 304 that allows a user to enter consolidation entry data for a product. The consolidation entry display 304 includes a type field 110, a product category field 112, a consolidation entry reference field 114 (e.g., an iB# field), a name field 116, and a description field 118, as previously described with respect to FIGS. 3 through 6. In one arrangement, the user enters data or content within the type field 110, the product category field 112, the name field 116, and the description field 118 while the system 50 automatically generates and enters a consolidation entry reference (e.g., an iB#) within the consolidation entry reference field 114.

Prior to utilizing the consolidation entry definition interface 300 to define a product within the system 50, the user first determines with which product type to align the product. For example, the user (e.g., a purchasing specialist in the purchasing department 78(2), also see FIG. 1) evaluates the product and assigns the product one of four product types: a basic product type, an assembly product type, a simple package product type, or a diverse package product type. The user then, based upon the product type determination, forms or creates a consolidation entry 100 defining the product within the system 50. The resource planning application 62 directs the user through particular interfaces depending upon the product type selected, as will be described in detail below.

The following describes the interfaces provided by the resource planning application 62 when a user defines for example, a basic type product within the system 50. This description is made generally with reference to FIG. 9.

Assume, for example, the user wishes to define a particular "uniform pant" product within the system 50. Prior to utilizing the consolidation entry definition interface 300, the user determines that the particular "uniform pant" product is best categorized as a basic product type (e.g., an individual product within an enterprise having a limited number of attribute characteristics). The user then utilizes the consolidation entry definition interface 300 provided by the resource planning application 62 to define a basic type consolidation entry 100-1 for a basic type product within the system 50.

Initially, the user indicates the type of product being defined within the system 50 by entering the type information within the type field 110 presented on the consolidation entry display 304. For example, in one arrangement, the user inputs the entry "Basic" within the type field 110-1 for the basic type consolidation entry 100-1 by typing in the word "Basic" within the type field 110-1. In another arrangement, the user inputs the entry "Basic" within the type field 110-1 for the basic type consolidation entry 100-1 by activating a menu icon 306 to provide a list of product types and selecting the entry "Basic" from the list. The user then inputs the category of the product within the category field 112-1. For example, the user inputs the entry "Apparel—Uniform Pants" within the category field 112-1 for the basic type consolidation entry 100-1 either by typing in the text or selecting the text from a list provided when the user selects a using a menu icon 308.

Based upon the type 110-1 and category 112-1 provided by the user, the resource planning application 62 assigns a consolidation entry reference (e.g., an iB#) to the consolidation entry 100-1, as presented within the consolidation entry reference field 114-1. In the present example, the resource planning application 62 assigns the basic type consolidation entry 100-1 a basic type consolidation entry reference or consolidation entry number (e.g., an iB#) of "B-AUP-339841", as shown in the consolidation entry reference field 114-1.

In one arrangement, the resource planning application 62 provides the consolidation entry reference in a coded format to allow a user to determine the type and category of a particular consolidation entry 100 without having any particular information about the product. In one arrangement, the first character of the consolidation entry reference field 114 is an abbreviation for the type of product defined by the consolidation entry 100. In the present example, the first character "B" of the consolidation entry reference 114-1 indicates that the product is a basic type product. Additionally, the following three characters are an abbreviation for the category of product defined by the consolidation entry 100. Once again, in the present example, the following three characters "AUP", indicate that the product category is Apparel—Uniform Pants. The remaining characters of the consolidation entry reference are numbers that represent the sequential entry position of the defined type and category of the particular consolidation entry 100. For example, the number 339841 indicates that the consolidation entry 100-1 is the 339841$^{st}$ consolidation entry of that particular type and category (e.g., "B-AUP" for "basic" type and "apparel uniform pants" category) defined in the system 50.

When defining the basic type consolidation entry 100-1 within the system 50, the user also enters content within the name 116-1 and description 118-1 fields. For example, the name field 116-1 identifies the name for the basic type product as "Uniform Pant" while the description field 118-1 describes the basic type product as a "Police Uniform Trouser". Completion of the type 110, category, 112, name 116 and description 118 fields, by the user, defines a consolidation entry 100 (e.g., basic type consolidation entry 100-1) within the system 50.

After a user defines a consolidation entry 100 within the system 50, the resource planning application 62 then directs the user to enter additional information related to the consolidation entry 100 of the product. In the case of a basic type product, for example, the resource planning application 62 allows user activation (e.g., through default "highlights") of a source entry 310, a basic attribute family entry 312, a basic attribute value entry 314, and a basic buy/sell entry 316, etc., on the consolidation entry definition interface 300, thereby allowing the user to access the interfaces associated with each respective entry.

Figure 10:
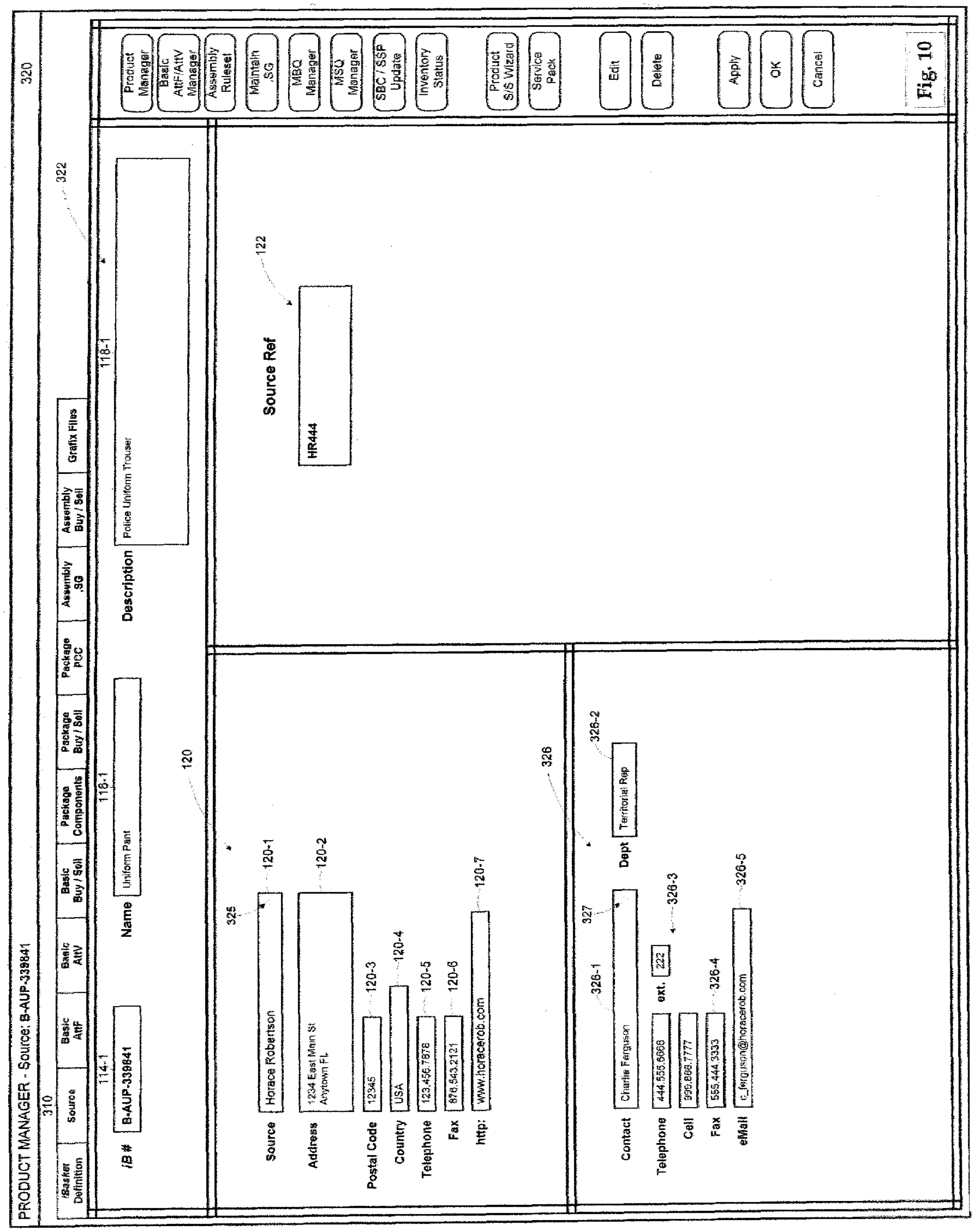
FIG. 10 illustrates a source entry interface as used by the computerized resource planning system of FIG. 1.

FIG. 10 illustrates a source entry interface 320 of the GUI 97 that allows a user to enter data or information relating to a source of the product, as defined by a consolidation entry 100 in the system 50. In one arrangement, the resource planning application 62 provides the source entry interface 320 to the user in response to the user activating the source entry 310. The source entry interface 320 includes a consolidation entry display 322, a source display 120, a contact identifier 326, and a source reference field 122.

The consolidation entry display 322 identifies a particular consolidation entry 100 associated with the currently displayed source entry interface 320. For example, the consolidation entry display 322 includes the content of the consolidation entry reference field 114-1, the name field 116-1 and the description field 118-1 of the consolidation entry 100-1, as illustrated in FIG. 9.

Returning to FIG. 10, the source display 120 of the GUI 97 identifies a source (e.g., external to the enterprise) of the particular basic product as identified by the consolidation entry 100-1. For example, the source field 120 includes a source name field 120-1, an address field 120-2, a postal code field 120-3, a country field 120-4, a telephone number field 120-5, a fax number field 120-6, and website field 120-7. In one arrangement, the user manually enters data into the respective fields 120-1 through 120-7. In another arrangement, the user activates a menu icon 325 associated with the source name field 120-1 and selects a source name from an established list of source names. Upon selection of a particular source name from the established list, the resource planning application 62 provides, as a default, the associated data within the remaining fields 120-2 through 120-7.

The source contact display fields 326 identify a contact and associated contact information related to the source of the product. In one arrangement, the fields 326 include a contact name field 326-1, a department field 326-2, phone number fields 326-3, a fax number field 326-4 and an email field 326-5. In one arrangement, the user manually enters data into the respective fields 326-1 through 326-5. In another arrangement, the user activates a menu icon 325 associated with the contact name field 326-1 and selects a name, such as a source representative name from an established list of source representatives. Upon selection of a particular name from the established list, the resource planning application 62 provides, as a default, the associated, preconfigured data within the remaining fields 326-2 through 326-5. The source reference field 122 includes a source reference (e.g., number) for the product, provided for in one of two manners; either i) where the product is already defined by a previously established consolidation entry 100; or ii) where the entry is completed by the user to include the source reference (e.g., number, text, alphanumeric, etc. . . . ) for the product represented by a consolidation entry 100 currently being created within the system 50.

Figure 11:
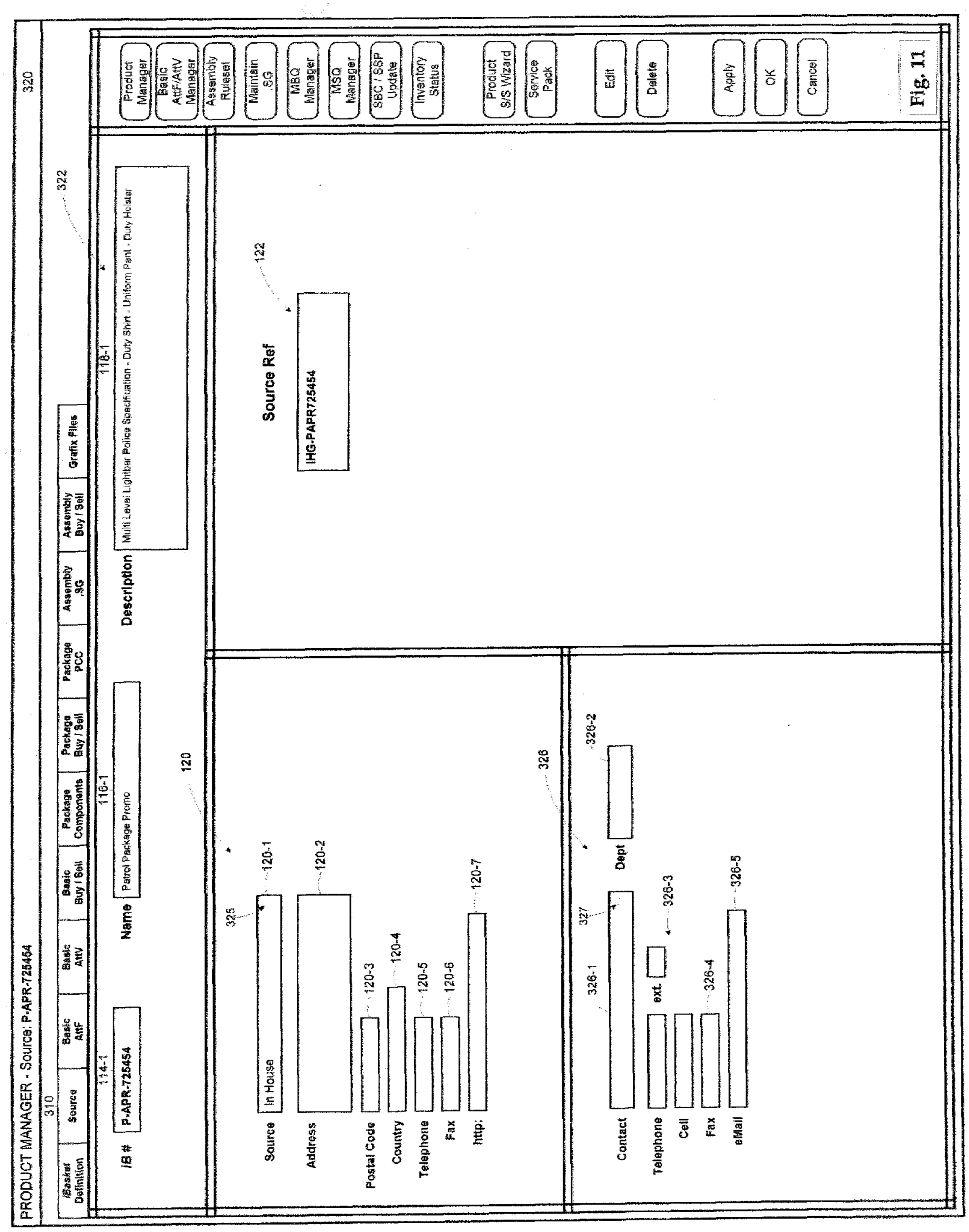
FIG. 11 illustrates an arrangement of the source entry interface of FIG. 10.

FIG. 11 illustrates an arrangement of the source entry interface 320 where the source entry interface 320 includes the consolidation entry display 322, the source identifier display 120, the source contact display 326, and the source reference display 328, as described above. The operations of these displays are similar to those described above in connection with FIG. 10. FIG. 11, however, illustrates an arrangement of the source field 120 where the source name field 120-1 indicates an in-house source for the product (e.g., within the enterprise). When a user enters or selects using the menu icon 325 the source 120-1 as "In house", the resource planning application 62, in one arrangement, limits user access to the remaining fields 120-2 through 120-7 within the source field 120 and limits user access to the fields 326-1 through 326-5 within the source contact display 326. Here too (as in FIG. 10), the source reference field 122 includes a source reference (e.g., number) for the product, provided for in one of two manners; either i) where the product is already defined by a previously established consolidation entry 100; or ii) where the entry is completed by the user to include the source reference (e.g., number) for the product defined by a consolidation entry 100 currently being established within the system 50.

Figure 12:
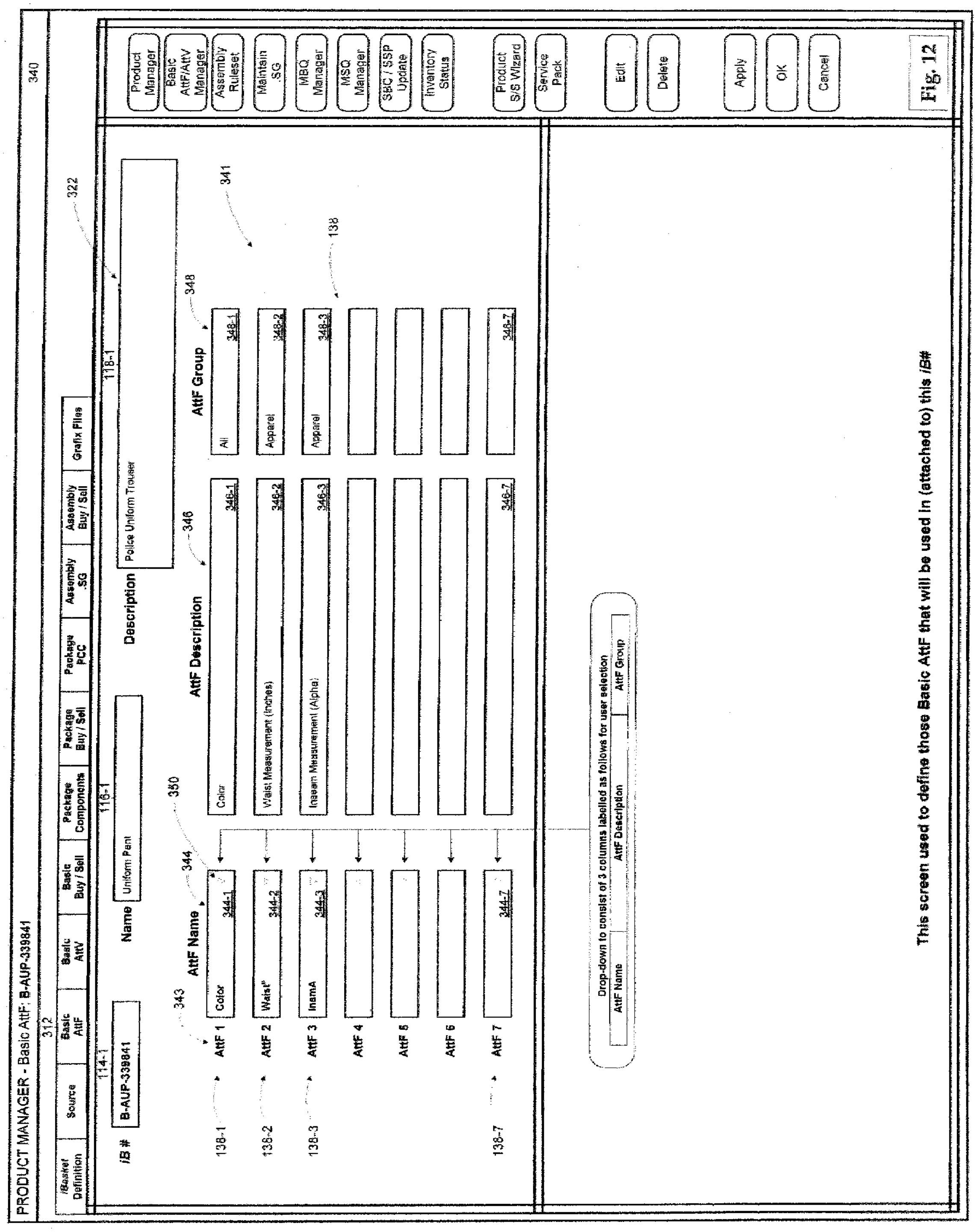
FIG. 12 illustrates a basic attribute family interface as used to assign particular attribute families to a particular basic type consolidation entry by the computerized resource planning system of FIG. 1.

FIG. 12 illustrates a basic attribute family interface 340 of the GUI 97 for a basic type consolidation entry 100-1, that allows a user to assign or associate attribute families 138 to the consolidation entry 100-1, as defined in the system 50, and illustrated in FIG. 9. In one arrangement, the resource planning application 62 provides the basic attribute family interface 340 to the user in response to the user activating the basic attribute family entry 312.

The basic attribute family interface 340 includes a consolidation entry display 322 that provides to the user the active consolidation entry reference within the consolidation entry reference field 114-1 (e.g., iB# "B-AUP-339841"), the name within the name field 116-1 (e.g., Uniform Pant) and the description within the description field 118-1 (e.g., Police Uniform Trouser) of the active consolidation entry 100-1, as illustrated in FIG. 9. The basic attribute family interface 340 also includes an attribute family entry table 341 having, for example, up to seven attribute family entry fields 138-1 through 138-7 (given generally as attribute family entry fields 138). Each attribute family entry field 138 includes an attribute family number 343, an attribute family name field 344, an attribute family description field 346, and an attribute family group field 348.

In one arrangement, a user manually inputs data into the attribute family name field 344, attribute family description field 346, and attribute family group field 348, respectively. In another arrangement, the attribute family entry table 341 is linked to the basic attribute family manager table 266 illustrated in FIG. 7. During operation, to associate particular basic attribute family fields 138 with a particular basic consolidation entry, such as consolidation entry 100-1, a user selects a menu icon 350 associated with the attribute family name field 344 to access a drop-down menu drawn from the basic attribute family manager table 266. Based upon the access, the user selects an attribute family entry 138 from the basic attribute family manager table 266. Such selection causes the information found within the basic attribute family name field 268, the attribute family description field 270, and the attribute family group field 272 of the basic attribute family manager table 266 to default within the corresponding attribute family name field 344, attribute family description field 346, and attribute family group field 348 of the basic attribute family entry table 341. As such the user associates a particular attribute family 138 with a particular basic consolidation entry 100-1.

Assume for example, that for the consolidation entry 100-1 having the name "Uniform Pant", the user wants to associate the attribute family of color with the consolidation entry 100-1. In the attribute family name field 344-1 the user activates the menu icon 350 to access the basic attribute family manager table 266 as shown in FIG. 7. The user reviews the attribute family name 268 column of the basic attribute family manager table 266 for a particular entry labeled "color". The user selects the basic attribute family entry 138-3 from the attribute family manager table 266, and as such, the resource planning application 62 defaults the "color" entry of field 268-1 (shown in FIG. 7) within the attribute family name field 344-1 of the first basic attribute family entry 138-1 shown in FIG. 12. Similarly, the resource planning application 62 defaults the "color" entry of field 270-1 (shown in FIG. 7) within the attribute family description field 346-1 of the first attribute family entry 138-1 (shown in FIG. 12) and defaults the "All" entry of the attribute family group field 272-1 (shown in FIG. 7) within the attribute family group field 348-1 of the first attribute family entry 138-1 (shown in FIG. 12).

Figure 13:
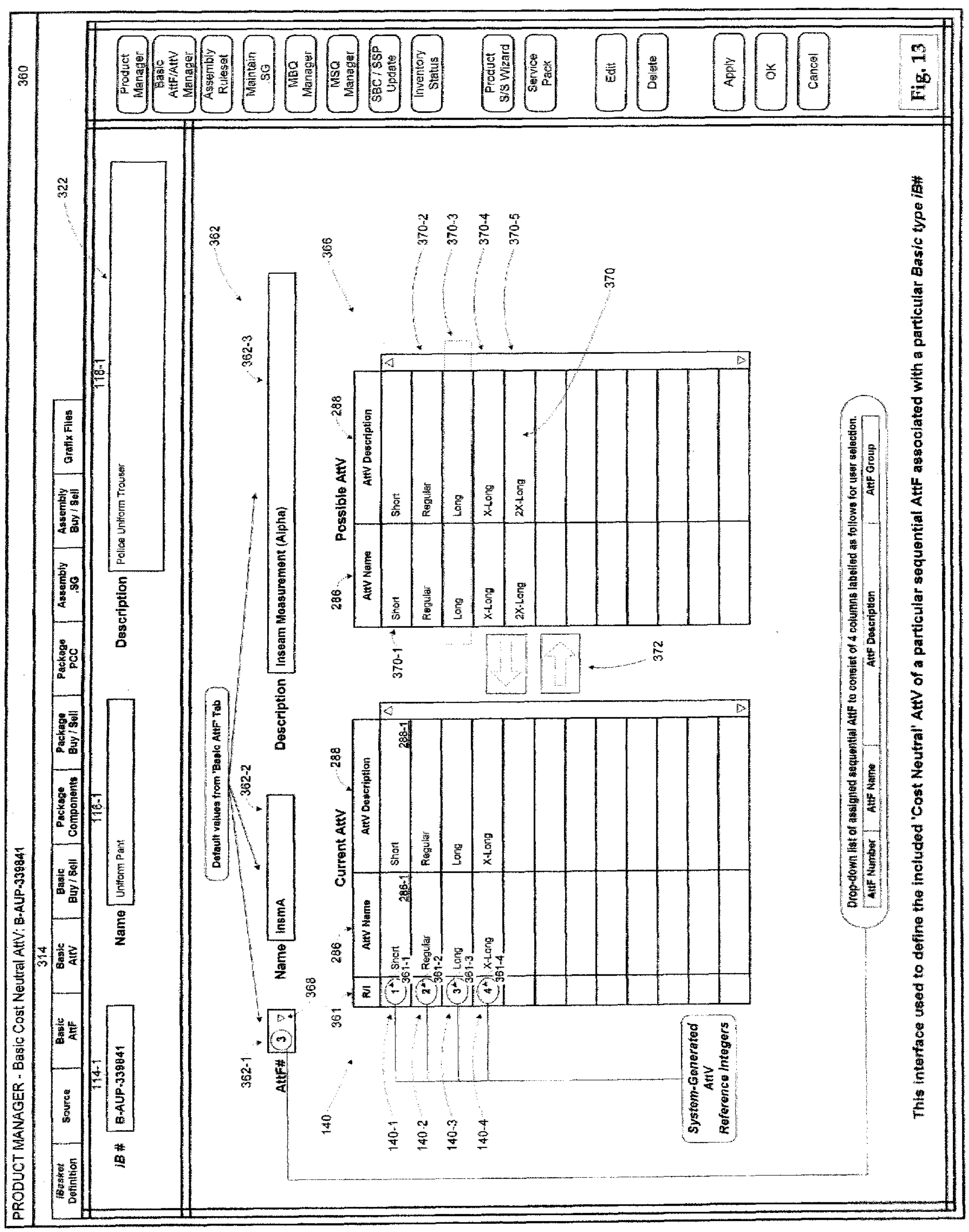
FIG. 13 illustrates a basic attribute value interface as used to assign particular 'cost neutral' attribute values to a particular attribute family of a particular basic type consolidation entry by the computerized resource planning system of FIG. 1.

FIG. 13 illustrates a basic attribute value interface 360 of the GUI 97 that allows a user to include number particular 'cost neutral' referenced selectable attribute values 140 in the basic limited number sequenced attribute families associated with a basic type consolidation entry 100-1, as outlined above. In one arrangement, the resource planning application 62 provides the basic attribute value interface 360 to the user in response to the user activating the basic attribute value entry 314.

The basic attribute value interface 360 includes a consolidation entry display 322, as described above, basic attribute family identifier fields 362, current 'cost neutral' attribute value fields 140, and possible 'cost neutral' attribute value fields 366.

The current 'cost neutral' attribute value fields 140, each includes an attribute value reference integer 361, an attribute value name field 286, and an attribute value description field 288

The basic attribute family identifier fields 362 include an attribute family number field 362-1, an attribute family name field 362-2 and an attribute family description field 362-3. The entry within the attribute family number field 362-1 corresponds to an attribute family number 343 of a basic attribute family entry, which has been associated with the active basic consolidation entry 100-1 referenced by the active basic consolidation entry reference within the consolidation entry reference field 114-1 (e.g., iB# "B-AUP-339841"), and as illustrated in FIG. 12. When a user activates a menu icon 368 associated with the attribute family number field 362-1, the resource planning application 62 provides a drop-down menu that includes a listing of all of the particular attribute family entry numbers 343 already associated with the active basic consolidation entry 100-1 (e.g., as referenced by iB# "B-AUP-339841", and as illustrated in FIG. 12), inclusive of their attribute family names, attribute family descriptions, and attribute family groups, as shown within the attribute family entry table 341 of FIG. 12. When the user selects a particular attribute family number 343, for example AttF# 3, from the available attribute family entry fields 138 already associated with the active consolidation entry 100-1 as established in FIG. 12, the resource planning application 62 inserts the data, located within the attribute family name field 344-3 of FIG. 12, within the attribute family name field 362-2 of FIG. 13, the data located within the attribute family description field 346-3 of FIG. 12 within the attribute family description field 362-3 of FIG. 13, in addition to the selected attribute family number 343 (e.g., AttF# '3' of FIG. 12), within the attribute family number field 362-1 of FIG. 13.

For example, as shown, the user selects the entry "3" within the basic attribute family number field 362-1. As shown in FIG. 12, the attribute family name "InsmA" and the attribute family description "Inseam Measurement (Alpha)" correspond to the attribute family number 343 of "3". As shown by FIG. 13, with such a selection, the resource planning application 62 defaults "InsmA" within the attribute family name field 362-2 and defaults "Inseam Measurement (Alpha)" within the attribute family description field 362-3.

The possible 'cost neutral' attribute value fields 366 include user-selectable attribute values, as identified by the associated attribute value names and attribute value descriptions. During operation, the resource planning application 62 has provided the 'cost neutral' attribute value table 284 data, as shown in FIG. 8, as being the possible 'cost neutral' attribute value fields 366 of the active 'cost neutral' attribute value interface 360. Returning to FIG. 13, a user selects attribute value entries, given generally as reference 370, from the possible attribute value fields 366 for inclusion in the current 'cost neutral' referenced selectable attribute value fields 140 using the control tabs 372. When the user selects particular attribute value entries 370 from the possible attribute value fields 366, the user associates the selected attribute value with the active basic attribute family identified by the attribute family identifier fields 362. For example, as illustrated in FIG. 13, the user has applied the referenced selectable attribute values of "short", "regular", "long", and "x-long" with the active basic attribute family 138 having the name "InsmA".

Returning to FIG. 2, once the user has associated particular attribute families 138 with included particular, referenced and selectable 'cost neutral' attribute values 140 with a particular consolidation entry 100 (e.g., the basic type consolidation entry 100-1), the resource planning application 62, utilizing the particular consolidation entry number and the particular 'cost neutral' referenced selectable attribute values 140 (e.g., sequenced and referenced by system-generated reference integers 361) included in each attribute family 138 (e.g., sequenced by system-generated reference numbers 343) associated with the particular consolidation entry 100 (e.g., the basic type consolidation entry 100-1), then generates and provides 'on demand', and only as enterprise required (e.g., in inventory status reports, etc. . . . ) within the system 50, a unique full granular reference number (FGR#) 378, for each attribute characteristics permutation (e.g., attributes configuration) of the product. Again, as shown in FIG. 2, the consolidation entry 100 (e.g., having the consolidation entry reference 114 of "B-AUP-339841") for a uniform pant, includes a first associated attribute family 102 "color", with a sequenced attribute family reference number 343 of "1", a second associated attribute family 104 "waist", with a sequenced attribute family reference number 343 of "2", and a third associated attribute family 106 "inseam", with a sequenced attribute family reference number 343 of "3". The first attribute family 102 has three separate 'cost neutral' referenced selectable attribute values 140; "blue", with a sequenced reference integer 361 of "1", "red", with a sequenced reference integer 361 of "2", and "tan", with a sequenced reference integer 361 of "3". The second attribute family 104 has three separate 'cost neutral' referenced selectable attribute values 140; "30", with a sequenced reference integer 361 of "1", "32", with a sequenced reference integer 361 of "2", and "34", with a sequenced reference integer 361 of "3". The third attribute family 106 has four separate 'cost neutral' referenced selectable attribute values 140; "short", with a sequenced reference integer 361 of "1", "regular", with a sequenced reference integer 361 of "2", "long", with a sequenced reference integer 361 of "3", and "x-long", with a sequenced reference integer 361 of "4". As such, the "uniform pant" product, having thirty-six (e.g., 3 colors*3 waist sizes*4 inseam measurements) separate attribute characteristics permutations (e.g., attributes configurations), is represented by the single basic type consolidation entry number of "B-AUP-339841". Further, the resource planning application 62 generates on demand', and only as enterprise required (e.g., in inventory status reports, etc. . . . ) for each attribute characteristics permutation (e.g., attributes configuration), a specific full granular reference number (FGR#) 378; and so, using this FGR#, a user is provided (e.g., also 'on demand' as enterprise required) the ability to track particular attribute characteristics permutations (e.g., attributes configurations) of the product within the enterprise.

For a basic type consolidation entry 100-1, the resource planning application 62 assigns a FGR# 378 in the format XYYY######-$\&1_{(1, \ldots, n)}/\&2_{(1, \ldots, n)}/\&3_{(1, \ldots, n)}/ \ldots /\&7_{(1, \ldots, n)}$ to each configuration of 'cost neutral' attribute values 140, as selected (e.g., from 'n' number of available 'cost neutral' referenced selectable attribute values 140) from each related attribute family 138 associated with a particular basic type consolidation entry 100-1. The first character "X" represents the letter pertaining to the product type associated with the consolidation entry as referenced by the consolidation entry reference 114 (e.g., "B" for basic type). The alpha characters "YYY" following the first character "X" represent the letters pertaining to the product category associated with the consolidation entry as referenced by the consolidation entry reference 114 (e.g., "AUP" for apparel uniform pant). The numeric characters ###### following the alpha characters "YYY" relate to the sequenced numeric values associated with the consolidation entry as referenced by the consolidation entry reference 114. The remaining characters following the numeric characters $\&1_{(1, \ldots n)}/\&2_{(1, \ldots n)}/\&3_{(1, \ldots n)} \ldots /\&7_{(1, \ldots n)}$ relate to sequenced 'reference integers' 361 of each unique and selected 'cost neutral' attribute value 140, as selected from up to 'n' number available within each associated attribute family 138 (e.g., up to 7 limited number attribute families 138 for each basic type product), and thereby, indicate a particular attribute characteristics permutation (e.g., attributes configuration) of the particular basic type product (e.g., as represented by the particular basic type consolidation entry 100-1 referenced by the single particular consolidation entry reference 114-1 of "B-AUP-339841) within the system 50.

For example, the FGR# 378-1 shown in FIG. 2 includes as the first character X the letter "B", as the alpha characters YYY the letters "AUP", as the numeric characters ###### the number "339841", and as the remaining characters $\&1_{(1, \ldots n)}/\&2_{(1, \ldots n)}/\&3_{(1, \ldots n)}$ (e.g., as particularly required in this three attribute family example) the sequenced 'reference integers' 361 of "1/2/4" as taken from the particular basic type consolidation entry 100-1 (e.g., as represented by the particular consolidation entry reference 114-1 of "B-AUP-339841").

As indicated above, basic type consolidation entries include for example, up to seven sequenced attribute families 138, with each attribute family 138 having included particular 'cost neutral', referenced selectable attribute values 140. The attribute values 140 of a basic type consolidation entry 100-1 being 'cost neutral', insures that the selection of any particular 'cost neutral' attribute values 140 for any attributes configuration of a particular basic type consolidation entry 100-1 does not affect the standard buy cost or standard sell price of the actual product represented by the basic type consolidation entry 100-1 within the system 50. As such, the resource planning application 62 allows a user to associate one particular (e.g., standard) selling price (SSP) and/or one particular (e.g., standard) buying cost (SBC) with each particular basic type consolidation entry 100-1

Figure 14:
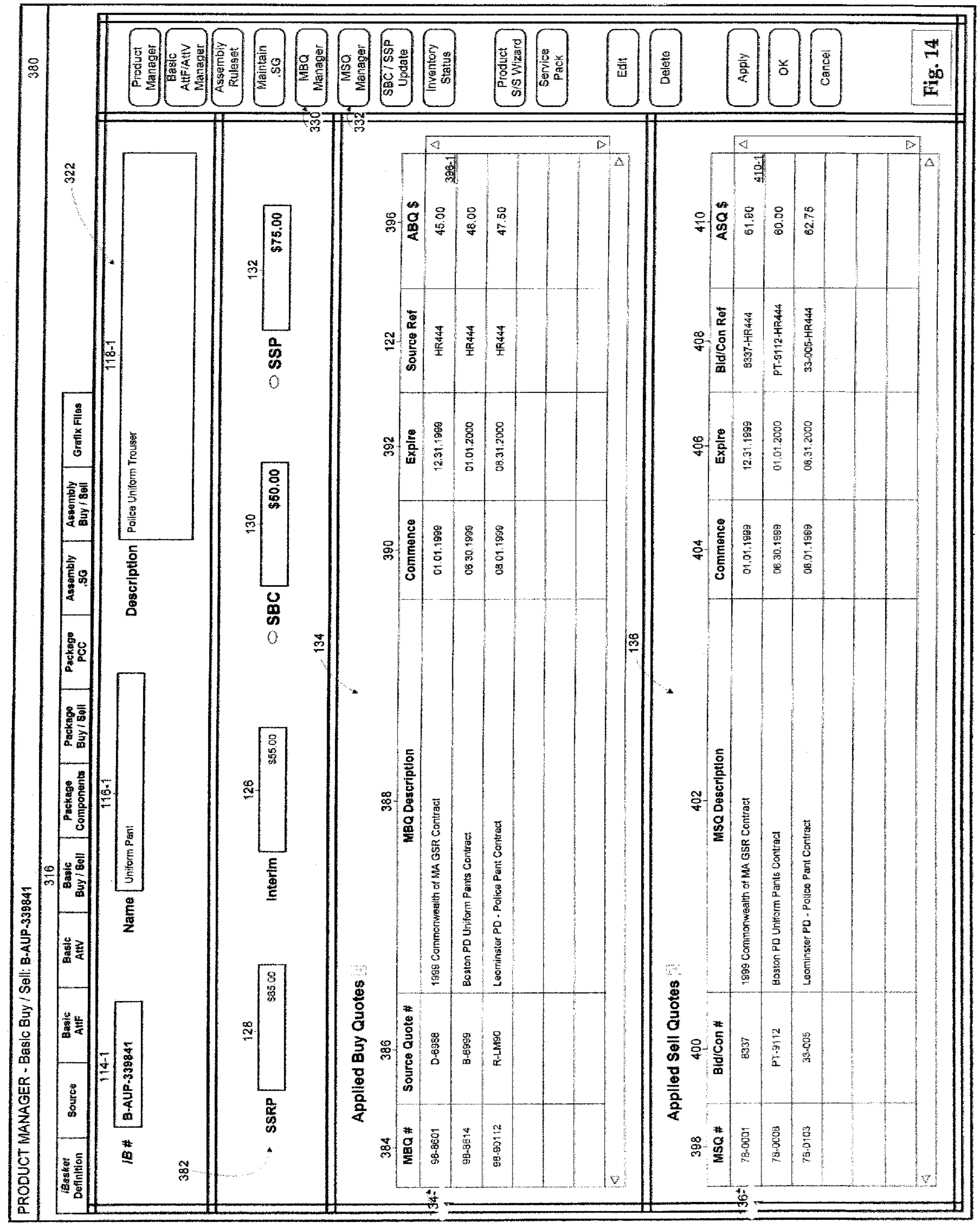
FIG. 14 illustrates a basic buy/sell interface as used by the computerized resource planning system of FIG. 1.

FIG. 14 illustrates a basic buy/sell interface 380 of the GUI 97 that allows a user to assign a standard buy cost and a standard sell price, as well as a suggested retail selling price and an interim calculating buy cost to a particular basic type consolidation entry 100-1. In one arrangement, the resource planning application 62 provides the basic buy/sell interface 380 to the user in response to the user activating the basic buy/sell entry 316 of a particular basic type consolidation entry 100-1.

The basic buy/sell interface 380 includes a consolidation entry display 322, a buy cost/sell price data field 382, an applied buy quote field 134, and an applied sell quote field 136. The buy cost/sell price data field 382 includes transactional monetary value fields such as an SSRP (source suggested retail price) field 128, an interim cost field 126, an SBC (standard buy cost) field 130, and an SSP (standard sell price) field 132.

The contents of the SSRP field 128 identify a source (e.g., manufacturer's) suggested retail price for the basic type product defined by the basic type consolidation entry 100-1. The contents of the interim cost field 126 identify an interim or transitional calculating cost for the product defined by the basic type consolidation entry 100-1. For example, the interim cost represents a 'first calculation' stage discounted cost as set by an agreement between the enterprise and a source in establishing a final purchase cost for the product. In one arrangement, the user manually enters the values within the SSRP field 128 and interim cost field 126.

The contents of the standard buy cost field 130 identify a purchase cost to the enterprise from a source for the basic type product defined by the basic type consolidation entry 100-1. The contents of the standard sell price field 132 identify a selling price, from the enterprise, for the basic type product defined by the basic type consolidation entry 100-1. The contents of each applied buy quote field 134 identify an applied buy quote for the basic type product defined by the basic type consolidation entry 100-1 (e.g., a purchase contract number and an assigned special or negotiated cost for the product under that purchase contract number). The contents of each applied sell quote field 136 identify an applied sell quote for the basic type product defined by the basic type consolidation entry 100-1 (e.g., a sales contract number and an assigned special or negotiated price for the product under that sales contract number). In one arrangement, the user manually enters the values within the standard buy cost field 130 and the standard sell price field 132 as computed by the user based upon an algorithm utilizing the values within the SSRP field 128 and the interim cost field 126.

The applied buy quote field 134, as displayed by the buy/sell interface 380, displays modifications to the enterprise's purchase cost (e.g., standard buy cost 130) of a basic type product as associated with a particular basic consolidation entry 100-1. The applied buy quote field 134 includes content that represents various purchase costs for a particular product from a product source as a result of various negotiated contracts between the enterprise and the product source.

When an enterprise purchases products from a product source, the enterprise can negotiate particular purchase or buy costs for a particular product or products, with the source. For example, assume the enterprise sells a particular product (e.g., a "uniform pant") or products to the police department of a particular state. Further assume that, based upon the strength of the enterprises' relationship with the particular state (e.g., a successful history of securing sales from its' police department), the enterprise is able to negotiate a particular buy cost contract with a source, such that the enterprise purchases a volume of products (e.g., including the particular "uniform pant" product) from the source, each for a reduced purchase cost. The enterprise creates within the system 50, using a master buy quote manager, a master buy quote for the particular buy cost contract, inclusive of applied buy quote data for all the products listed in the master buy quote (e.g., including the particular "uniform pant" product), as illustrated and described below.

Figure 15:
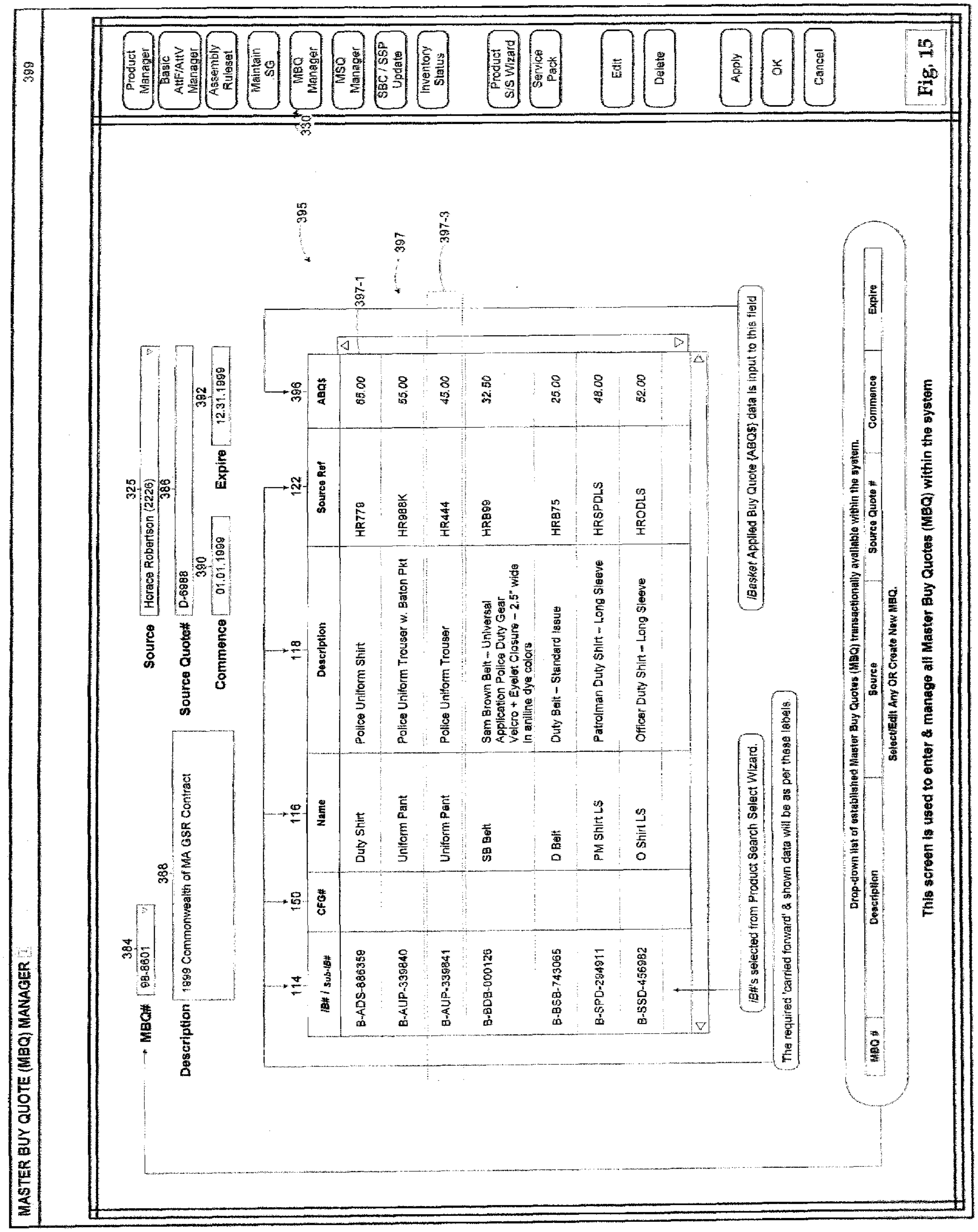
FIG. 15 illustrates a master buy quote manager interface as used by the computerized resource planning system of FIG. 1.

FIG. 15 illustrates a master buy quote manager interface 399 of the GUI 97 that allows an enterprise to enter a master buy quote, resulting from a source quote (e.g., a negotiated buy cost contract) for a product or products purchased by the enterprise from the source. A user accesses the master buy quote manager interface 399 by activating a master buy quote (MBQ) manager entry 330, such as displayed on the consolidation entry definition interface 300 of FIG. 9.

Returning to FIG. 15, the master buy quote manager interface 399 includes, for example, a master buy quote number field 384, a master buy quote description field 388, a source listing field 325, a source quote number field 386, a commence date field 390, an expire date field 392, and a master buy quote table 395.

The master buy quote number field 384 includes a reference number utilized by the enterprise to represent a particular source quote between the enterprise and a source for the purchase of products as listed in the master buy quote table 395. The master buy quote description field 388 provides details or a description of the source quote between the enterprise and the source. The source listing field 387 identifies the source for the particular source quote. The source quote number field 386 identifies the source's quote number for the source quote. The commence date field 390 relates to the starting date for application of the master buy quote for the purchase of products listed in the master buy quote table 395. The expire date field 392 relates to the ending date for application of the master buy quote to the purchase of products listed in the master buy quote table 395. The master buy quote table 395 lists all of the products included within the source quote between the enterprise and the source.

The master buy quote table 395 includes multiple entry rows 397 where each row includes a consolidation entry number field 114, a configuration number (CFG#) field 115, a name field 116, and a description field 118, as described above. Each row 397 also includes a source reference field 122 and an applied buy quote field 396 that allows a user to input a negotiated buy cost for purchase of a particular product under the source quote. For example, in row 397-3, the applied buy quote for the particular "police uniform trouser" product (e.g., represented by the particular basic consolidation entry 100-1 having the consolidation entry number "B-AUP-339841"), is $45.00, as quoted by the source.

After the enterprise successfully secures a source quote with a source, the enterprise (e.g., a user within the enterprise) activates the MBQ manager entry 330 and enters the information within the master buy quote manager interface 399 relating to the terms of the source quote (e.g., products involved, their associated applied buy quotes, source references, etc.). In one arrangement, the user includes a selection of particular consolidation entries 100 from a search/select interface 520, described in detail below, to generate the master buy quote table 395.

Returning to FIG. 14, when a user views or enters basic buy/sell information related to a basic type consolidation entry 100-1 via the basic buy/sell interface 380, the resource planning application 62 retrieves information from every master buy quote in the buy quote manager (e.g., such as illustrated in FIG. 15) that is related to the particular basic type consolidation entry 100-1 (e.g., as illustrated in FIG. 14), and populates the applied buy quote (ABQ) fields 134. The resource planning application 62 retrieves particular row entries 397 from each related master buy quote table 395, based upon a correlation between the consolidation entry number 114 of the particular basic type consolidation entry 100-1 (e.g., as illustrated in FIG. 14) and each matching basic type consolidation entry number 114 listed within each related master buy quote table 395.

For example, the consolidation entry number 114-1 for the basic consolidation entry 100-1, illustrated in FIG. 14, is "B-AUP-339841". When populating the applied buy quote fields 134, illustrated in FIG. 14, the resource planning application 62 searches all of the master buy quote tables 395 in the resource planning application 62 for any which list the consolidation entry number "B-AUP-339841". For example, the resource planning application 62 detects a correspondence or match between the particular consolidation entry number "B-AUP-339841" illustrated in FIG. 14, and the identical consolidation entry number "B-AUP-339841"; located in row 397-3 of the master buy quote table 395 of particular master buy quote "98-8601", referenced in the master buy quote number field 384 illustrated in FIG. 15. As a result, the resource planning application 62 populates a first row 134-1 of the applied buy quote fields 134 with the content from the master buy quote number field 384, the source quote number field 386, the master buy quote description field 388, the commence date field 390, the expire date field 392, and, from row 397-3 of the master buy quote table 395, content for the source reference field 122 and the applied buy quote field 396. As such the resource planning application 62, in this way, associates particular information within every master buy quote table 395 with a particular consolidation entry 100.

The applied sell quote field 136, as displayed by the buy/sell interface 380, displays modifications to the enterprise's selling price (e.g., standard sell price 132) of a basic type product as associated with a particular basic type consolidation entry 100-1. The applied sell quote field 136 includes content that represents various selling prices for a particular product to various customers as a result of various negotiated contracts between the enterprise and the various customers.

In certain cases, a customer can request particular pricing for particular products from an enterprise. For example, assume the police department of a state invites bids on a contract it will award to provide the police department with a particular product (e.g., a "uniform pant") or products. In response to the invitation, the enterprise can submit a bid in an effort to secure the contract to sell the product(s) to the police department at a particular contracted price (e.g., a reduction in the standard selling price). In the case where the police department receives the bid and awards the contract to the enterprise, the resource planning application 62 allows the enterprise to track the particular sales contract (e.g., bid contract or "bid/con") and associate the "bid/con" with particular consolidation entries 100 within the system 50. As such, the enterprise creates within the system 50, using a master sell quote manager, a master sell quote for the particular "bid/con" inclusive of the applied sell quote data for one or more products.

Figure 16:
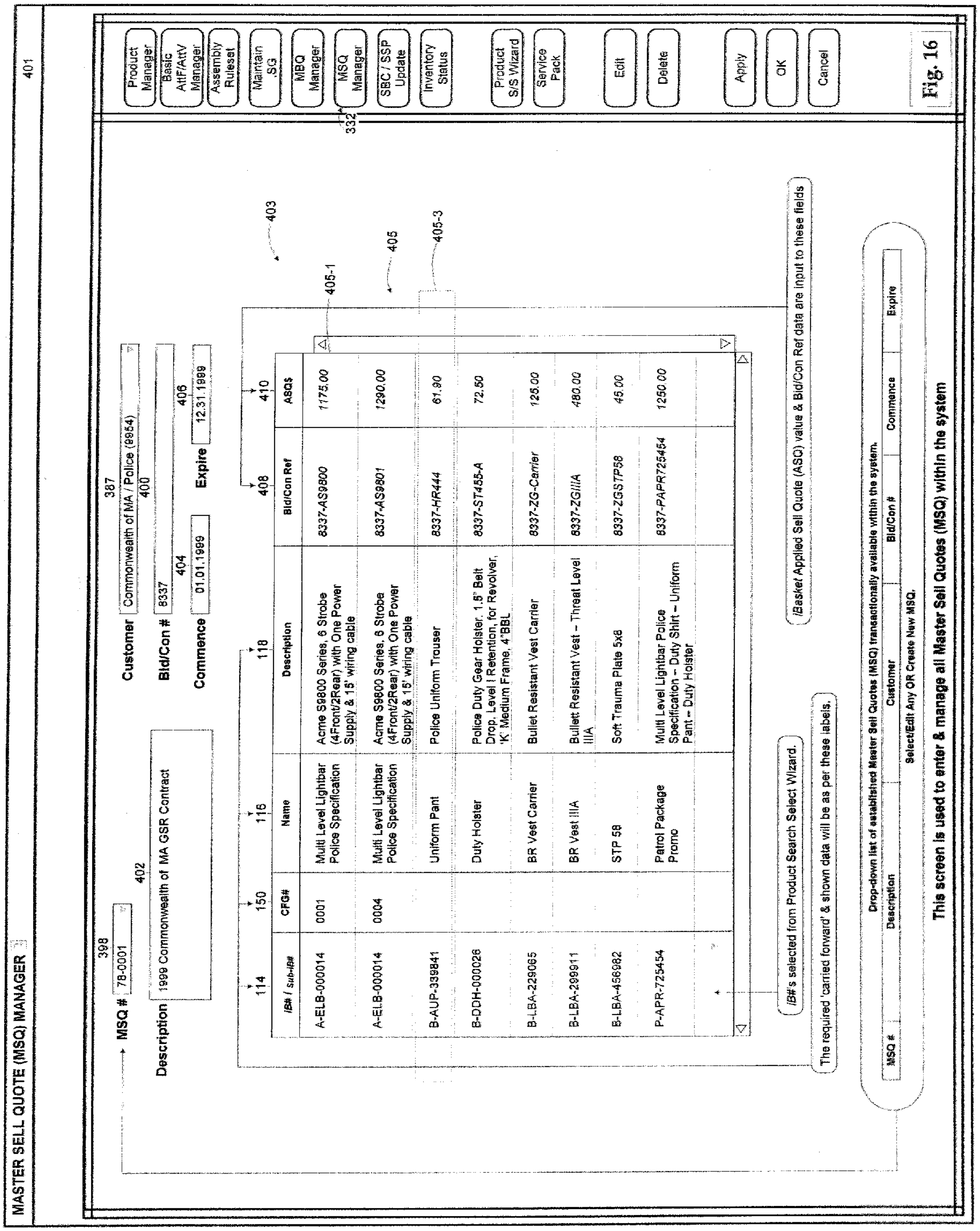
FIG. 16 illustrates a master sell quote manager interface as used by the computerized resource planning system of FIG. 1.

FIG. 16 illustrates a master sell quote manager interface 401 of the GUI 97 that allows an enterprise to enter master sell quotes, as a result of a "bid/con" (e.g., negotiated or secured sell price contract), for products sold by the enterprise to a customer. A user accesses the master sell quote manager interface 401 by activating a master sell quote (MSQ) manager entry 332, such as displayed on the consolidation entry interface 300 of FIG. 9.

Returning to FIG. 16, the master sell quote manager interface 401 includes, for example, a master sell quote number field 398, a master sell quote description field 402, a customer listing field 387, a bid/con number field 400, a commence date field 404, an expire date field 406, and a master sell quote table 403.

The master sell quote number field 398 includes a reference number utilized by the enterprise to represent a particular bid/con between the enterprise and a customer for sale of products as listed in the master sell quote table 403. The master sell quote description field 402 provides details or a description of the bid/con between the enterprise and the customer. The customer listing field 387 identifies the customer for the particular bid/con. The bid/con number field 400 identifies the customer's contract number for the bid/con. The commence date field 404 relates to the starting date for application of the master sell quote for the sale of products listed in the master sell quote table 403. The expire date field 406 relates to the ending date for application of the master sell quote to the sale of products listed in the master sell quote table 403. The master sell quote table 403 lists all of the products included within the bid/con between the enterprise and the customer.

The master sell quote table 403 includes multiple entry rows 405 where each row includes a consolidation entry number field 114, a configuration number (CFG#) field 115, a name field 116, and a description field 118, as described above. Each row 405 also includes a bid/con reference field 408 and an applied sell quote field 410 that allows a user to input a negotiated or secured selling price for sale of a particular product under the bid/con. For example, in row 405-3, the applied sell quote for the particular "police uniform trouser" product (e.g., represented by the particular basic consolidation entry 100-1 having the consolidation entry number "B-AUP-339841") is $61.90, as bid by the enterprise.

After the enterprise successfully secures a bid/con with a customer, the enterprise (e.g., a user within the enterprise) activates the MSQ manager entry 332 and enters the information within the master sell quote manager interface 401 relating to the terms of the bid/con (e.g., products involved, their associated applied sell quotes, and bid/con references, etc.). In one arrangement, the user includes a selection of particular consolidation entries 100 from a search/select interface 520, described in detail below, to generate the master sell quote table 405.

Returning to FIG. 14, when a user views or enters basic buy/sell information related to a basic type consolidation entry 100-1 via the basic buy/sell interface 380, the resource planning application 62 retrieves information from every master sell quote in the sell quote manager (e.g., as illustrated in FIG. 16) that is related to the particular basic type consolidation entry 100-1 (e.g., as illustrated in FIG. 14), and populates the applied sell quote (ASQ) fields 136. The resource planning application 62 retrieves particular row entries 405 from each related master sell quote table 403, based upon a correlation between the consolidation entry number 114 of the particular basic type consolidation entry 100-1 (e.g., as illustrated in FIG. 14) and each matching basic type consolidation entry number 114 listed within each related master sell quote table 403.

For example, the consolidation entry number 114-1 for the basic consolidation entry 100-1, illustrated in FIG. 14, is "B-AUP-339841". When populating the applied sell quote fields 136, illustrated in FIG. 14, the resource planning application 62 searches all of the master sell quote tables 403 in the resource planning application 62 for any which list the consolidation entry number "B-AUP-339841". For example, the resource planning application 62 detects a correspondence or match between the particular consolidation entry number "B-AUP-339841" illustrated in FIG. 14, and the identical consolidation entry number "B-AUP-339841; located in row 405-3 of the master sell quote table 403 of particular master sell quote "78-0001", referenced in the master sell quote reference number field 398 illustrated in FIG. 16. As a result, the resource planning application 62 populates a first row 136-1 of the applied sell quote fields 136 with the content from the master sell quote number field 398, the bid/con number field 400, the master sell quote description field 402, the commence date field 404, the expire date field 406, and, from row 405-3 of the master sell quote table 403, content for the bid/con reference field 408 and the applied sell quote field 410. As such the resource planning application 62, in this way, associates particular information within every master sell quote table 403 with a particular consolidation entry 100.

As indicated above, the resource planning application 62 directs the user through particular interfaces depending upon the type of product selected. The above-provided explanation is in the context of a basic type product. The following describes the interfaces provided by the resource planning application 62 when a user defines an assembly type product within the system 50.

Returning to FIG. 9, when the user activates a "Product Manager" entry 301, such as provided on an introductory interface, the resource planning application 62 presents to the user, as a default, the consolidation entry definition interface 300 that allows the user to define consolidation entries 100 when entering products within the system 50. As indicated above, the resource planning application 62 directs the user through particular interfaces depending upon the type of product selected. The following describes the interfaces provided by the resource planning application 62 when a user defines an assembly type product within the system 50.

Assume, for example, the user wishes to define a particular 'lightbar' product within the system 50. Prior to utilizing the consolidation entry definition interface 300, the user determines that the particular 'lightbar' product is best categorized as an assembly type product (e.g., an individual product within an enterprise which can have an unlimited number of associated attributes configurations). The user then utilizes the consolidation entry definition interface 300 provided by the resource planning application 62 to define an assembly type consolidation entry 100-2 for the assembly type product within the system 50.

Initially, the user indicates the type of product being defined within the system 50 by entering the product type information within the type field 110-2 presented on the consolidation entry display 304. For example, the user inputs the entry "Assembly" within the type field 110-2 for the consolidation entry 100-2 either by typing in the word "Assembly" or by selecting a product type using a drop-down menu icon 306. The user then inputs the category of the product within the category field 112. For example, the user inputs the entry "Emergency Lighting—Lightbars" within the category field

112-2 for the consolidation entry 100-2 either by typing in the text or selecting the text from a drop-down list provided when the user selects a menu icon 308.

Based upon the type and category provided by the user, the resource planning application 62 assigns a consolidation entry number to the consolidation entry 100-2, as presented within the consolidation entry number field 114-2. In the present example, the resource planning application 62 assigns the assembly type consolidation entry 100-2 a consolidation entry number (e.g., iB number) of "A-ELB-000014".

Next, the resource planning application 62 provides the consolidation entry number within the consolidation entry number field 114 in a coded format to allow a user to determine the type and category of a particular consolidation entry 100 without having any particular information about the product. In one arrangement, the first character of the consolidation entry number is an abbreviation for the type of product defined by the consolidation entry 100. For example, in the case where the first character is an "A", the consolidation entry number indicates the product is an assembly type product. Additionally, the following three characters are an abbreviation for the category of product defined by the consolidation entry 100. For example, in the case where the following three characters are "ELB", the consolidation entry number indicates that the product category is "Emergency Lighting—Lightbar". The remaining characters of the consolidation entry number are numbers that represent the sequential entry position of the defined type and category of the particular consolidation entry 100 within the system 50. For example, the number 000014 indicates that the consolidation entry 100-2 is the 000014$^{th}$ consolidation entry of that particular type and category defined in the system 50.

When defining the assembly type consolidation entry 100-2 within the system 50, the user also enters a name and description for the product within the consolidation entry display 304. For example, the name field 116-2 identifies the name for the assembly type product as "Multi Level Lightbar Police Specification" while the description field 118-2 describes the assembly type product as an "Acme S9800 Series Six Strobe . . . ". Completion of the type 110-2, category 112-2, name 116-2, and description 118-2 fields by the user define the assembly type consolidation entry 100-2 within the system 50.

Again, in the present example, the user or enterprise initially defines the assembly type consolidation entry 100-2 within the system 50 and assigns the particular associated attribute families 138, each inclusive of their particular user-selectable 'cost variable' attribute values 141 and/or user-selectable 'cost neutral' attribute values 140 to the particular assembly type consolidation entry 100-2. As such the user creates an assembly type consolidation entry 100-2, in an 'unconfigured' state, and within the system 50. For example, the user activates an assembly ruleset entry 303 of the consolidation entry interface 300 to allow the user to associate particular attribute families 138 and their included user-selectable 'cost variable' attribute values 141 and/or user-selectable 'cost neutral' attribute values 140 to the assembly consolidation entry 100-2 within the system 62. This is done in a process similar to that described in FIGS. 12 and 13. Further, the user or enterprise makes no 'selection' of any of the 'cost variable' attribute values 141 and/or user-selectable 'cost neutral' attribute values 140 included in each of the attribute families 138, associated with the particular assembly type consolidation entry 100-2. This establishes the particular assembly type consolidation entry 100-2 as an assembly type consolidation entry 100-2 in both an 'unconfigured' as well as a 'configurable' state within the system 50. Accordingly, the user now has access to an assembly type consolidation entry 100-2 of the system 50 that i) may be retained in an 'unconfigured' state (e.g., without attribute configurations), ii) be selectively 'pre-configured', or iii) be transactionally 'configured' (e.g., with both ii and iii being through a selection of 'cost variable' 141 attribute values and/or 'cost neutral' 140 attribute values from associated attribute families 138 by the enterprise or a user) to create specific (attributes) configurations of the particular assembly type consolidation entry 100-2.

In one arrangement, the enterprise or user refrains from activating the assembly ruleset entry 303 of the consolidation entry definition interface 300 and from making any 'selection' (e.g., attributes configuration) from the user-selectable 'cost variable' attribute values 141 and/or user-selectable 'cost neutral' attribute values 140 included in those attribute families 138 associated with the active (e.g., highlighted, selected, etc.) and particular assembly type consolidation entry 100-2. As such, the assembly type consolidation entry 100-2 remains as it was established; an 'unconfigured' assembly type consolidation entry within the system 50; as such, maintaining user access to an assembly type consolidation entry 100-2 that is essentially 'configurable', from which to create various and specific attributes configurations of the particular assembly type product.

After a user defines a consolidation entry 100 within the system 50, the resource planning application 62 then directs the user to enter or view additional information related to the particular consolidation entry 100. In the case of an assembly type product, for example, after the user or enterprise has defined a particular assembly type consolidation entry 100-2, the resource planning application 62 allows a user to access (e.g., through default "highlights") a source entry 310, an assembly .SG entry 321, an assembly buy/sell entry 323, and a grafix files entry 324, thereby allowing a further user access to those interfaces associated with each respective entry.

Figure 17:
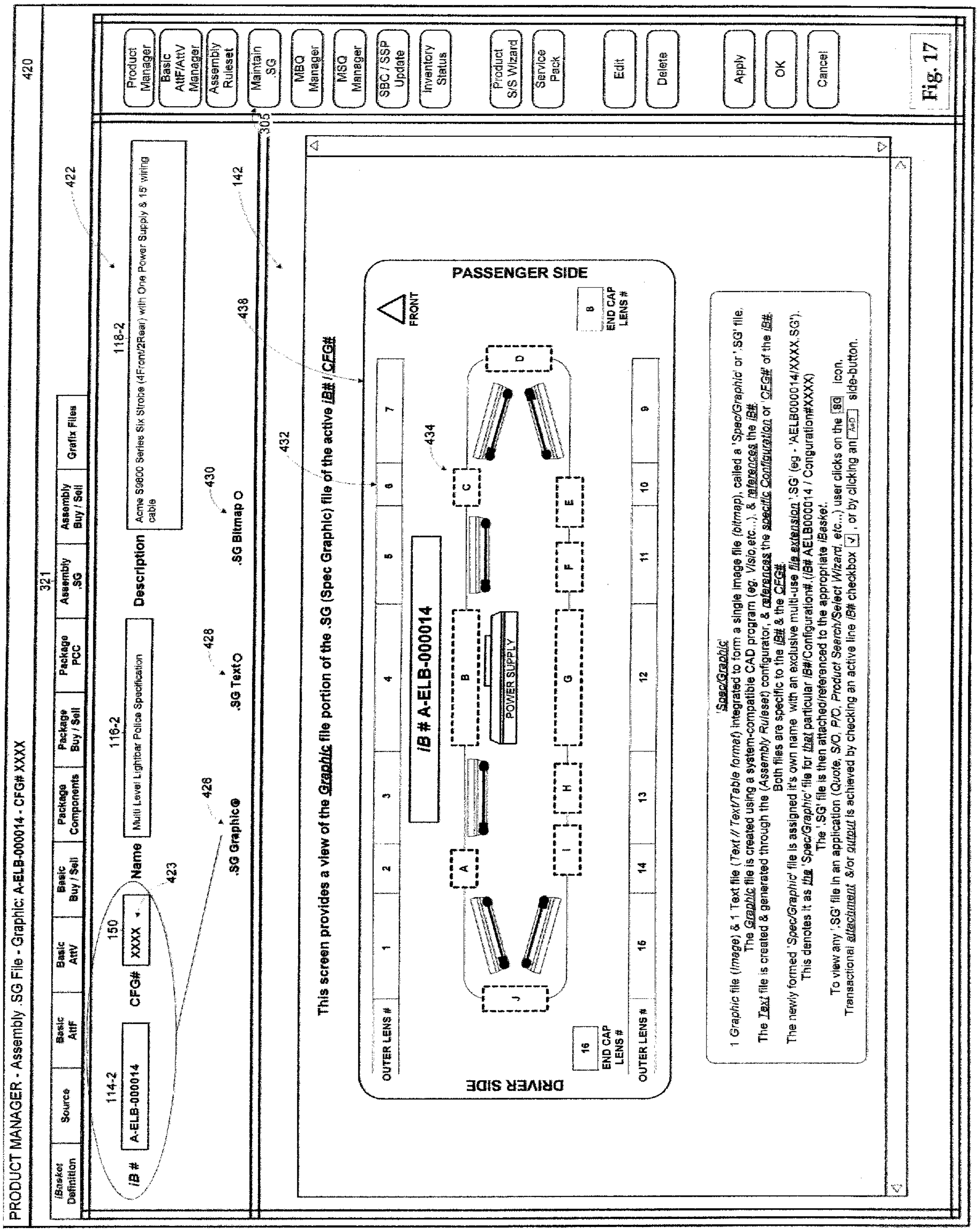
FIG. 17 illustrates an assembly .SG (spec graphic) interface after user selection of an associated .SG Graphic menu entry.
Figure 18:
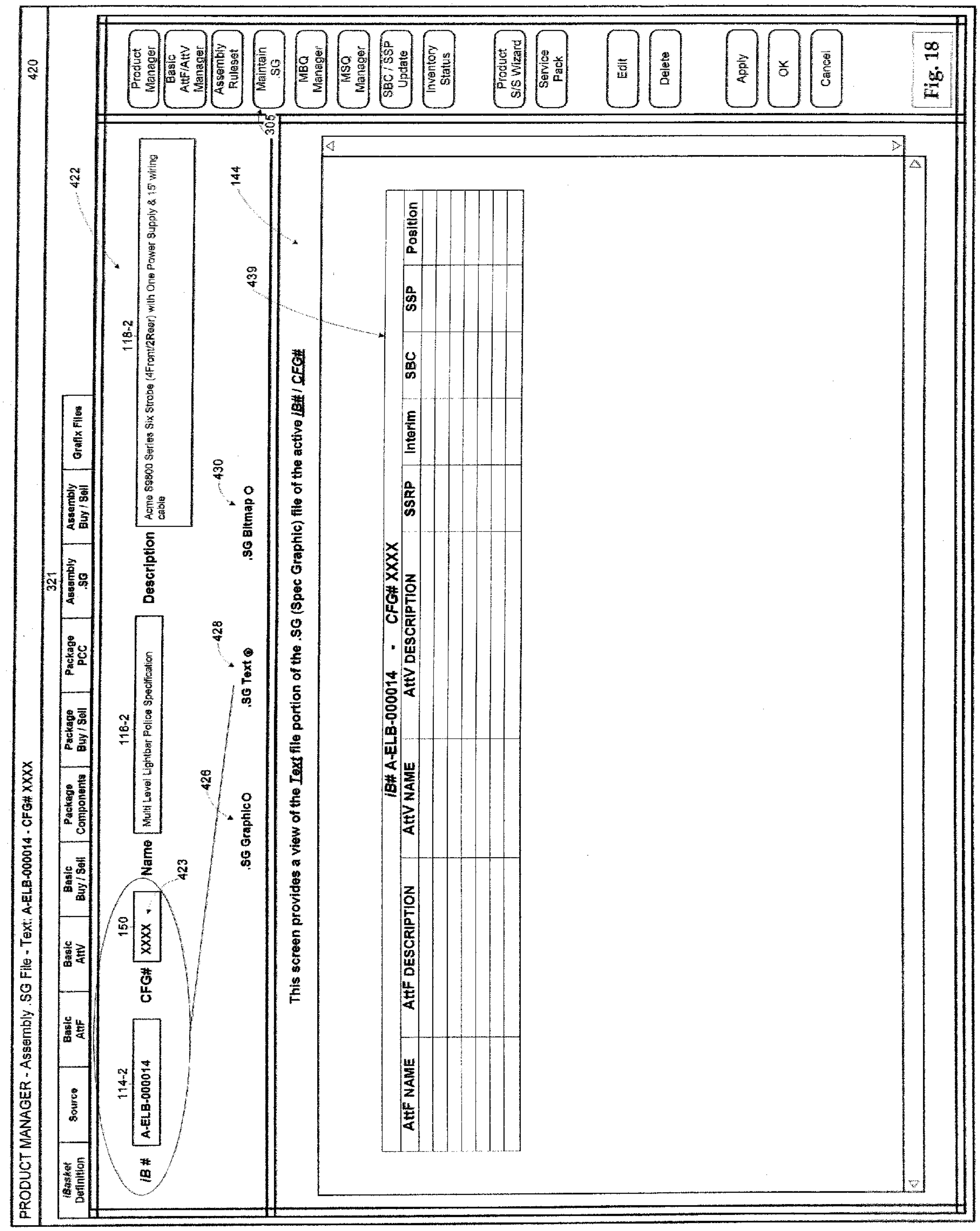
FIG. 18 illustrates an assembly .SG (spec graphic) interface after user selection of an associated .SG Text menu entry.
Figure 19:
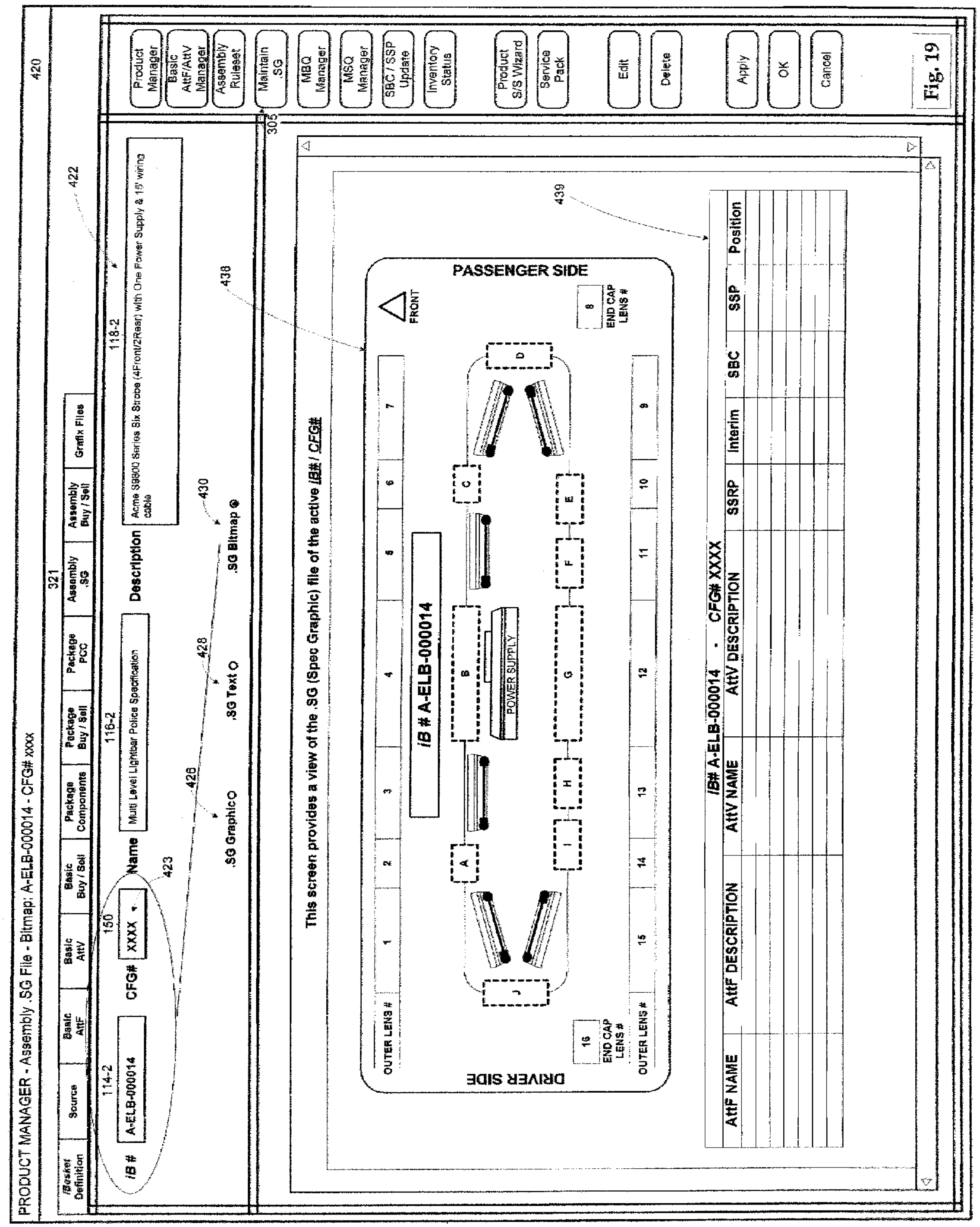
FIG. 19 illustrates an assembly .SG (spec graphic) interface after user selection of an associated .SG Bitmap menu entry.

FIGS. 17, 18, and 19 each illustrate an assembly .SG (spec graphic) interface 420 of the GUI 97; each of which is displayed in turn, when accessed through it's own user-selectable 'radial button'; which is available for selection within the consolidation entry display 422, when the user selects the assembly .SG entry 321 of an assembly type consolidation entry 100-2 in an 'unconfigured' state. The assembly .SG (spec graphic) interface 420 allows a user to view either i) a graphical representation of the particular 'unconfigured' assembly type product, or ii) the associated attribute family 138 and attribute value (e.g., 'cost variable' 141 and/or 'cost neutral' 140) data related to the particular attributes configuration of the particular 'unconfigured' assembly type product, or iii) a combined file (e.g., bitmap or ".SG" {spec graphic}) of the graphical representation file and the associated attribute family 138 and attribute value (e.g., 'cost variable' 141 and/or 'cost neutral' 140) data file related to the particular attributes configuration of the particular 'unconfigured' assembly type product.

The assembly .SG (spec graphic) interface 420 includes a consolidation entry display 422 having a consolidation entry number field 114-2, a name field 116-2, and a description field 118-2, as described with respect to FIG. 9. The assembly .SG (spec graphic) interface 420 also includes in the consolidation entry display 422, a configuration number (e.g., CFG#) field 150 that indicates either a text value 423 or a numerical value 425 configuration number, which as well as referencing a particular attributes configuration of the particular assembly type product represented by the particular assembly type consolidation entry 100-2, also reflects the particular attributes configuration status (e.g., 'unconfigured' or 'configured') of the particular assembly type product represented by the particular assembly type consolidation entry 100-2 within the system 50.

As in the case, with FIGS. 17, 18, and 19, where the assembly type consolidation entry 100-2 represents an 'unconfigured' assembly type product (e.g., one that has no particular 'selection from' or 'configuration of' the attribute values {e.g., 'cost variable' 141 and/or 'cost neutral' 140} included in the attribute families 138 associated with the particular assembly type consolidation entry 100-2), the configuration number field 150 identifies a text value 423 (e.g., "XXXX"). The combination of a particular configuration number 150, as represented by a text value 423 indicating an 'unconfigured' status, and a particular referenced assembly type consolidation entry 100-2, as represented by a particular assembly type consolidation entry number 114-2, represents a particular attributes configuration of 'no attributes configuration', as well as an 'unconfigured' status for the particular assembly type product represented by the particular assembly type consolidation entry 100-2 transacted by the enterprise. For example, a particular assembly type consolidation entry 100-2 having a particular assembly type consolidation entry number 114-2 of "A-ELB-000014" and a particular text value 423 configuration number 150 of "XXXX", represents both an 'unconfigured' status, and no particular attributes configuration of the particular 'unconfigured' assembly type product, and is referenced by the particular assembly type consolidation entry number "A-ELB-000014" and the particular text value 423 configuration number "XXXX".

The consolidation entry display 422 also includes a .SG Graphic menu entry 426, a .SG Text menu entry 428 and a .SG Bitmap menu entry 430. In one arrangement, the enterprise establishes, within the system 50, a .SG (spec graphic) file that references a particular assembly type consolidation entry 100-2, and one particular and selectable configuration number 150 related to the particular assembly type consolidation entry 100-2. A user selects a particular entry 426, 428, 430 to view particular associated portions or the whole of the .SG (spec graphic) file associated with the particular assembly type consolidation entry 100-2, as referenced by a particular assembly type consolidation entry number 114-2 (e.g., "A-ELB-000014" as illustrated in FIG. 17), and a particular configuration number 150 (e.g., "XXXX" also as illustrated in FIG. 17).

FIG. 17 illustrates the assembly .SG (spec graphic) interface 420 of the GUI 97 after user selection of the .SG Graphic menu entry 426 from the consolidation entry display 422. As such, the assembly .SG (spec graphic) interface 420 displays a graphic representation (e.g., graphic file) 438 of the particular assembly type consolidation entry 100-2, where the graphic file 438 is displayed within the .SG Graphic field 142. In one arrangement, after the user defines a particular assembly type consolidation entry 100-2 within the system 50, the user generates (e.g., using a computer aided design application) a graphic or image file 438 of the assembly type product represented by the particular assembly type consolidation entry 100-2, and links (e.g., enters) the graphic file within the .SG Graphic field 142 of the particular assembly type consolidation entry 100-2. Additionally, in one arrangement, the user selects or activates a maintain .SG (spec graphic) entry 305, such as displayed by the resource planning application 62, to invoke a CAD application to generate the graphic or image file, and link it to default view in the .SG Graphic field 142 of the particular (e.g., 'unconfigured') assembly type consolidation entry 100-2.

A graphic file 438 illustrates a particular assembly type product identified within the assembly type consolidation entry number field 114-2, name field 116-2, and description field 118-2 of a particular consolidation entry display 422. For example, as illustrated in FIG. 17, the particular graphic file 438 illustrates the particular police lightbar product; 'A-ELB-000014'—' Multi Level Lightbar Police Specification'—'Acme S9800 Series Six Strobe (4Front/2Rear) with One Power Supply & 15' 'wiring cable'. Also as shown in the lightbar graphic in FIG. 17, the police lightbar includes positioned and optional multiple outer lenses 432 and multiple internal elements 434.

FIG. 18 illustrates the assembly .SG (spec graphic) interface 420 of the GUI 97 after user selection of the .SG Text menu entry 428 from the consolidation entry display 422. When the user selects the .SG Text menu entry 428, the assembly .SG (spec graphic) interface 420 displays textual information 439 included within a .SG Text field 144 related to the particular (e.g., 'unconfigured') assembly type consolidation entry 100-2. In one arrangement, the textual information 439 includes no associated attribute family 138 information and no attribute value (e.g., 'cost variable' 141 and/or 'cost neutral' 140) information, reflecting no particular 'selection from' or configuration of the attribute values (e.g., 'cost variable' 141 and/or 'cost neutral' 140), included in the particular attribute families 138, associated with the particular 'unconfigured' assembly type consolidation entry 100-2 referenced in the particular assembly consolidation entry display 422. In the case where the particular (e.g., 'unconfigured') police lightbar product, as represented by a particular (e.g., 'unconfigured') assembly type consolidation entry 100-2, referenced by the particular assembly type consolidation entry number 'A-ELB-000014' and it's particular and associated text value 423 configuration number 'XXXX', the assembly .SG (spec graphic) interface 420 displays no attribute family information and no attribute value information pertaining to the particular (e.g., 'unconfigured') police lightbar product, represented by the particular referenced by the particular assembly type consolidation entry number 'A-ELB-000014', and it's particular and associated text value 423 configuration number 'XXXX'. Together (e.g., iB# 'A-ELB-000014' and CFG# 'XXXX') these represent the particular attributes configuration status of 'unconfigured' (e.g., no attributes configuration) of the particular assembly type consolidation entry 100-2.

FIG. 19 illustrates the assembly .SG (spec graphic) interface 420 of the GUI 97 after user selection of the .SG Bitmap menu entry 430 from the consolidation entry display 422. When the user selects the .SG Bitmap menu entry 430, the assembly .SG (spec graphic) interface 420 displays in combined format, both the graphic file 438 (e.g., a graphic image of the particular lightbar product) and the textual information file 439 (e.g., associated attribute family 138 and included user-selectable attribute value {e.g., 'cost variable' 141 and/or 'cost neutral' 140}data) related to the particular assembly type consolidation entry number 'A-ELB-00014', and it's related text value 423 configuration number 150 of 'XXXX', as referred to in the particular assembly type consolidation entry display 422, representing the particular 'unconfigured' assembly type consolidation entry 100-2.

Additionally, in one arrangement where the user or enterprise activates the assembly ruleset entry 303 of the consolidation entry interface 300, from an active (e.g., highlighted, selected, etc.) and particular assembly type consolidation entry 100-2, and does make a particular 'selection from' or configuration of the particular attribute values (e.g., 'cost variable' 141 and/or 'cost neutral' 140) included in the particular attribute families 138 associated with the same particular assembly type consolidation entry 100-2 as described above, the user or enterprise does establish one particular 'attributes configuration' of the particular assembly type consolidation entry 100-2 within the system 50; and as such, creates one of many possible 'configured' states of the same particular assembly type consolidation entry 100-2, within the system 50.

Figure 20:
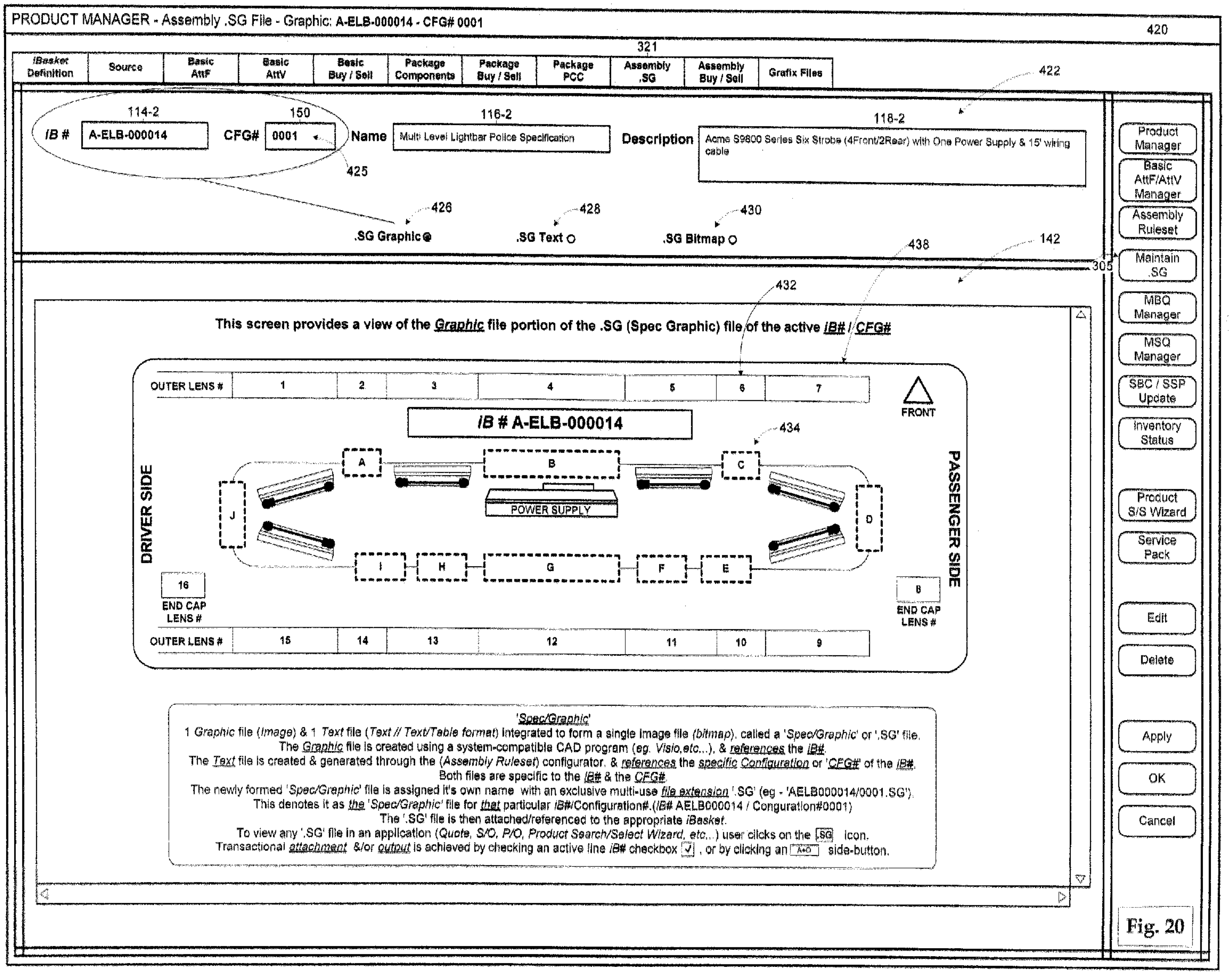
FIG. 20 illustrates an arrangement of the assembly .SG (spec graphic) interface of FIG. 17 when a user selects the associated .SG Graphic menu entry.
Figure 22:
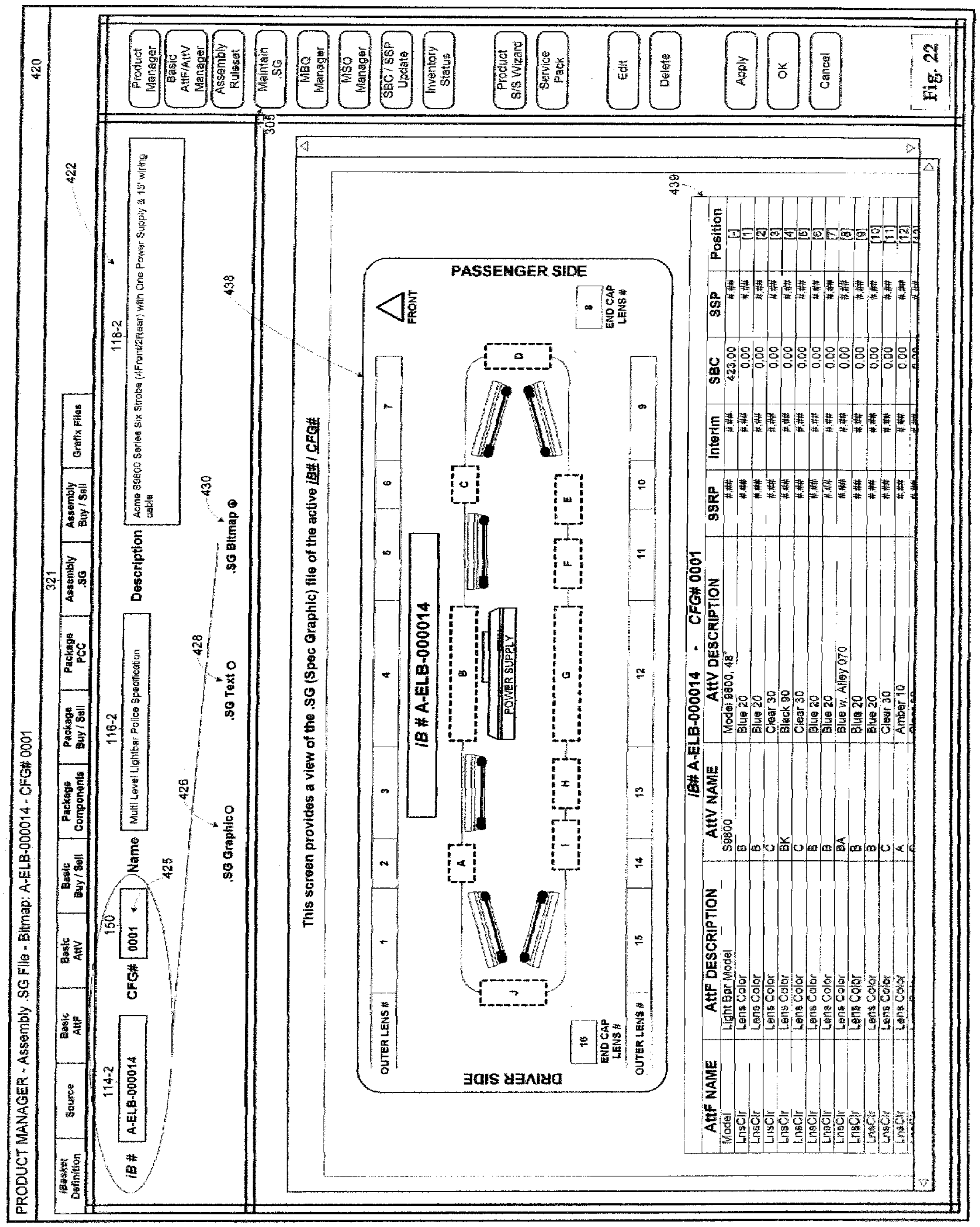
FIG. 22 illustrates an arrangement of the assembly .SG (spec graphic) interface of FIG. 19 when a user selects the associated .SG Bitmap menu entry.

FIGS. 20, 21 and 22 each illustrate an assembly .SG (spec graphic) interface 420 of the GUI 97; each of which is displayed in turn, when accessed through it's own user-selectable 'radial button'; which is available for selection within the consolidation entry display 422, when the user selects the assembly .SG entry 321 of an assembly type consolidation entry 100-2 in a 'configured' state. The assembly .SG (spec graphic) interface 420 allows a user to view either i) a graphical representation of the particular configured assembly type product, or ii) the associated attribute family 138 and attribute value (e.g., 'cost variable' 141 and/or 'cost neutral' 140) data related to the particular attributes configuration of the particular 'configured' assembly type product, or iii) a combined file (e.g., bitmap or ".SG" {spec graphic}) of the graphical representation file and the associated attribute family 138 and attribute value (e.g., 'cost variable' 141 and/or 'cost neutral' 140) data file related to a particular attributes configuration of the particular 'configured' assembly type product.

The assembly .SG (spec graphic) interface 420 includes a consolidation entry display 422 having a consolidation entry number field 114-2, a name field 116-2, and a description field 118-2, as described with respect to FIG. 9. The assembly .SG (spec graphic) interface 420 also includes in the consolidation entry display 422, a configuration number (e.g., CFG#) field 150 that indicates either a numerical value 425 or a text value 423 configuration number, which as well as referencing a particular attributes configuration of the particular assembly type product represented by the particular assembly type consolidation entry 100-2, also reflects the particular attributes configuration status (e.g., 'configured' or 'unconfigured') of the particular assembly type product within the system 50.

As in the case, with FIGS. 20, 21 and 22, where the assembly type consolidation entry 100-2 represents a 'configured' assembly type product (e.g., one that has a particular 'selection from' or 'configuration of' the attribute values {e.g., 'cost variable' 141 and/or 'cost neutral' 140} included in the attribute families 138 associated with the particular assembly type consolidation entry 100-2), the configuration number field 150 identifies a numerical value 425 (e.g., 0001, 0002, etc.). The combination of a particular configuration number 150 as represented by a numerical value 425 indicating a 'configured' status, and a particular assembly type consolidation entry 100-2 as represented by a particular assembly type consolidation entry number 114-2, represents a particular attributes configuration as well as a 'configured' status for the particular referenced assembly type product represented by the particular assembly type consolidation entry 100-2 transacted by the enterprise. For example, a particular assembly type consolidation entry 100-2 having a particular assembly type consolidation entry number 114-2 of "A-ELB-000014" and a particular numerical value 425 configuration number 150 of "0001" represents both a 'configured' status and one particular attributes configuration of the particular 'configured' assembly type product, and is referenced by the particular assembly type consolidation entry number "A-ELB-000014" and the particular numerical value 425 configuration number "0001". Further, a particular assembly type consolidation entry 100-2 having the same particular assembly type consolidation entry number 114-2 of "A-ELB-000014" and a different numerical value 425 configuration number 150 of "0002", represents a 'configured' status and a different attributes configuration of the same particular assembly type product, and is referenced by the same consolidation entry number "A-ELB-000014" and the different numerical value 425 configuration number "0002".

The consolidation entry display 422 also includes a .SG Graphic menu entry 426, a .SG Text menu entry 428 and a .SG Bitmap menu entry 430. In one arrangement, the enterprise establishes, within the system 50, a .SG (spec graphic) file that references a particular assembly type consolidation entry 100-2, and one particular and selectable configuration number 150 related to the particular assembly type consolidation entry 100-2. A user selects a particular entry 426, 428, 430 to view particular associated portions or the whole of the .SG (spec graphic) file associated with the particular assembly type consolidation entry 100-2, as referenced by a particular assembly type consolidation entry number 114-2 (e.g., "A-ELB-000014" as illustrated in FIG. 20), and a specific configuration number 150 (e.g., "0001" as illustrated in FIG. 20).

FIG. 20 illustrates the assembly .SG (spec graphic) interface 420 of the GUI 97 after user selection of the .SG Graphic menu entry 426 from the consolidation entry display 422. As such, the assembly .SG (spec graphic) interface 420 displays a graphic representation (e.g., graphic file) 438 of the particular assembly type consolidation entry 100-2, where the graphic file 438 is displayed within the .SG Graphic field 142. In one arrangement, after the user defines a particular assembly type consolidation entry 100-2 within the system 50, the user generates (e.g., using a computer aided design application) a graphic or image file 438 of the assembly type product represented by the particular assembly type consolidation entry 100-2, and links (e.g., enters) the graphic file within the .SG Graphic field 142 of the particular assembly type consolidation entry 100-2. Additionally, in one arrangement, the user selects or activates a maintain .SG (spec graphic) entry 305, such as displayed by the resource planning application 62, to invoke a CAD application to generate the graphic or image file, and link it to default view in the .SG Graphic field 142 of the particular (e.g., 'configured' assembly type consolidation entry 100-2.

A graphic file 438 illustrates a particular assembly type product identified within the particular assembly type consolidation entry number field 114-2, name field 116-2, and description field 118-2 of a particular consolidation entry display 422. For example, as illustrated in FIG. 20, the particular graphic file 438 illustrates the particular police lightbar product; 'A-ELB-000014'—'Multi Level Lightbar Police Specification'—'Acme S9800 Series Six Strobe (4Front/2Rear) with One Power Supply & 15' wiring cable'. Also as shown in the lightbar graphic in FIG. 20, the police lightbar includes positioned and optional multiple outer lenses 432 and multiple internal elements 434.

FIG. 21 illustrates the assembly .SG (spec graphic) interface 420 of the GUI 97 after user selection of the .SG Text menu entry 428 from the consolidation entry display 422. When the user selects the .SG Text menu entry 428, the assembly .SG (spec graphic) interface 420 displays textual information 439 included within a .SG Text field 144 related to the particular (e.g., 'configured') assembly type consolidation entry 100-2. In one arrangement, the textual information 439 includes associated attribute family 138 information and attribute value (e.g., 'cost variable' 141 and/or 'cost neutral' 140) information reflecting a particular 'selection from' or 'configuration of' the attribute values (e.g., 'cost variable' 141 and/or 'cost neutral' 140), included in the particular attribute families 138, associated with the particular 'configured' assembly type consolidation entry 100-2 referenced in the particular assembly consolidation entry display 422. In the case where the particular (e.g., 'configured') police lightbar product, as represented by a particular (e.g., 'configured') assembly type consolidation entry 100-2 referenced by the particular assembly type consolidation entry number 'A-ELB-000014' and it's particular and associated numerical value 425 configuration number '0001', the assembly .SG (spec graphic) interface 420 displays all attribute family 138 information and attribute value (e.g., 'cost variable' 141 and/or 'cost neutral' 140) information pertaining to the particular (e.g., 'configured') police lightbar product represented by the particular (e.g., 'configured') assembly type consolidation entry 100-2, as referenced by the particular consolidation entry number "A-ELB-000014", and it's particular and associated numerical value 425 configuration number '0001'. Together, (e.g., iB# 'A-ELB-000014' and CFG# '0001') these reference a particular (e.g., one of one or more possible) attributes configuration of the particular assembly type product represented by the particular 'configured' assembly type consolidation entry 100-2.

FIG. 22 illustrates the assembly .SG (spec graphic) interface 420 of the GUI 97 after user selection of the .SG Bitmap menu entry 430 from the consolidation entry display 422. When the user selects the .SG Bitmap menu entry 430, the assembly .SG (spec graphic) interface 420 displays in combined format, both the graphic file 438 (e.g., a graphic image of the particular lightbar product) and the textual information file 439 (e.g., associated attribute family 138 and included user-selectable attribute value {e.g., 'cost variable' 141 and/or 'cost neutral' 140} data) related to the particular assembly type consolidation entry number 'A-ELB-00014', and it's related numerical value 425 configuration number 150 of '0001', as referred to in the particular assembly type consolidation entry display 422, representing the particular 'configured' assembly type consolidation entry 100-2.

As indicated above, a user initially establishes each assembly type consolidation entry 100-2 within the system 50 as an 'unconfigured' assembly type consolidation entry (e.g., an assembly type consolidation entry having no 'selection from' or 'configuration of' the attribute values (e.g., 'cost variable' 141 and/or 'cost neutral' 140) included in the attribute families 138 associated with the particular assembly type consolidation entry 100-2.

Furthermore, in the case where the assembly type consolidation entry 100-2 represents an 'unconfigured' assembly type product (e.g., having no 'selection from' or 'configuration of' the attribute values {e.g., 'cost variable 141 and/or 'cost neutral' 140} from the particular attribute families 138, associated with the particular assembly type consolidation entry 100-2), the configuration number 150 is always a single generic text string value 423 (e.g., "XXXX"). The resource planning application 62 uses the generic text string value 423 to indicate to a user that a particular assembly type product, as represented within the system 50 by a particular assembly type consolidation entry 100-2 referenced by a particular assembly type consolidation entry number 114-2, has an 'unconfigured' status (e.g., has no 'selection from' or 'configuration of' the attribute values {e.g., 'cost variable' 141 and/or 'cost neutral' 140} included in the attribute families 138 associated with the particular assembly type consolidation entry 100-2).

Figure 23:
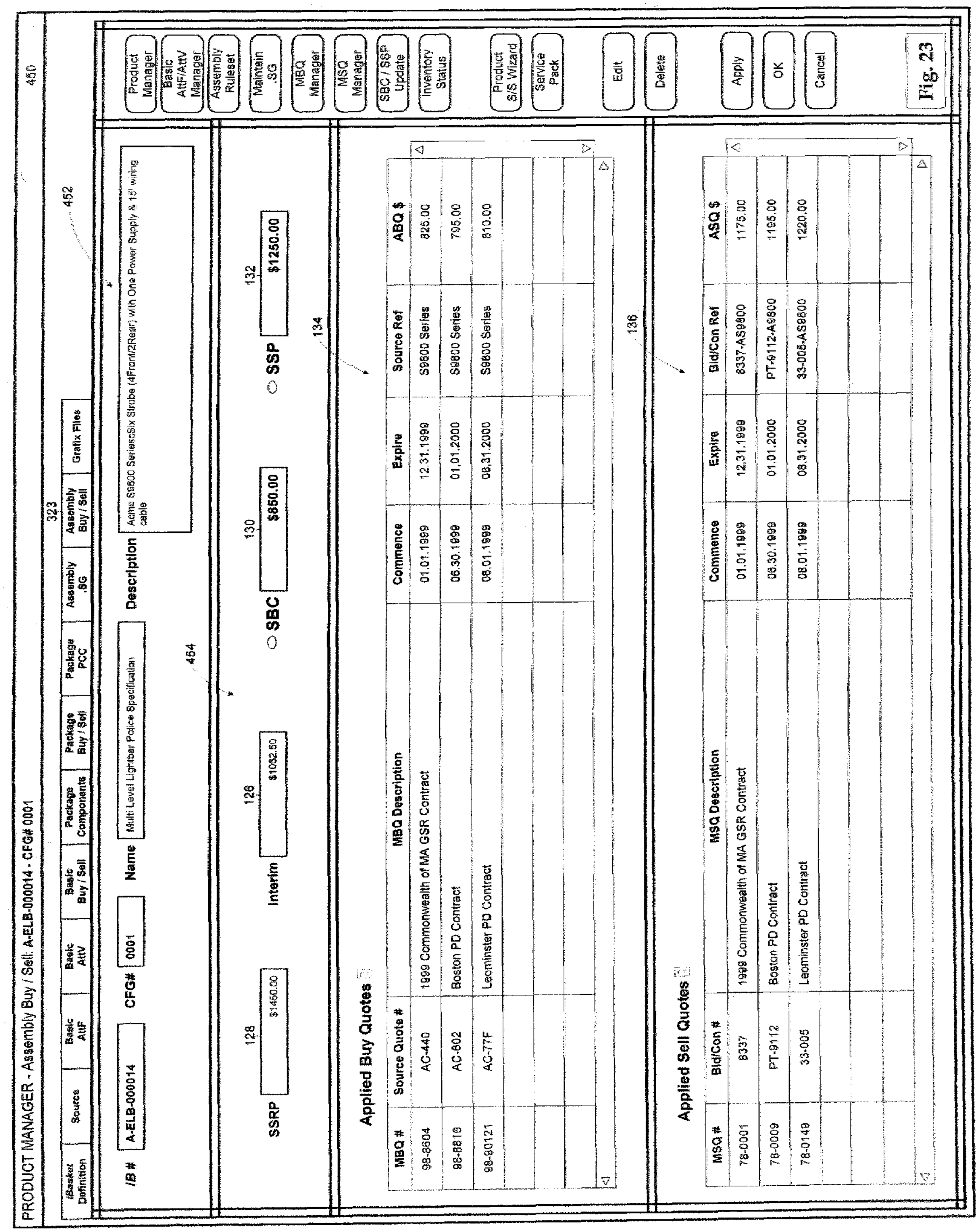
FIG. 23 illustrates an assembly buy/sell interface as used by the computerized resource planning system of FIG. 1.

FIG. 23 illustrates an assembly buy/sell interface 450 of the GUI 97 that allows a user to view the assembly ruleset-generated purchase cost, selling price, suggested retail selling price and interim calculating buy cost of a particular attributes configuration of a particular assembly type consolidation entry 100-2. In one arrangement, the resource planning application 62 provides the assembly buy/sell interface 450 to the user in response to the user activating the assembly buy/sell entry 323 of a particular attributes configuration of a particular assembly type consolidation entry 100-2.

The assembly buy/sell interface 450 includes a consolidation entry display 452, a buy cost/sell price data field 454, an applied buy quote field 134, and an applied sell quote field 136. The buy cost/sell price data field 454 includes an SSRP field 128, an interim cost field 126, a standard buy cost field 130, and a standard sell price field 132, which are defaulted to reflect the assembly ruleset-generated values associated with a particular attributes configuration of the particular assembly type consolidation entry 100-2. In one arrangement, the value within the standard sell price field 132 is set by the user. User operation of the assembly buy/sell interface 450 is similar in all other respects to the operation of the basic buy/sell interface 380 of FIG. 14, as described in detail above.

Figure 24:
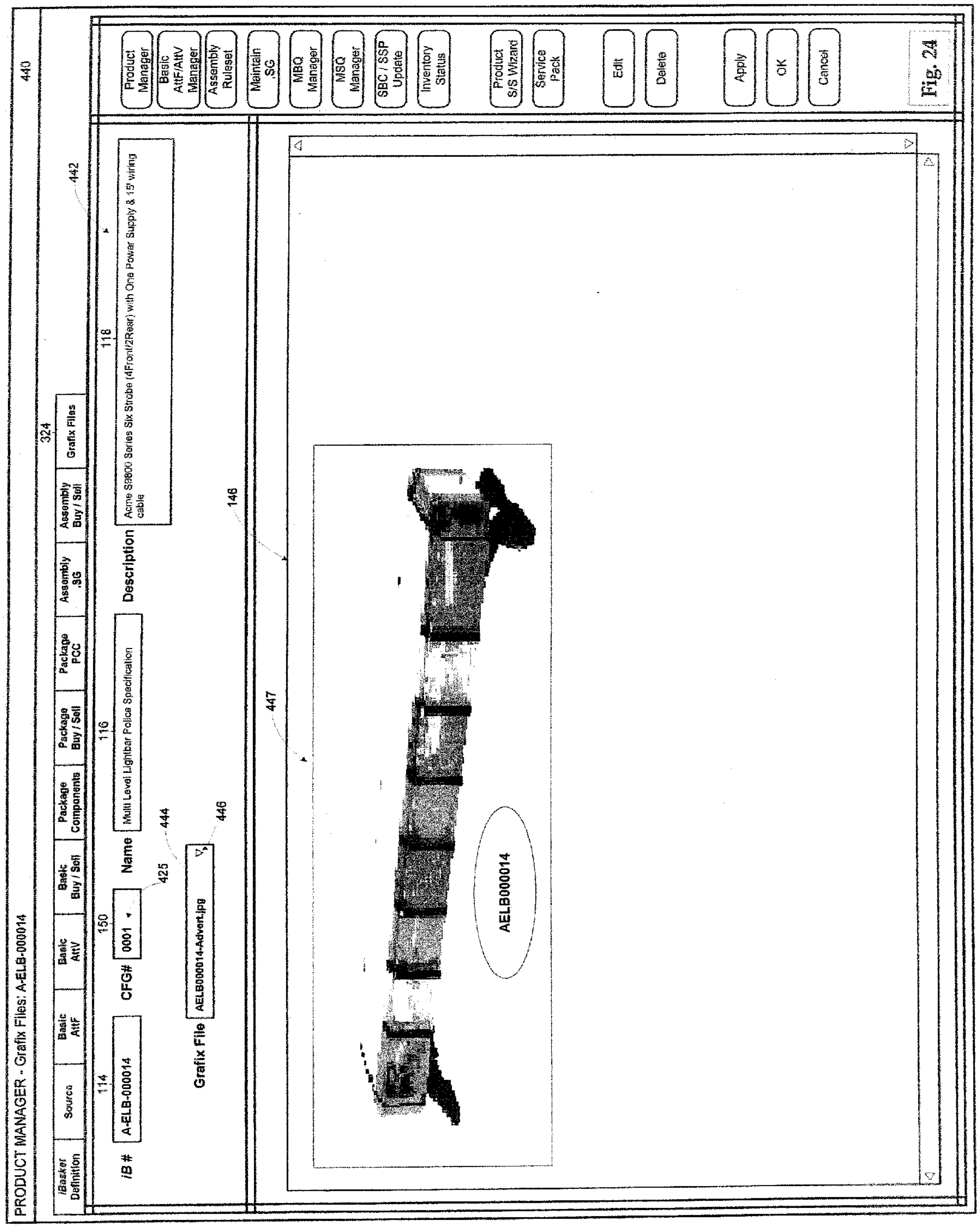
FIG. 24 illustrates an arrangement of a grafix files interface when a user has selected a "Grafix File".
Figure 25:
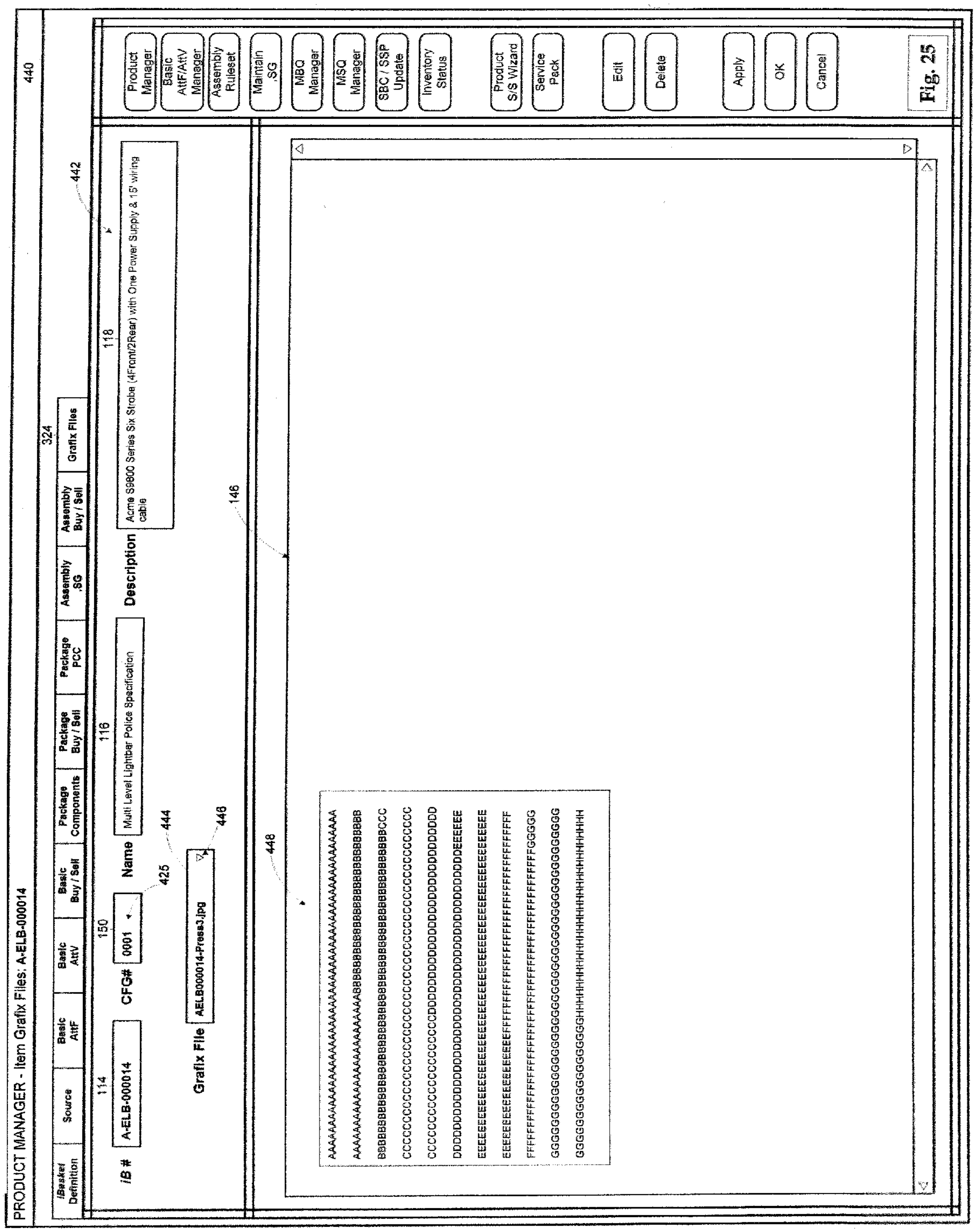
FIG. 25 illustrates an arrangement of a grafix files interface when a user has selected a "Grafix File".

FIGS. 24 and 25 illustrate arrangements of a grafix files interface 440 when a user selects a "Grafix Files" entry 324 for any particular consolidation entry 100. The grafix files interface 440 displays the selected grafix file contents of the particular associated consolidation entry 100 within the grafix files field 146; either graphical representation(s) (e.g., picture{s}) 447 of the particular consolidation entry 100 or textual description(s) 448, such as advertising literature, of the particular consolidation entry 100.

FIGS. 24 and 25 illustrate the grafix files interface 440 of the GUI 97 having a consolidation entry display 442 that includes a consolidation entry number field 114, a configuration number field 150, a name field 116, and a description field 118, as described above. The consolidation entry display 442 also includes a grafix file menu 444. The user activates the grafix file menu 444 via icon 446 in order to select either an image file associated with the consolidation entry 100 or a text file associated with the consolidation entry 100. For example, as illustrated in FIG. 24, the user selects a graphical entry from the grafix file menu 444 to display a picture 447 of the consolidation entry 100. In another example, as illustrated in FIG. 25, the user selects a text entry from the grafix file menu 444 to display advertising text 448 of the consolidation entry 100.

Returning to FIG. 9, when the user activates a "Product Manager" entry 301, such as provided on an introductory interface, the resource planning application 62 presents to the user, as a default, the consolidation entry definition interface 300 that allows the user to define consolidation entries 100 when entering products within the system 50. As indicated above, the resource planning application 62 directs the user through particular interfaces depending upon the type of product selected, as will be described in detail below. The following describes the interfaces provided by the resource planning application 62 when a user defines either a simple package type product within the system 50 or a diverse package type product within the system 50.

The diverse package type data format 96, for example, is well-suited for representing products that are i) combinations of one or more basic type products (e.g., each represented by a basic type consolidation entry 100-1) and one or more 'configured' assembly type products (e.g., each represented by an assembly type consolidation entry 100-2, and an associated and specific configuration number 150, as referenced by a numerical value 425), or ii) two or more 'configured' assembly type products (e.g., each represented by an assembly type consolidation entry 100-2, each of which has it's own associated and specific configuration number 150, as referenced by a numerical value 425). The simple package type data format 94 is well-suited for representing products that are combinations of two or more basic type products (e.g., each represented by a basic type consolidation entry 100-1).

Assume, for example, the user wishes to define a diverse package product within the system 50. Initially, the user indicates the type of product being defined within the system 50 by entering the type information within the type field 110 presented on the consolidation entry display 304. For example, in defining a diverse package (e.g., type i as defined above) within the system 50, the user inputs the entry "Diverse Package" within the type field 110-4 for the consolidation entry 100-4 either by typing in the word "Diverse Package" or by selecting a product type using a menu icon 306. The user then inputs the category of the product within the category field 112. For example, the user inputs the entry "Emergency Lighting—Promotional" within the category field 112-4 for the diverse package consolidation entry 100-4 either by typing in the text or selecting the text from a list provided when the user selects a using a menu icon 308.

Based upon the type and category provided by the user, the resource planning application 62 assigns a consolidation entry number to the consolidation entry 100, as presented within the consolidation entry number field 114. In the present example, the resource planning application 62 assigns the diverse package type consolidation entry 100-4 a package type consolidation entry number of "P-APR-725454", as shown in the consolidation entry number field 114-4. The first character "P" of the consolidation entry number indicates the consolidation entry number represents a package type product (e.g., either simple or diverse) within the system 50.

When defining the diverse package consolidation entry 100-4 within the system 50, the user also enters content within a name field 116 and description field 118 for the product within the consolidation entry display 304. For example, the name field 116-4 identifies the name for the diverse package as "Patrol Package Promo" while the description field 118-4 indicates the individual assembly or basic type products forming the package. Completion of the type 110-4, category 112-4, name 116-4 and description 118-4 fields by the user, and the consolidation entry number 114-4 field assigned by the resource planning application 62, defines a diverse package type consolidation entry 100-4 within the system 50. Similarly, a simple package type consolidation entry 100-3 is defined within the system 50 upon completion of the type 110-3, category 112-3, name 116-3 and description 118-3 fields by the user, and the consolidation entry number 114-3 field assigned by the resource planning application 62.

After a user defines a consolidation entry 100 within the system 50, the resource planning application 62 then directs the user to enter additional information related to the particular consolidation entry 100. In the case of either a simple package type consolidation entry 100-3, or a diverse package type consolidation entry 100-4, after user or enterprise definition, the resource planning application 62 enables user to access (e.g., through default "highlights") to a package components entry 317, a package buy/sell entry 318, and a package PCC (package cost configuration) entry 319 on the consolidation entry definition interface 300, thereby allowing a user still further access to those interfaces associated with each respective entry.

Figure 26:
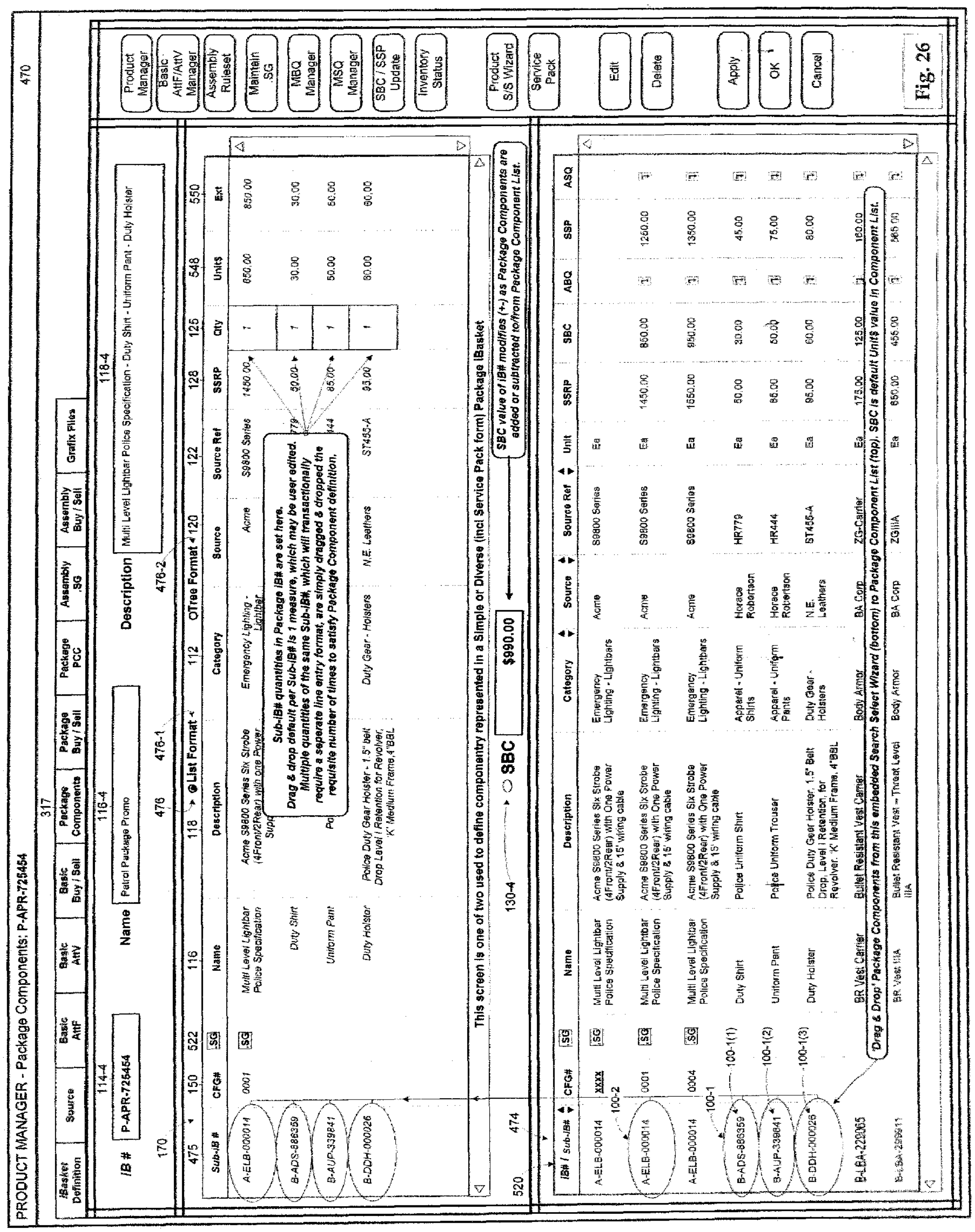
FIG. 26 illustrates a list format arrangement of a package components entry interface as used by the computerized resource planning system of FIG. 1.
Figure 27:
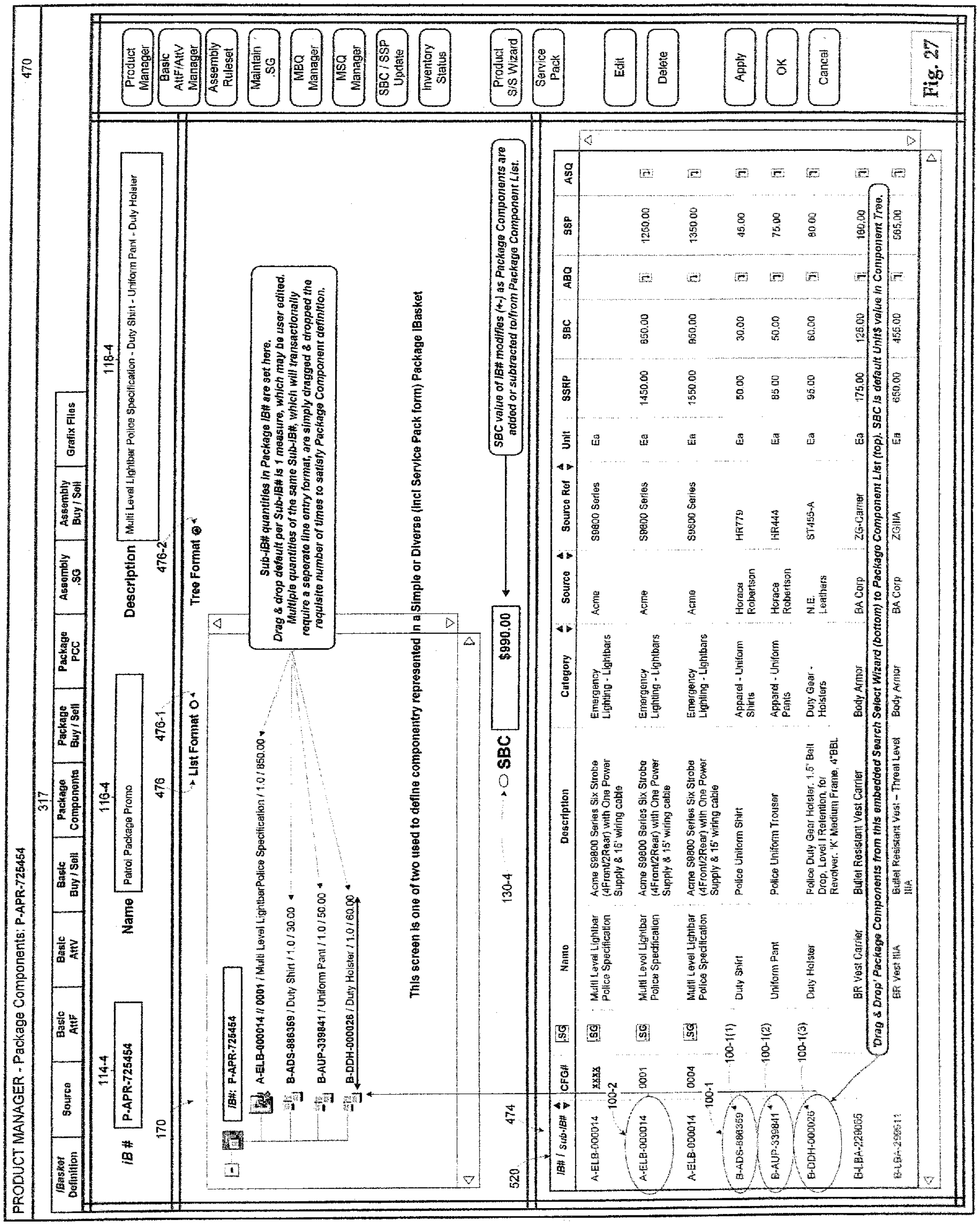
FIG. 27 illustrates a tree format arrangement of a package components entry interface as used by the computerized resource planning system of FIG. 1.

FIGS. 26 and 27 illustrate a package components entry interface 470 of the GUI 97 that allows a user to select pre-defined consolidation entries 100 and associate these consolidation entries 100 with either a simple package type consolidation entry 100-3, or a diverse package type consolidation entry 100-4. In one arrangement, the resource planning application 62 provides the package components entry interface 470 to the user in response to the user activating the package components entry 317.

The package components entry interface 470, shown in FIGS. 26 and 27, includes a diverse package type consolidation entry number field 114-4, a name field 116-4, a description field 118-4, a sub-consolidation entry field 170, a consolidation entry number field 475, a selection field 474, and an embedded product search/select wizard interface 520.

The sub-consolidation entry field 170 lists the basic type product consolidation entries 100-1 and/or the configured assembly type product consolidation entries 100-2 that, together, define the 'product componentry' of the particular diverse package type consolidation entry 100-4, as referenced by the consolidation entry number "P-APR-725454". The sub-consolidation entry field 170 includes a consolidation entry number field 475 that lists, as sub-consolidation entries (e.g., Sub-iB numbers), the consolidation entry numbers for each consolidation entry 100 included in the sub-consolidation entry field 170. Such listing provides the user or enterprise with an identification of the particular basic type consolidation entries 100-1 and/or 'configured' assembly type consolidation entries 100-2 that form the 'componentry' of the particular diverse type package consolidation entry 100-4.

Figure 30:
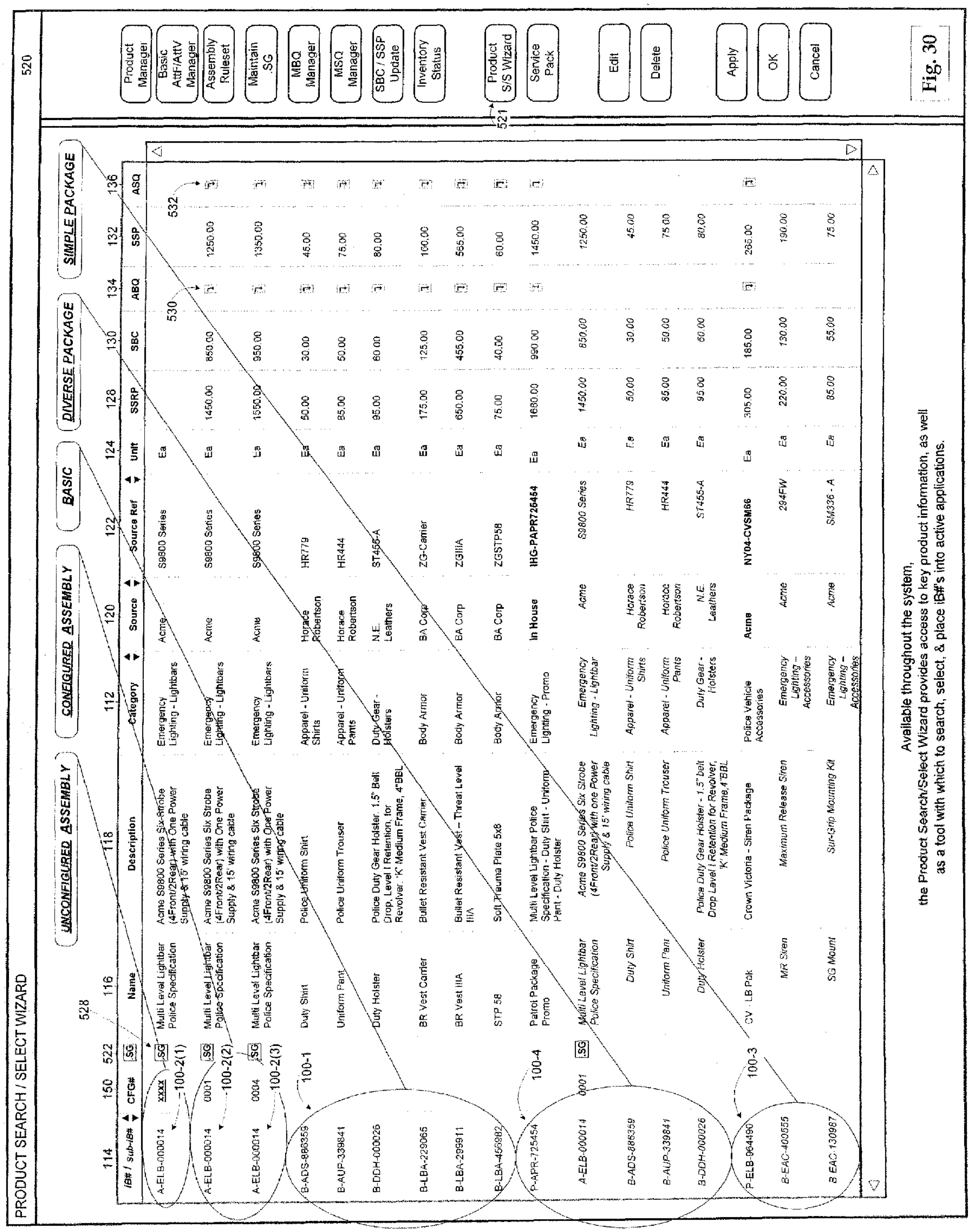
FIG. 30 illustrates a product search/select interface as provided by the computerized resource planning system of FIG. 1.

The selection field 474 (e.g., an embedded product search/select interface 520, as illustrated in FIG. 30 and described in detail below) lists consolidation entries 100 defined within the system 50. During operation, the user selects consolidation entries 100 from within the selection field 474 and enters the selected entries into the consolidation entry number field 475 within the sub-consolidation entry field 170, via a "drag-and-drop" procedure. For example, the user selects basic type consolidation entries 100-1(1), 100-1(2), and 100-1(3) (e.g., "Duty Shirt", "Uniform Pant", and "Duty Holster") along with 'configured' assembly type consolidation entry 100-2 (e.g., CFG# 0001 of "Multi Level Lightbar Police Specification") and places the entries into the consolidation entry number field 475 within the sub-consolidation entry field 170. By doing so, the user defines the 'product componentry' of the particular diverse package type consolidation entry 100-4, identified by the consolidation entry number "P-APR-725454", within the system 50.

The package components entry interface 470 includes a display selection menu 476 that allows a user to view the consolidation entries within the sub-consolidation entry field 170 in either a list format 476-1, shown in FIG. 26, or a tree format 476-2, shown in FIG. 27. The package components entry interface 470 also includes a standard buy cost field 130-4. The standard buy cost field 130-4 displays a standard buy cost value which is default-associated with the particular diverse package type consolidation entry 100-4, and is dynamically updated (e.g., increased or decreased) based upon the sum of the standard buy costs for the consolidation entries 100 entered (e.g., or removed from) within the consolidation entry number field 475 within the sub-consolidation entry field 170. In the present example, the standard buy cost field 130-4 displays the sum of the standard buy costs for the "Multi Level Lightbar Police Specification/CFG# 0001", the "Duty Shirt", the "Uniform Pant", and the "Duty Holster" consolidation entries listed in the consolidation entry number field 475 located within the related sub-consolidation entry field 170.

In one arrangement, the resource planning application 62 allows a user to both view and utilize the default-associated standard buy cost (e.g., as 'built' within the package components entry interface 470, and displayed within the standard buy cost field 130-4). Additionally, the resource planning system 62 enables a user or enterprise to create additional buy cost structures (e.g., package cost configurations or "PCC" 160) for a particular package type consolidation entry (e.g., either simple 100-3 or diverse 100-4), which function within the system in a manner similar to that of applied buy quotes as described in FIGS. 14 and 15. A package cost configuration "PCC" 160 represents a different purchase cost (e.g., different from the standard buy cost) for a particular package type product. Each package cost configuration "PCC" 160 of a particular package type product, is created as a direct result of the user or enterprise selecting an alternate purchase cost (e.g., an available applied buy quote) for one or more of the consolidation entries 100 as were originally selected, entered into the consolidation entry number field 475 within the related sub-consolidation entry field 170, and so define the particular 'product componentry' and resulting standard buy cost 130 of the particular package type product (e.g., either simple 100-3 or diverse 100-4) within the system 50.

Figure 28A:
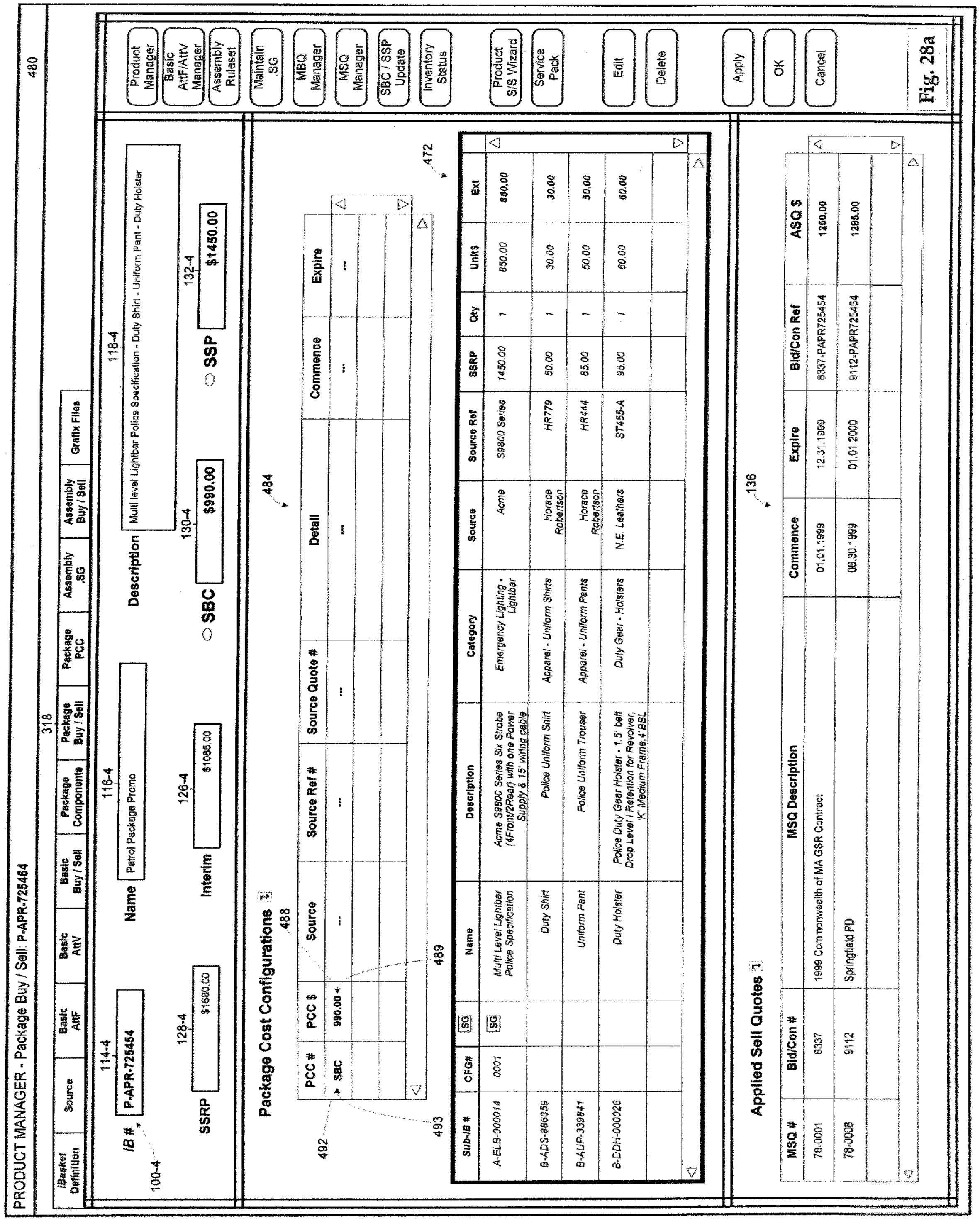
FIGS. 28*a* and 28*b* illustrate a package buy/sell interface as used by the computerized resource planning system of FIG. 1.
Figure 28B:
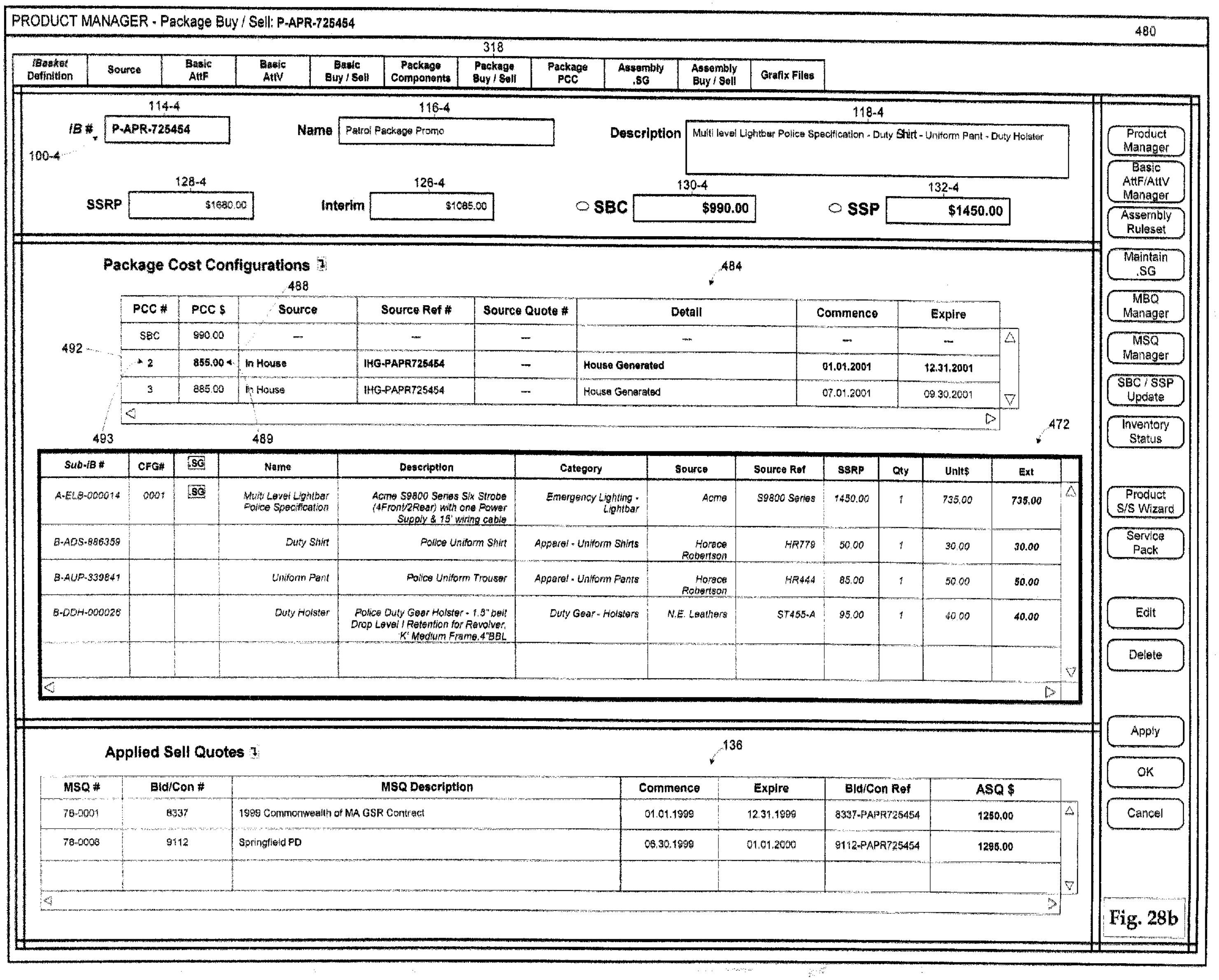

FIGS. 28*a* and 28*b* illustrate a package buy/sell interface 480 of the GUI 97 that allows a user to "fix" or adjust the standard sell price (SSP) 132 of a particular package type consolidation entry (e.g., simple 100-3 or diverse 100-4). Additionally, as with basic type 100-1 and assembly type 100-2 consolidation entries, a user has the ability to view, within the particular package buy/sell interface 480, all buy cost/sell price data relating to a particular package type consolidation entry (e.g., identified by consolidation entry number "P-APR-725454").

In one arrangement, the resource planning application 62 provides the package buy/sell interface 480 to the user in response to the user activating the package buy/sell entry 318 of a particular package type consolidation entry (e.g., simple 100-3 or diverse 100-4). Further, it should be noted, that when activating the package buy/sell interface 480 of a particular package type consolidation entry (e.g., simple 100-3 or diverse 100-4), the user has already defined the particular package type consolidation entry (e.g., simple 100-3 or diverse 100-4), selected the particular sub-consolidations (e.g., basic 100-1 and/or configured assembly 100-2) of that particular package type consolidation entry (e.g., simple 100-3 or diverse 100-4), and listed them in the consolidation entry number field 475 within the related sub-consolidation entry field 170 (e.g., as illustrated in FIGS. 26 and 27).

The package buy/sell interface 480, illustrated in FIGS. 28*a* and 28*b*, includes a diverse package type consolidation entry number field 114-4, a name field 116-4, a description field 118-4, an SSRP field 128-4, an interim cost field 126-4, a standard buy cost field 130-4, and a standard sell price field 132-4, all described in detail above, and all associated with the particular diverse package type consolidation entry 100-4 (e.g., as identified by the consolidation entry number "P-APR-725454"). The package buy/sell interface 480 also includes a PCC details display 484, a PCC sub-consolidation details display 472, and an applied sell quote display 136.

During operation, the SSRP field 128-4, the interim cost field 126-4, the standard buy cost field 130-4, and the standard sell price field 132-4 within the package buy/sell interface 480 of the particular diverse package type consolidation entry 100-4 (e.g., identified by consolidation entry number "P-APR-725454") each reflect a default value which is the total of those values in the matching fields of each of the consolidation entries 100 listed in the consolidation entry number field 475 within the related sub-consolidation entry field 170. The value within the standard sell price field 132-4 alone is editable by the user.

As indicated above, a user may view within a particular package buy/sell interface 480, all buy cost/sell price data relating to a particular package type consolidation entry (e.g., identified by consolidation entry number "P-APR-725454" as illustrated in FIGS. 28*a* and 28*b*). Upon user activation of a particular package buy/sell interface 480, the related PCC details display 484 is defaulted to reflect details of each available PCC 160 of the particular package type consolidation entry (e.g., identified by consolidation entry number "P-APR-725454" as illustrated in FIGS. 28*a* and 28*b*). The first line entry of the PCC details display 484 defaults within the PCC reference number field 492 a particular reference number 493 of "SBC", reflecting the first PCC 160 of the particular package type consolidation entry (e.g., identified by consolidation entry number "P-APR-725454" illustrated in FIGS. 28*a* and 28*b*); resulting from the 'setup' information input by the user when defining the particular package 'product componentry' (e.g., as illustrated in FIGS. 26 and 27). The PCC sub-consolidation details display 472 is defaulted to contain the list of sub-consolidation entries which define the particular package type consolidation entry (e.g., identified by consolidation entry number "P-APR-725454" as illustrated in FIGS. 26 and 27), and whose combined standard buy cost values represent and are reflected as the total standard buy cost value (e.g., "$990.00") of the particular package type consolidation entry (e.g., identified by consolidation entry number "P-APR-725454").

Finally, the resource planning system 62 affords a user the option of highlighting other available PCC 160 selections (e.g., as illustrated in FIG. 28*b*). Exercising this option, and selecting (e.g., highlighting) an available PCC 160 (e.g., as established using the PCC interface 490 described below with respect to FIGS. 29*a* and 29*b*), causes the PCC sub-consolidation details display 472 to reflect the detailed buy cost data of the selected PCC 160.

Figure 29A:
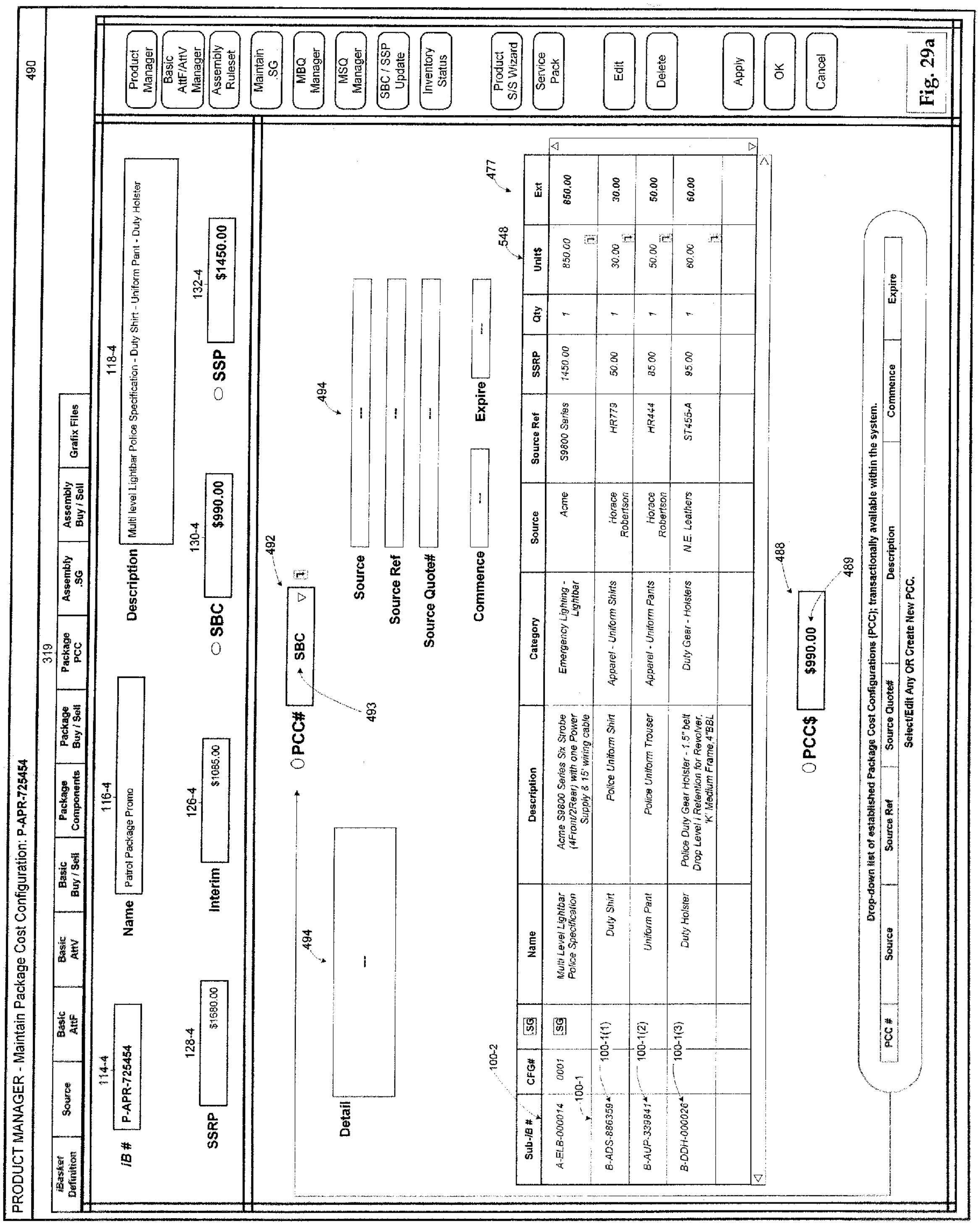
FIGS. 29*a* and 29*b* illustrate a package cost configuration (PCC) interface as used by the computerized resource planning system of FIG. 1.
Figure 29B:
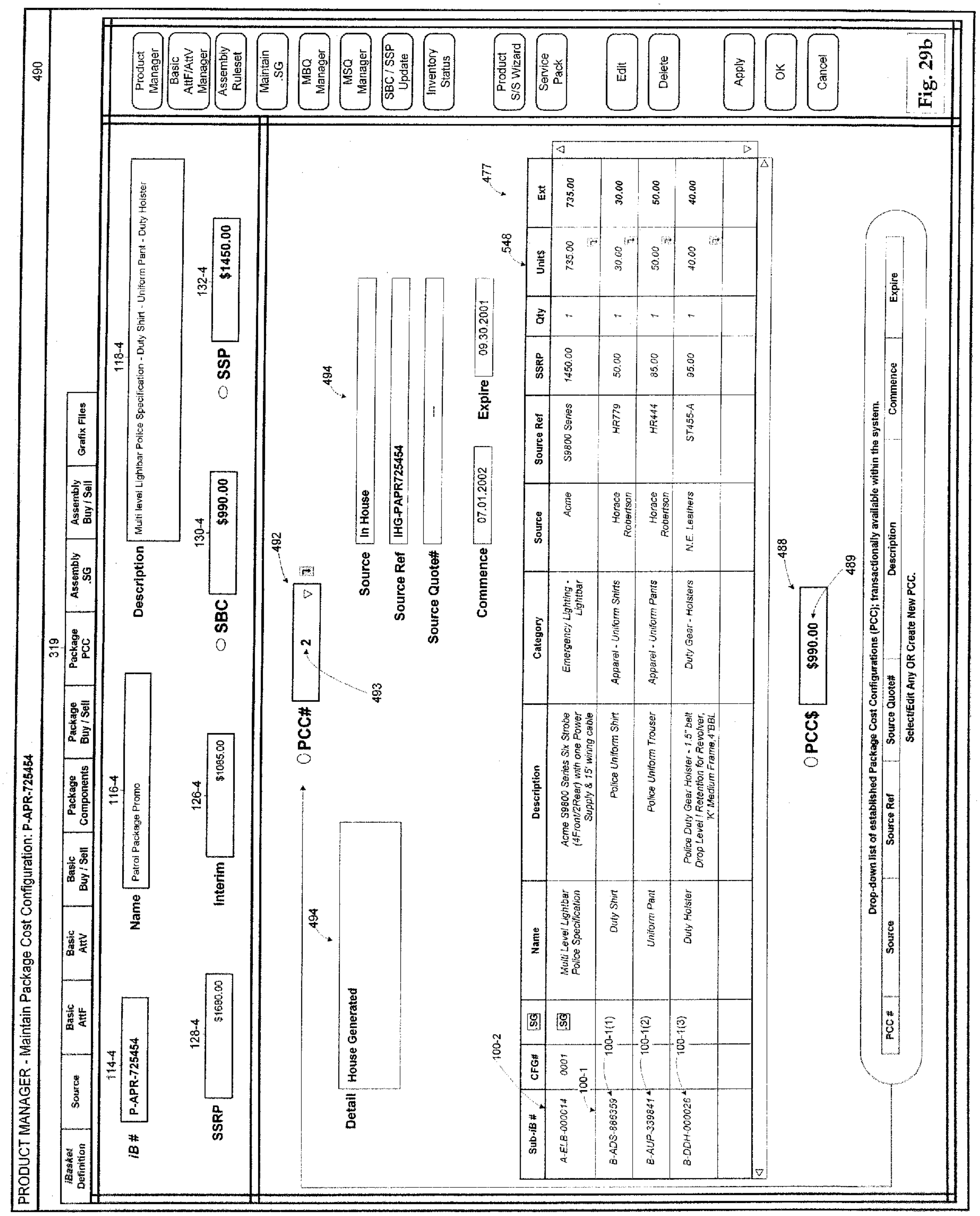

FIGS. 29*a* and 29*b* illustrate a package cost configuration (PCC) interface 490 of the GUI 97 that allows a user to create or edit a particular PCC 160 associated with a particular package type consolidation entry (e.g., simple 100-3 or diverse 100-4). The resource planning application 62 provides the package cost configuration (PCC) interface 490 to a user in response to the user activating the Package PCC entry 319 of a particular package type consolidation entry (e.g., simple 100-3 or diverse 100-4).

The package cost configuration (PCC) interface 490 of the GUI 97, includes a consolidation entry field 114, a name field 116, a description field 118, an SSRP field 128, an interim cost field 126, a standard buy cost field 130, and a standard sell price field 132. The package cost configuration (PCC) interface 490 of the GUI 97 also includes a PCC number field 492, information fields 494, a PCC cost field 488, and a 'dynamic' sub-consolidation detail field 477.

During operation, all fields of the package cost configuration (PCC) interface 490 of a particular package type consolidation entry (e.g., simple 100-3 or diverse 100-4), when initially user-activated, reflect default values identical to those which define the standard buy cost 130 'cost configuration status' of the particular package type consolidation entry (e.g., simple 100-3 or diverse 100-4).

For example, the package cost configuration (PCC) interface 490 of the GUI 97, as shown in FIG. 29*a*, includes a diverse package type consolidation entry number field 114-4 containing the particular consolidation entry number "P-APR-725454", a related name field 116-4, description field 118-4, SSRP field 128-4, interim cost field 126-4, standard buy cost field 130-4, and standard sell price field 132-4. Additionally, the package cost configuration (PCC) interface 490 includes; a PCC reference number field 492 containing the particular PCC reference number 493 of "SBC"; related information fields 494; a PCC cost field 488 containing the particular PCC cost 489 of "$990.00"; and the 'dynamic' sub-consolidation detail field 477 which contains the particular consolidation entries 100 (e.g., as pre-defined and illustrated in FIGS. 26 and 27) which represent the sub-consolidation entries definition or 'product componentry' of the particular diverse package type consolidation entry 100-4 (e.g., identified by consolidation entry number "P-APR-725454"). Each line entry listed in the 'dynamic' sub-consolidation detail field 477, reflects a default value in each unit cost (e.g., Unit $) field 548, equal to the standard buy cost 130 of the listed consolidation entry (e.g., identified as basic type consolidation entries 100-1(1), 100-1(2), and 100-1(3), and 'configured' assembly type consolidation entry 100-2).

Again, in one arrangement, as illustrated in FIG. 29*b*, a user might select a particular PCC reference number 493 (e.g., identified as "New") from the PCC number field 492 of an active package type consolidation entry (e.g., simple 100-3 or diverse 100-4). The default 'product componentry' format (e.g., standard buy cost configuration) of the active package type consolidation entry (e.g., simple 100-3 or diverse 100-4) is then default listed in the related 'dynamic' sub-consolidation detail field 477, with the PCC reference number field 492 reflecting 'no value'. Further, the user inputs data (e.g., source name, source reference number, etc.) related to the particular PCC 160 being created for the active package type consolidation entry (e.g., simple 100-3 or diverse 100-4). A user or enterprise then selects as alternate, any available applied buy quotes for any or all of the consolidation entries (e.g., identified as 100-1(1), 100-1(2), 100-1(3), and 100-2) listed in the related 'dynamic' sub-consolidation detail field 477. The PCC cost field 488 dynamically updates the PCC cost 489 as any available applied buy quote for each consolidation entry (e.g., identified as 100-1(1), 100-1(2), 100-1(3), and 100-2) is user or enterprise selected. Finally, user selection of the "Apply" and "OK" entries causes the system to automatically generate and insert the next sequential PCC reference number 493 (e.g., identified as "2" in FIG. 29) within the PCC reference number field 492, establishing the new PCC 160 within the system 50. The edit of an existing and selected PCC 160 of a particular package type consolidation entry (e.g., simple 100-3 or diverse 100-4) is similarly executed, as described above.

Access and Use of Consolidation Entries

As the enterprise establishes, within the system 50, consolidation entries 100 for the basic type, assembly type, simple package type, and diverse package type products handled (e.g., bought or sold) by the enterprise, the resource planning application 62 provides the enterprise an ability to access the entries in order to manage the inventory and to transact as well as track purchases and sales of products (e.g., as represented by the consolidation entries 100 within the system 50) distributed by the enterprise. The resource planning application 62, for example, provides an interface that allows a user the ability to access (e.g., search for and select) the consolidation entries 100 within the system 50.

FIG. 30 illustrates a product search/select interface 520 of the GUI 97 that illustrates consolidation entries 100, as defined by the enterprise. The product search/select interface 520 provides a user with access (e.g., search and select capability) to all products defined within the system 50 on a consolidated level, and not simply at the lowest level of granularity (e.g., at the product attribute configuration level). By displaying products transacted (e.g., bought or sold) by the enterprise as consolidation entries 100, the product search/select interface 520 minimizes the number of individual tracking references which must be viewed or interacted with by a user. For example, one single consolidation entry 100-1 for a particular basic type product can represent multiple attribute configurations of the basic type product within the enterprise. The resource planning application 62, for example, provides the product search/select interface 520 to a user in response to the user activating a product search/select entry 521. Accordingly, the user conveniently sees one line entry for a particular product (e.g., a particular uniform pant) without being burdened with a multitude of line entries needlessly identifying every permutation of particular color, waist size, inseam size, etc. as shown in FIG. 2.

The product search/select interface 520, as illustrated in FIG. 30, lists examples of consolidation entries 100 defined within the system, including an unconfigured assembly consolidation entry 100-2(1), two configured assembly consolidation entries 100-2(2), 100-2(3), several basic consolidation entries 100-1, a diverse package consolidation entry 100-4, and a simple package consolidation entry 100-3. Also as illustrated, the diverse package consolidation entry 100-4 lists configured assembly and basic consolidation entries (e.g., sub-consolidation entries referenced as "Sub-iB#'s") that define the "product componentry" of the particular diverse package consolidation entry 100-4. Also as illustrated, the simple package consolidation entry 100-3 lists the basic consolidation entries (e.g., sub-consolidation entries referenced as "Sub-iB#'s") that define the "product componentry" of the particular simple package consolidation entry 100-3.

The product search/select interface 520 displays information related to each consolidation entry 100 within the product search/select interface 520. For example, the product search/select interface 520 includes consolidation entry number (e.g., iB#/Sub-iB#) fields 114, configuration number fields 150, .SG (spec graphic) icon fields 522, name fields 116, description fields 118, category fields 112, source fields 120, source reference fields 122, unit measure fields 124, SSRP fields 128, standard buy cost fields 130, applied buy quote fields 134, standard sell price fields 132, and applied sell quote fields 136.

The .SG (spec graphic) icon fields 522 indicate the presence or absence of a .SG (spec graphic) file (e.g., one associated with a corresponding configured or a corresponding 'unconfigured' assembly consolidation entry 100-2). In one arrangement, the presence of a .SG (spec graphic) icon 528 within a .SG (spec graphic) icon field 522 indicates that the associated assembly consolidation entry 100-2 (e.g., 'configured' or 'unconfigured') has an associated .SG (spec graphic) file. For example the .SG (spec graphic) icon field 522 for the 'unconfigured' assembly consolidation entry 100-2(1) includes the .SG (spec graphic) icon 528, thereby indicating the presence of a .SG (spec graphic) file associated with the particular 'unconfigured' assembly consolidation entry 100-2(1).

The applied buy quote fields 134 indicate the presence or absence of any applied buy quotes 134 associated with a consolidation entry 100. In one arrangement, the presence of an applied buy quote icon 530 within an applied buy quote field 134 indicates that the associated consolidation entry 100 has one or more associated applied buy quotes 134 (e.g., as established by the enterprise when defining and/or updating the consolidation entry 100 within the system 50). Upon selection in any consolidation entry 100 of a related applied buy quote icon 530, the user is presented with a drop-down list (e.g., similar to the applied buy quote field 134, illustrated in FIG. 14). Similarly, the applied sell quote fields 136 indicate the presence or absence of any applied sell quotes 136 associated with a consolidation entry 100. In one arrangement, the presence of an applied sell quote icon 532 within an applied sell quote field 136 indicates that the associated consolidation entry 100 has one or more associated applied sell quotes 136 (e.g., as established by the enterprise when defining and/or updating the consolidation entry 100 within the system 50). Upon selection in any consolidation entry 100 of a related applied sell quote icon 532, the user is presented with a drop-down list (e.g., similar to the applied sell quote field 136, illustrated in FIG. 14).

The product search/select interface 520, as described, displays to a user consolidation entries 100 representing products transacted by an enterprise. As described above, a single consolidation entry 100 can represent multiple permutations of a particular product. For example, with respect to FIG. 2, the product named "Uniform Pant" has thirty-six individual permutations. The enterprise, however, represents all permutations as a single consolidation entry 100. Each consolidation entry 100, therefore, provides a shorthand representation of multiple permutations (e.g., all of the attributes configurations) of a product handled by the enterprise. As such, the product search/select interface 520 provides a user with access to "full product" information relating to the actual products transacted by an enterprise while minimizing the actual number of individual entries (e.g., for individual attributes configurations of the products) viewed by a user, thereby minimizing the amount of time spent by the user in accessing product information within an enterprise.

In one arrangement, the user accesses the product search/select interface 520 in order to develop transactional orders; such as, for example, purchase orders and sales orders for transacting various products handled by the enterprise.

Figure 31:
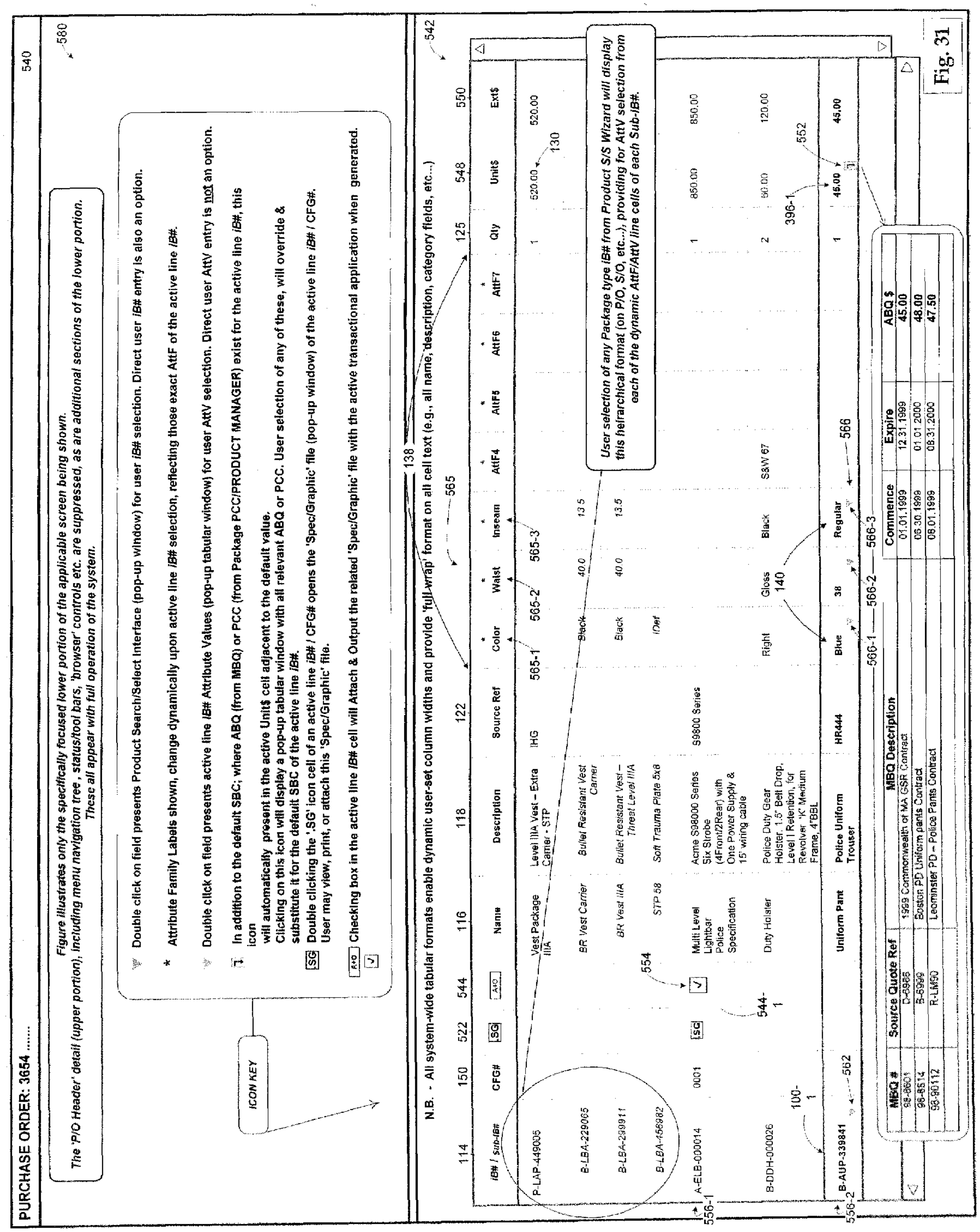
FIG. 31 illustrates an example of a purchase order interface as used by the computerized resource planning system of FIG. 1.

FIG. 31 illustrates an example of a purchase order interface 540 provided to a user by the resource planning application 62. The purchase order interface 540 allows a user to select a consolidation entry 100 within the system 50 (e.g., via the product search/select interface 520) and enter the selection within a purchase order table 542 in order to generate a purchase order to a source (e.g., supplier) for purchase of the particular product represented within the system 50 by the configuration entry 100. The purchase order table 542 includes consolidation entry number (e.g., iB#/Sub-iB#) fields 114, configuration number fields 150, .SG (spec graphic) icon fields 522, name fields 116, description fields 118, source reference fields 122, attribute family fields 138 (e.g., up to seven), all described above. The purchase order table 542 also includes attach and output fields 544, unit quantity (e.g., "Qty") fields 125, unit cost (e.g., "Unit$") fields 548, and total cost (e.g., "Ext$") fields 550.

Each unit cost (e.g., "Unit$") field 548 includes a purchase cost, such as a standard buy cost, associated with a consolidation entry 100. Each unit quantity (e.g., "Qty") field 125 includes a total number of products (e.g., a total number of unit measures 124 of the product) being purchased by the enterprise using the particular transactional consolidation entry within the system 50. The total cost field 550 includes a total purchase cost (e.g., a calculated cost extension), generated by multiplying the number of units requested within the unit quantity (e.g., "Qty") field 125 by the cost within the unit cost (e.g., Unit$") field 548.

The attach and output fields (e.g., "A+O") 544 allows a user to attach the particular .SG (spec graphic) file to the purchase order by selecting or inputting an attach and output icon 554 within an attach and output field 544 for a particular configuration entry 100. For example, as illustrated in FIG. 31, a purchase order table row 556-1 within the purchase order table 542 represents the 'configured' assembly type product "Multi Level Lightbar Police Specification" as described in FIGS. 20-22. When the user selects an attach and output icon 554 in the attach and output field 544-1, the resource planning application 62 attaches the particular and related .SG (spec graphic) file (e.g., as described in FIGS. 20-22) to the purchase order. When the resource planning application 62 generates a final (e.g., transactional) purchase order, such as a 'hard-copy' printout of the purchase order, the resource planning application 62 produces an accompanying attached output 560 (e.g., as illustrated in FIG. 32) which reflects the particular attributes configuration of the particular 'configured' assembly type product.

Returning to FIG. 31, during operation, a user populates the purchase order table 542 with consolidation entries 100 by selecting a menu icon 562 within a consolidation entry number (e.g., iB#/Sub-iB#) field 114 to access the product search/select interface 520. From the product search/select interface 520, the user selects a particular consolidation entry and, in turn, the resource planning application 62 provides within the associated consolidation entry number (e.g., iB#/Sub-iB#) fields 114, configuration number field 150, .SG (spec graphic) icon field 522, name field 116, description field 118, source reference field 122, and unit cost field 548, default information associated with the selected consolidation entry. For example, as shown within table entry 556-2, the user has selected the consolidation entry 100-1 for "Uniform Pant" (e.g., as described with respect to FIGS. 9-14) and the resource planning application 62 defaults the above-listed information within the purchase order table 542.

With respect to the attribute family fields 138, the resource planning application 62 provides attribute family labels 565 corresponding to the selected consolidation entry 100-1. For example, for the consolidation entry 100-1 for "Uniform Pant", the resource planning application 62 displays the attribute family labels 565 of "color" 565-1, "waist" 565-2, and "inseam" 565-3 as associated with the consolidation entry 100-1 and as described above with respect to FIG. 12.

Each attribute family field 138 for a particular consolidation entry 100 includes a menu icon 566 that allows a user to select particular attribute values 140 associated with each attribute family 138 to define a particular attributes configuration of the particular product for purchase from a product source. For example, for the consolidation entry 100-1 named "Uniform Pant", the user activates the menu icon 566-1 to select a particular color (e.g., "blue") for a particular uniform pant product. The user activates the menu icon 566-2 to select a particular waist size (e.g., "38") for the particular uniform pant product and activates the menu icon 566-3 to select a particular inseam measurement (e.g., "regular) for the particular uniform pant product. As such, the user defines a particular attributes configuration of the particular uniform pant product, using information from the general consolidation entry 100-1, to generate a purchase order.

As indicated above, the unit cost field 548 provides, as a default, the standard buy cost 130 for a product (e.g., as represented by the consolidation entry 100 within the system). However, as also described above earlier, certain basic type consolidation entries 100-1 or assembly type consolidation entries 100-2 can have associated applied buy quotes 134. Additionally, certain simple 100-3 and diverse 100-4 package type consolidation entries can have associated PCC 160. As such, the purchase order interface 540 is configured to allow a user to modify (e.g., substitute) the standard buy cost

130 displayed (e.g., as defaulted) within the unit cost (e.g., "Unit$") field 548 with an associated applied buy quote 134 or PCC 160.

In one arrangement, the unit cost (e.g., "Unit$") field 548 includes a menu icon 552. When the resource planning application 62 displays the menu icon 552 within a unit cost (e.g., "Unit$") field 548 of a particular consolidation entry 100, the resource planning application 62 indicates to the user the existence of one or more applied buy quotes 134 or PCC's 160 associated with the particular consolidation entry 100. For example, for the consolidation entry 100-1 named "Uniform Pant", the resource planning application 62 displays the menu icon 552. When the user selects the icon the resource planning application 62 displays an applied buy quote table 134, such as illustrated in FIG. 14, to the user. The user then selects an appropriate applied buy quote entry 134-1 from the table 134. In response, the resource planning application 62 substitutes the applied buy quote cost 396-1 (e.g., "ABQ$" with a value of $45.00 as illustrated in FIG. 14) for the default standard buy cost 130 (e.g., "SBC" with a value of $50.00 as illustrated in FIG. 14).

It should be understood that the purchase order interface 540, as well as including the above described purchase order table 542 (e.g., as illustrated in the lower half of FIG. 31), also includes a purchase order header field 580 (e.g., as indicated in the upper half of FIG. 31). The purchase order header field 580 includes information (e.g., various data fields, etc. . . . ) relating to a particular purchase order, and is activated and operational in the GUI 97 of the resource planning application 62, as a user or enterprise is defining or editing a particular purchase order within the system 50.

Figure 33:
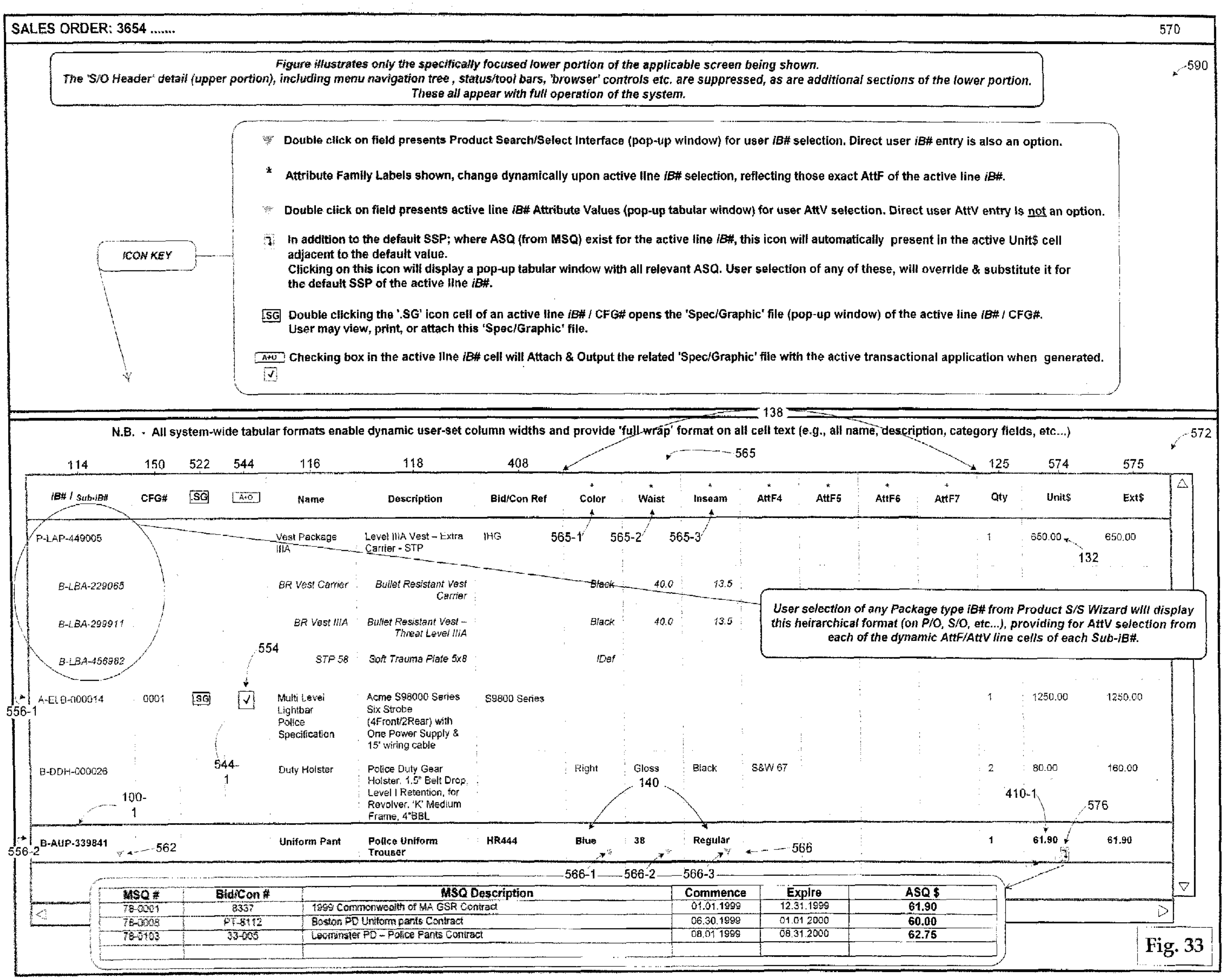
FIG. 33 illustrates an example of a sales order interface as used by the computerized resource planning system of FIG. 1.

FIG. 33 illustrates an example of a sales order interface 570 provided to a user by the resource planning application 62. The sales order interface 570 allows a user to select a consolidation entry 100 within the system 50 (e.g., via the product search /select interface 520) and enter the selection within a sales order table 572 in order to generate a sales order to a customer for sale of the particular product represented within the system 50 by the configuration entry 100. The sales order table 572 includes consolidation entry number (e.g., iB#/Sub-iB#) fields 114, configuration number fields 150, .SG (spec graphic) icon fields 522, name fields 116, description fields 118, bid/con reference fields 408, attribute family fields 138 (e.g., up to seven), all described above. The sales order table 572 also includes attach and output fields 544, unit quantity (e.g., "Qty") fields 125, unit price (e.g., "Unit$") fields 574, and total price (e.g., "Ext$") fields 575.

Each unit price (e.g., "Unit$") field 574 includes a selling price, such as a standard sell price, associated with a consolidation entry 100. Each unit quantity (e.g., "Qty") field 125 includes a total number of products (e.g., a total number of unit measures 124 of the product) being sold by the enterprise using the particular transactional consolidation entry within the system 50. The total price field 575 includes a total sale price (e.g., a calculated price extension), generated by multiplying the number of units requested within the unit quantity (e.g., "Qty") field 125 by the price within the unit price (e.g., Unit$") field 574.

The attach and output fields (e.g., "A+O") 544 allows a user to attach the particular .SG (spec graphic) file to the sales order (e.g., inclusive or non-inclusive of prices) by selecting or inputting an attach and output icon 554 within an attach and output field 544 for a particular configuration entry 100. For example, as illustrated in FIG. 33, a sales order table row 586-1 within the sales order table 572 represents the 'configured' assembly type product "Multi Level Lightbar Police Specification" as described in FIGS. 20-22. When the user selects an attach and output icon 554 in the attach and output field 544-1, the resource planning application 62 attaches the particular and related .SG (spec graphic) file (e.g., as described in FIGS. 20-22) to the sales order. When the resource planning application 62 generates a final (e.g., transactional) sales order, such as a 'hard-copy' printout of the sales order, the resource planning application 62 produces an accompanying attached output 560 (e.g., as illustrated in FIG. 32, and inclusive or non-inclusive of prices) which reflects the particular attributes configuration of the particular 'configured' assembly type product.

Returning to FIG. 33, during operation, a user populates the sales order table 572 with consolidation entries 100 by selecting a menu icon 562 within a consolidation entry number (e.g., iB#/Sub-iB#) field 114 to access the product search/select interface 520. From the product search/select interface 520, the user selects a particular consolidation entry and, in turn, the resource planning application 62 provides within the associated consolidation entry number (e.g., iB#/Sub-iB#) fields 114, configuration number field 150, .SG (spec graphic) icon field 522, name field 116, description field 118, source reference field 122, and unit price field 574, default information associated with the selected consolidation entry. For example, as shown within table entry 556-2, the user has selected the consolidation entry 100-1 for "Uniform Pant" (e.g., as described with respect to FIGS. 9-14) and the resource planning application 62 defaults the above-listed information within the sales order table 572.

With respect to the attribute family fields 138, the resource planning application 62 provides attribute family labels 565 corresponding to the selected consolidation entry 100-1. For example, for the consolidation entry 100-1 for "Uniform Pant", the resource planning application 62 displays the attribute family labels 565 of "color" 565-1, "waist" 565-2, and "inseam" 565-3 as associated with the consolidation entry 100-1 and as described above with respect to FIG. 12.

Each attribute family field 138 for a particular consolidation entry 100 includes a menu icon 566 that allows a user to select particular attribute values 140 associated with each attribute family 138 to define a particular attributes configuration of the particular product for sale to a customer. For example, for the consolidation entry 100-1 named "Uniform Pant", the user activates the menu icon 566-1 to select a particular color (e.g., "blue") for a particular uniform pant product. The user activates the menu icon 566-2 to select a particular waist size (e.g., "38") for the particular uniform pant product and activates the menu icon 566-3 to select a particular inseam measurement (e.g., "regular) for the particular uniform pant product. As such, the user defines a particular attributes configuration of the particular uniform pant product, using information from the general consolidation entry 100-1, to generate a sales order.

As indicated above, the unit price field 574 provides, as a default, the standard sell price 132 for a product (e.g., as represented by the consolidation entry 100 within the system). However, as also described above earlier, certain consolidation entries 100 can have associated applied sell quotes 136. As such, the sales order interface 570 is configured to allow a user to modify (e.g., substitute) the standard sell price 132 displayed (e.g., as defaulted) within the unit price (e.g., "Unit$") field 574 with an associated applied sell quote 136.

In one arrangement, the unit price (e.g., "Unit$") field 574 includes a menu icon 576. When the resource planning application 62 displays the menu icon 576 within a unit price (e.g., "Unit$") field 574 of a particular consolidation entry 100, the resource planning application 62 indicates to the user the existence of one or more applied sell quotes 136 associated with the particular consolidation entry 100. For example, for the consolidation entry 100-1 named "Uniform Pant", the resource planning application 62 displays the menu icon 576. When the user selects the icon the resource planning application 62 displays an applied sell quote table 136 such as illustrated in FIG. 14, to the user. The user then selects an appropriate applied sell quote entry 136-1 from the table 136. In response, the resource planning application 62 substitutes the applied sell quote price 410-1 (e.g., "ASQ$" with a value of $61.90 as illustrated in FIG. 14) for the default standard sell price 132 (e.g., "SSP" with a value of $75.00 as illustrated in FIG. 14).

Lastly, the sales order interface 570, as well as including the above described sales order table 572 (e.g., as illustrated in the lower half of FIG. 33), also includes a sales order header field 590 (e.g., as indicated in the upper half of FIG. 33). The sales order header field 590 includes information (e.g., various data fields, etc. . . . ) relating to a particular sales order, and is activated and operational in the GUI 97 of the resource planning application 62, as a user or enterprise is defining or editing a particular sales order within the system 50, and functions similarly to the purchase order header field 580, indicated in FIG. 31.

It should be understood that the system 50 provides a variety of maintenance features that enable one or more users to easily control and adjust particular aspects of the system 50. For example, users may wish to effectuate standard buy cost 130, and/or standard sell price 132, and/or MSRP 128 value adjustments on a global level, where feasible, without having to meticulously modify each consolidation entry 100 on an individual window-by-window basis.

As illustrated in FIGS. 34-37 (e.g., collectively defined as the update interface group 601, and individually defined as: "update selection interface" 610 illustrated in FIG. 34, "update SBC interface" 620 illustrated in FIG. 35, "update SSP interface" 630 illustrated in FIG. 36, and "update SSRP interface" 640 illustrated in FIG. 37), the resource planning application 62 is configured to either execute or enable the update of the standard buy cost, and/or the standard sell price, and/or the SSRP of consolidation entries 100, on a global or on an individual basis within the system 50.

FIG. 34 illustrates an update selection interface 610 of the GUI 97 that allows a user to select particular consolidation entries 100 for update of certain of the fields for standard buy cost 130, and/or standard sell price 132, and/or SSRP 128 of certain selected consolidation entries 100. In one arrangement, the resource planning application 62 provides the update selection interface 610 to the user as the default interface (e.g., of the four above indicated update interfaces) in response to the user activating a SBC/SSP update entry 600.

The update selection interface 610 provides current information (e.g., user, enterprise, or system edited or updated standard buy cost 130, standard sell price 132, or SSRP 128 data of all consolidation entries 100) found in the product search/select interface 520, along with consolidation entry check fields 604. Additionally included in the update selection interface 610 are a selection entry 611, a SBC entry 621, a SSP entry 631, a SSRP entry 641, and a set selection entry 605.

During operation a user selects (e.g., "checks") particular entry check fields 604 for those configuration entries 100 selected for update of standard buy cost 130, and/or standard sell price 132, and/or SSRP 128. Additionally, a user activates a set selection entry 605, which "sets" (e.g., within the GUI 97 of the resource planning system 62) the selection of consolidation entries 100, in preparation for user or enterprise update of the SBC 130, and/or SSP 132, and/or SSRP 128 of the selected consolidation entriesloo. For example, as shown in FIG. 34, a user has selected those consolidation entry check fields 604 corresponding to an assembly type consolidation entry 100-2, three basic type consolidation entries 100-1(1), 100-1(2), 100-1(3), and a simple package type consolidation entry 100-3, as well as activated the set selection entry 605.

In one arrangement, activating the set selection entry 605 defaults an update SBC interface 620 (e.g., as illustrated in FIG. 35) reflecting all the selected consolidation entries 100 (e.g., illustrated as checked in FIG. 34). It should be noted that user or enterprise value adjustment of the SBC 130 of consolidation entries 100 selected in the update selection interface 610, applies only to the basic type consolidation entries 100-1 in the selection. The SBC 130 of any selected configured assembly type consolidation entry 100-2 is automatically system-updated as the SBC value of any of the cost variable AttV in the related attributes configuration are updated. The SBC 130 of simple package 100-3 and diverse package 100-4 type consolidation entries are automatically system-updated as the SBC 130 of contained sub-iB#'s are updated.

FIG. 35 illustrates an update SBC interface 620 of the GUI 97 that allows a user to adjust the SBC 130 for selected basic type consolidation entries 100-1 (e.g., user or enterprise selected as illustrated in FIG. 34). In one arrangement, the resource planning application 62 provides the update SBC interface 620 to the user in response to the user having activated a set selection entry 605 (e.g., as illustrated in FIG. 34). Alternatively, a user might access the update SBC interface 620 from another interface (e.g., "update selection interface" 610 illustrated in FIG. 34, or "update SSP interface" 630 illustrated in FIG. 36, or "update SSRP interface" 640 illustrated in FIG. 37) within an 'active' update interface group 601.

As illustrated in FIG. 35, where for example, the cell edit update calculator field 627-3 has been user-selected, the user enters adjusted SBC 130 within the related SBC adjustment fields 624 of the basic type consolidation entries 100-1(1), 100-1(2), and 100-1(3), as provided in the update SBC interface 620. The user then may elect to i) proceed to activate the SSP interface 630 (e.g., as illustrated in FIG. 36) by selecting an SSP entry 631, and enter adjusted SSP 132 in their respective adjustment fields 634, ii) proceed to activate the SSRP interface 640 (e.g., as illustrated in FIG. 37) by selecting an SSRP entry 641, and enter adjusted SSRP 128 in their respective SSRP adjustment fields 644, or iii) proceed to select an Apply entry 629 and an OK entry 628 to update all the SBC 130, SSP 132, and SSRP 128 of all the consolidation entries 100 updated in the currently 'active' update interface selection group 601 within the system 50.

Finally, the user has available two additional update calculator fields 627 (e.g., fixed % update calculator field 627-1 and fixed amount update calculator field 627-2) and related calculate update entries 626 (e.g., fixed % calculate update entry 626-1 and fixed amount calculate update entry 626-2), with which to effect simultaneous value updates for multiple SBC adjustment fields 624 of the 'active' update selection of consolidation entries 100. Additionally, election and execution by the user or enterprise of option iii) above, will cause the resource planning application 62 to generate a printable list (e.g., a 'found in' list) of each package type consolidation entry (e.g., simple 100-3 and/or diverse 100-4) that contains, as sub-consolidation entries, any of the basic type 100-1 (e.g., "B-ADS-886359", "B-DDH-000026", "B-LBA-299911" as illustrated in FIGS. 35-37) or configured assembly type 100-2 (e.g., "A-ELB-000014"-"0001" as illustrated in FIGS. 35-37) consolidation entries from the 'active' update selection; thus enabling the completion of any of these additionally required SBC 130, SSP 132, and SSRP 128 updates within the system 50.

Figure 36:
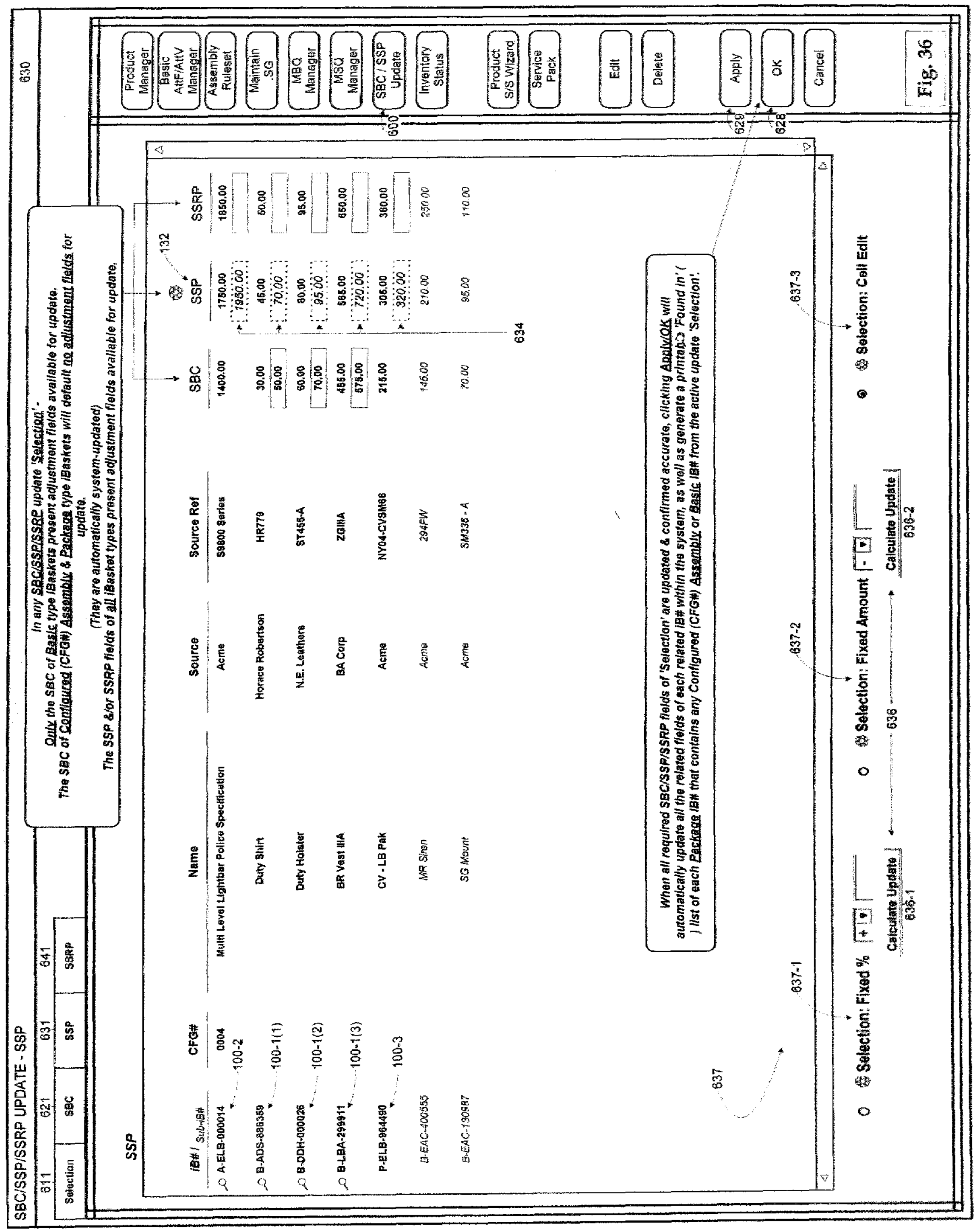
FIG. 36 illustrates an Update Standard Sell Price interface as used by the computerized resource planning system of FIG. 1.
Figure 37:
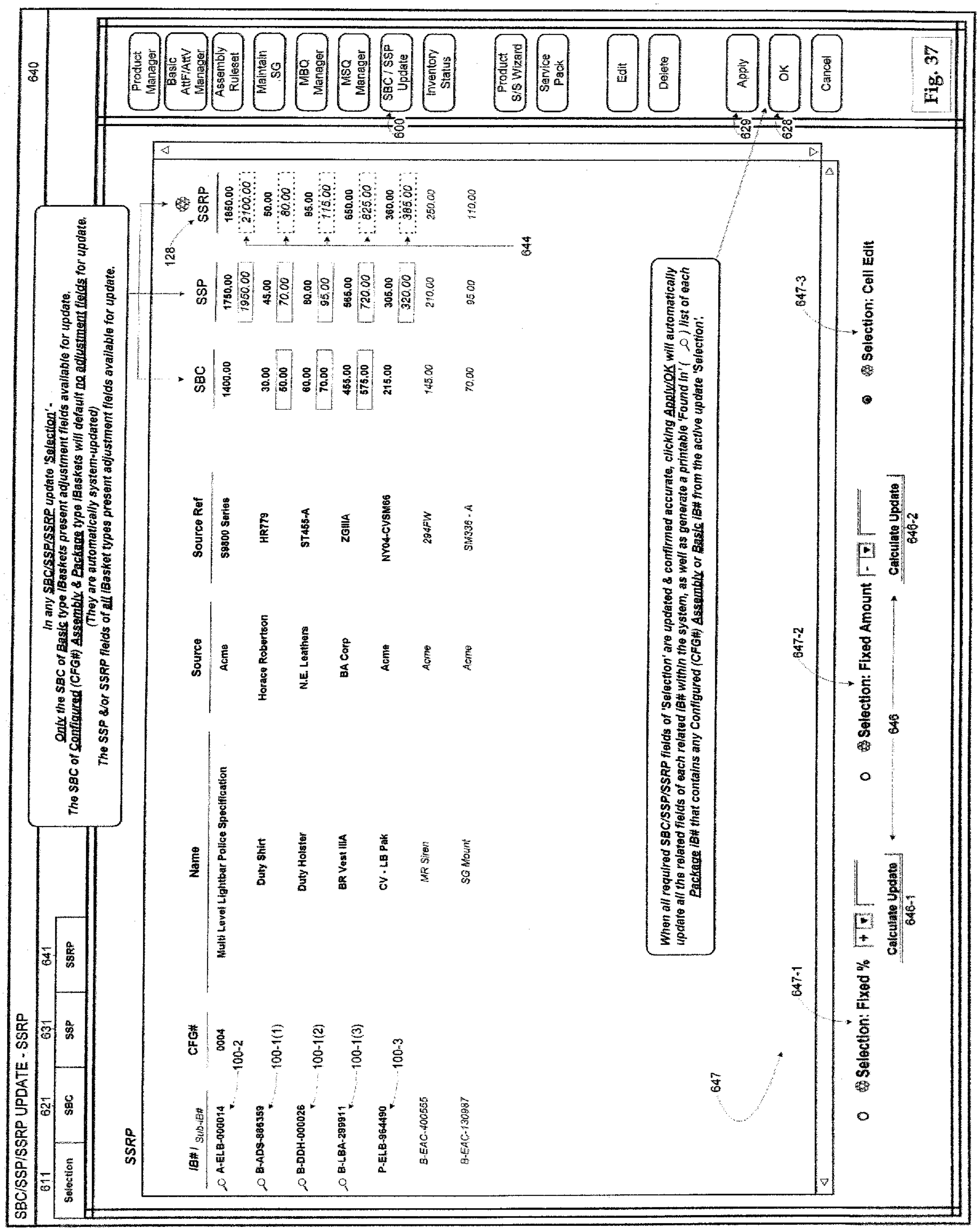
FIG. 37 illustrates an Update SSRP interface as used by the computerized resource planning system of FIG. 1.

FIG. 36 illustrates an update SSP interface 630 of the GUI 97 that allows a user to adjust the SSP 132 for selected consolidation entries 100 (e.g., user or enterprise selected as illustrated in FIG. 34). In one arrangement, the resource planning application 62 provides the update SSP interface 630 to the user in response to the user having activated the SSP entry 631 within an active update interface selection group 601.

As illustrated in FIG. 36, where for example, the cell edit update calculator entry 637-3 has been user selected, the user enters adjusted SSP 132 within the related SSP adjustment fields 634 of the consolidation entries 100 as provided in the update SSP interface 630. The user then may elect to i) proceed to activate the SSRP interface 640 (e.g., as illustrated in FIG. 37) by selecting an SSRP entry 641, and enter adjusted SSRP 128 in their respective adjustment fields 644, ii) proceed to activate the SBC interface 620 (e.g., as illustrated in FIG. 35) by selecting an SBC entry 621, and enter adjusted SBC 130 in their respective SBC adjustment fields 624, or iii) proceed to select an Apply entry 629 and an OK entry 628 to update all the SBC 130, SSP 132, and SSRP 128 of all the consolidation entries 100 updated in the currently 'active' update interface selection group 601 within the system 50.

Finally, the user has available two additional update calculator fields 637 (e.g., fixed % update calculator field 637-1 and fixed amount update calculator field 637-2) and related calculate update entries 636 (e.g., fixed % calculate update entry 636-1 and fixed amount calculate update entry 636-2), with which to effect simultaneous value updates for multiple SSP adjustment fields 634 of the 'active' update selection of consolidation entries 100. Additionally, election and execution by the user or enterprise of option iii) above, will cause the resource planning application 62 to generate a printable list (e.g., a 'found in' list) of each package type consolidation entry (e.g., simple 100-3 and/or diverse 100-4) that contains, as sub-consolidation entries, any of the basic type 100-1 (e.g., "B-ADS-886359", "B-DDH-000026", "B-LBA-299911" as illustrated in FIGS. 35-37) or configured assembly type 100-2 (e.g., "A-ELB-000014"-"0001" as illustrated in FIGS. 35-37) consolidation entries from the 'active' update selection; thus enabling the completion of any of these additionally required SBC 130, SSP 132, and SSRP 128 updates within the system 50.

FIG. 37 illustrates an update SSRP interface 640 of the GUI 97 that allows a user to adjust the SSRP 128 for selected consolidation entries 100 (e.g., user or enterprise selected as illustrated in FIG. 34). In one arrangement, the resource planning application 62 provides the update SSRP interface 640 to the user in response to the user having activated the SSRP entry 641 within an 'active' update interface selection group 601.

As illustrated in FIG. 37, where for example, the cell edit update calculator entry 647-3 has been user selected, the user enters adjusted SSRP 128 within the related SSRP adjustment fields 644 of the consolidation entries 100 as provided in the update SSRP interface 640. The user then may elect to i) proceed to activate the SSP interface 630 (e.g., as illustrated in FIG. 36) by selecting an SSP entry 631, and enter adjusted SSP 132 in their respective SSP adjustment fields 634, ii) proceed to activate the SBC interface 620 (e.g., as illustrated in FIG. 35) by selecting an SBC entry 621, and enter adjusted SBC 130 in their respective SBC adjustment fields 624, or iii) proceed to select an Apply entry 629 and an OK entry 628 to update all the SBC 130, SSP 132, and SSRP 128 of all the consolidation entries 100 updated in the currently 'active' update interface selection group 601 within the system 50.

Finally, the user has available two additional update calculator fields 647 (e.g., fixed % update calculator field 647-1 and fixed amount update calculator field 647-2) and related calculate update entries 646 (e.g., fixed % calculate update entry 646-1 and fixed amount calculate update entry 646-2), with which to effect simultaneous value updates for multiple SSRP adjustment fields 644 of the active update selection of consolidation entries 100. Additionally, election and execution by the user or enterprise of option iii) above, will cause the resource planning application 62 to generate a printable list (e.g., a 'found in' list) of each package type consolidation entry (e.g., simple 100-3 and/or diverse 100-4) that contains, as sub-consolidation entries, any of the basic type 100-1 (e.g., "B-ADS-886359", "B-DDH-000026", "B-LBA-299911" as illustrated in FIGS. 35-37) or configured assembly type 100-2 (e.g., "A-ELB-000014"-"0001" as illustrated in FIGS. 35-37) consolidation entries from the 'active' update selection; thus enabling the completion of any of these additionally required SBC 130, SSP 132, and SSRP 128 updates within the system 50.

The resource planning application 62 also provides a user with the ability to track the inventory of products associated with the consolidation entries 100 within the system 50. For example, returning to FIG. 30, to determine the inventory status of products related to a particular consolidation entry 100, a user selects a consolidation entry 100 from the product search/select interface 520 and activates an inventory status entry 333 associated with the consolidation entry interface.

It should be understood that the system 50 does allow the user to access product information at the lowest granular level if desired. In particular, the system 50 enables the user to view various aspects of product information at the lowest granular level, but still without having to painstakingly view each unique attribute value permutation on a line-by-line basis.

Figure 38:
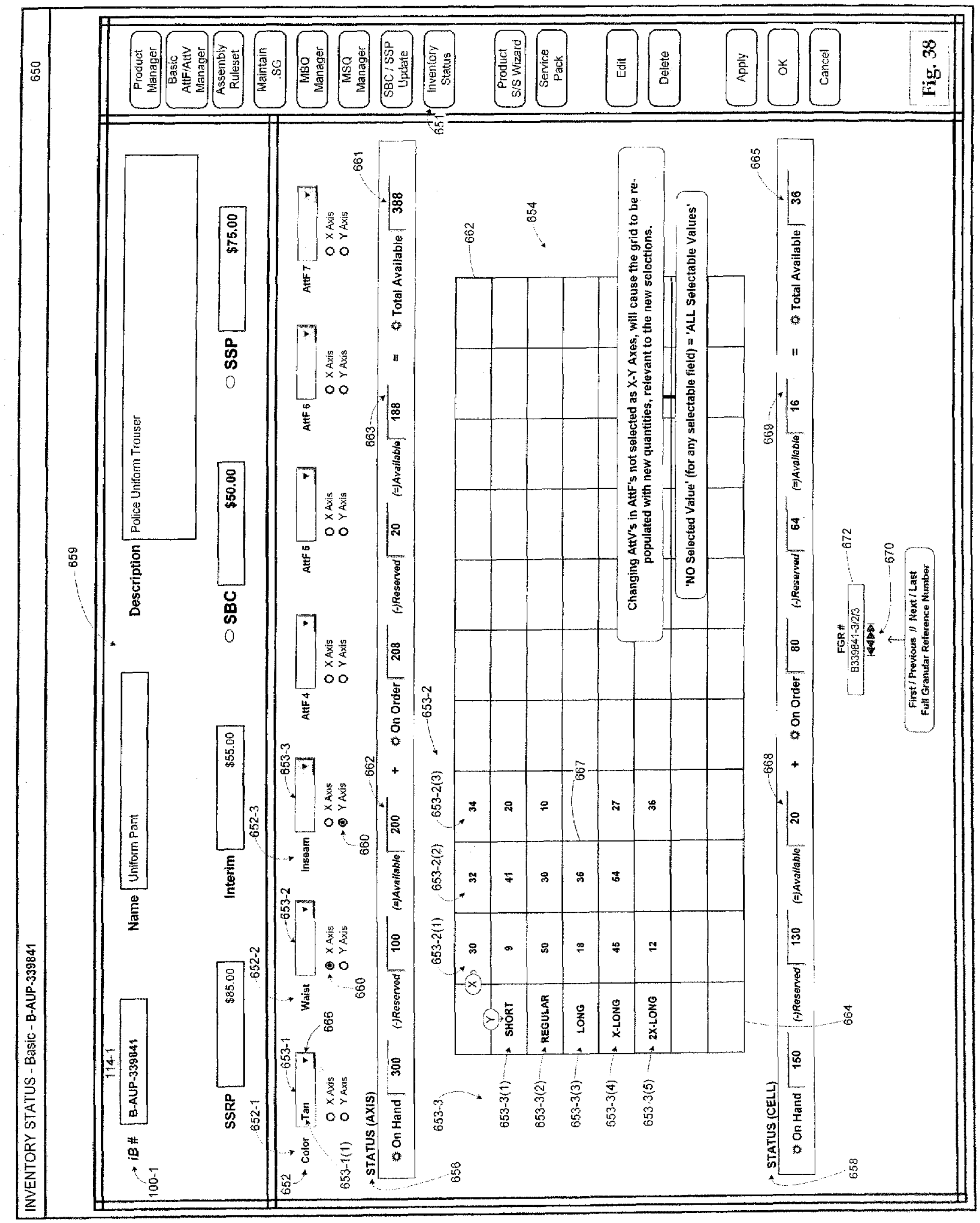
FIG. 38 illustrates an inventory status basic interface for a basic type product as used by the computerized resource planning system of FIG. 1.

FIG. 38 illustrates an inventory status basic interface 650 of the GUI 97 when the user selects a particular basic type consolidation entry 100-1 (e.g., from the product search/select interface 520, as illustrated in FIG. 30), and activates an inventory status entry 651. The inventory status basic interface 650 includes an active basic reference display 659, attribute family fields 652 having associated axis entries 660, an inventory matrix 654, a status (axis) display 656, a status (cell) display 658, and a full granular reference number (FGR#) field 672.

The attribute family fields 652 display as active, the attribute families associated with the particular basic type consolidation entry 100-1. For example, as illustrated in FIG. 38, for the particular basic type consolidation entry 100-1 having the consolidation entry number "B-AUP-339841", the resource planning application 62 displays the particular active attribute families of "color" 652-1, "waist" 652-2, and "inseam" 652-3 associated with the particular consolidation entry 100-1.

The axis entries 660 associated with each attribute family field 652 allow a user to assign a first selection from the active attribute family fields 652 as the x-axis of the inventory matrix 654 and a second selection from the active attribute family fields 652 as the y-axis of the inventory matrix 654. For example, as illustrated in FIG. 38, the user has selected the active attribute family "waist" 652-2 as the x-axis for the inventory matrix 654 and the active attribute family "inseam" 652-3 as the y-axis for the inventory matrix 654.

The inventory matrix 654 displays inventory statistics for the particular active product (e.g., represented by the particular basic type consolidation entry 100-1 as referenced by the particular basic type consolidation entry number 114-1 "B-AUP-339841") based upon it's associated attribute families 652 and their included attribute values 653, as selected by the user in preparing the particular matrix 'attribute family 652/attribute value 653 definition' (e.g., '. . . selection', '. . . configuration', or '. . . format', etc.) to be reflected by the inventory matrix 654. For example, where the user selects the active attribute family "waist" 652-2 as the x-axis, the resource planning application 62 enters the associated attribute values "30" 653-2(1), "32" 653-2(2), and "34" 653-2(3) along an x-axis row 662 of the inventory matrix 654. Additionally, when the user selects the active attribute family "inseam" 652-3 as the y-axis, the resource planning application 62 enters the associated attribute values "short" 653-3(1), "regular" 653-3(2), "long" 653-3(3), "x-long" 653-3(4), and "2×-long" 653-3(5) along a y-axis column 664 of the inventory matrix 654. The resource planning application 62 then populates the inventory matrix 654 with a quantity of inventoried product; this according to the particular matrix 'attribute family 652/attribute value 653 definition' (e.g., '. . . selection', '. . . configuration', or '. . . format', etc.) as user-selected to be represented in the inventory matrix 654. As illustrated in FIG. 38, for example, the resource planning application 62 indicates that the enterprise has nine available tan uniform pants having a short inseam and a waist of 30, and fifty available tan uniform pants having a regular inseam and a waist of 30, etc.

The resource planning application 62 allows a user to further adjust the inventory information provided by the inventory matrix 654. As described above, a user selects a first from the active attribute family fields 652 as the x-axis of the inventory matrix 654 and a second from the active attribute family fields 652 as the y-axis of the inventory matrix 654. As such, the inventory status basic interface 650 may, and often does include one or more 'unselected' active attribute family fields 652, such as the attribute family "color" 652-1, again illustrated in FIG. 38. The 'unselected' active attribute family field "color" 652-1 includes a menu icon 666, that enables a user to select a particular attribute value 653-1 from those included in the 'unselected' active attribute family "color" 652-1, in order to adjust or modify the inventory information provided by the inventory matrix 654 (e.g., according to a particular selected attribute value 653-1). For example, the user has selected the particular attribute value 653-1(1) of "tan" from those particular attribute values 653-1 (e.g., "tan" 653-1{1}, "white" 653-1{2}, "yellow" 653-1{3}, etc.) included in the 'unselected' active attribute family "color" 652-1. As such, the inventory matrix 654 displays only the inventory information for available "tan" uniform pants for all associated "waist" attribute values 653-2 (e.g., "30" 653-2{1}, "32" 653-2{2}, 653-2{3}) and all associated "inseam" attribute values 653-3 (e.g., "short" 653-3 {1}, "regular" 653-3{2}, "long" 653-3{3}, etc.).

In the case where a user does not select a particular attribute value 653 from an 'unselected' active attribute family field 652, the resource planning application 62 modifies the inventory availability information provided by the inventory matrix 654 to reflect the inventory availability information according to the totals for all the particular attribute values 653 included in the particular 'unselected' active attribute family field 652. For example, assume the user does not select a particular attribute value 653-1, as available from and included in the particular 'unselected' active attribute family "color" 652-1 (e.g., as illustrated in FIG. 38); and instead, leaves the attribute family field 652-1 as unselected (e.g., with no selected attribute value 653-1). As such, in the present example, the resource planning application 62 populates the inventory matrix 654 with inventory availability information for the particular uniform pant product in all the associated "color" attribute values 653-1 (e.g., "tan" 653-1 {1}, "white" 653-1 {2}, "yellow" 653-1 {3}, etc.), and in all the associated "waist" attribute values 653-2 (e.g., "30" 653-2{1}, "32" 653-2{2}, 653-2{3}), and in all the associated "inseam" attribute values 653-3 (e.g., "short" 653-3{1}, "regular" 653-3{2}, "long" 653-3{3}, etc.) of the particular uniform pant product (e.g., represented by the particular basic type consolidation entry 100-1 as referenced by the particular basic type consolidation entry number 114-1 "B-AUP-339841").

The status (axis) display 656 provides a user with total inventory availability information 661 regarding the number of product units available for the entire inventory matrix 654 (e.g., defined as above). The status (axis) display 656 provides the total inventory availability information 661 as the sum of an available "on hand" 662 number of product units (e.g., the number of product units held by the enterprise less the number of those held product units reserved for other purposes) and an available "on order" 663 number of product units (e.g., a number of product units to be received as ordered by the enterprise less a number of product units to be received by the enterprise reserved for other purposes).

The status (cell) display 658 provides a user with total inventory availability information 665 regarding the number of product units available for a selected cell 667 of the inventory matrix 654. For example, a user selects a particular cell of the matrix 654 by means of either i) hi-lighting the cell (e.g., clicking on it), or ii) using scroll icons 670 associated with the full granular reference number (FGR#) field 672. The status (cell) display 658, for a particular active cell (e.g., either hi-lighted or FGR# scroll selected), provides the total inventory availability information 665, as associated with the particular cell as the sum of an available "on hand" 668 number of product units (e.g., the number of product units held by the enterprise less the number of those held product units reserved for other purposes) and an available "on order" 669 number of product units (e.g., a number of product units to be received as ordered by the enterprise less a number of product units to be received by the enterprise reserved for other purposes).

It should be understood that when the user requests product information at the lowest level of granularity, as described above in connection with FIG. 38, the system 50 retrieves this information from the memory 60. In some arrangements, particular quantity information resides within supplemental fields of the various data format types 90, 92, 96, 98 (e.g., see the other information fields 148 of FIGS. 3 through 6). In other arrangements, the system 50 utilizes standard inventory management schemes by storing such quantity information separately from the various data format types 90, 92, 96, 98 (e.g., see the other data and applications 70 of FIG. 1). In all of these arrangements, the techniques for storing and maintaining this quantity information (e.g., for purchase order purposes, for sales order purposes, for inventory management purposes, etc. . . . ) are capable of employing standard data storage approaches which are transparent to the user. That is, the GUI screens store and retrieve this information from the memory 60 of the system 50 in a "behind the scenes" manner without forcing the user to manipulate this data directly as in conventional systems.

Figure 39A:
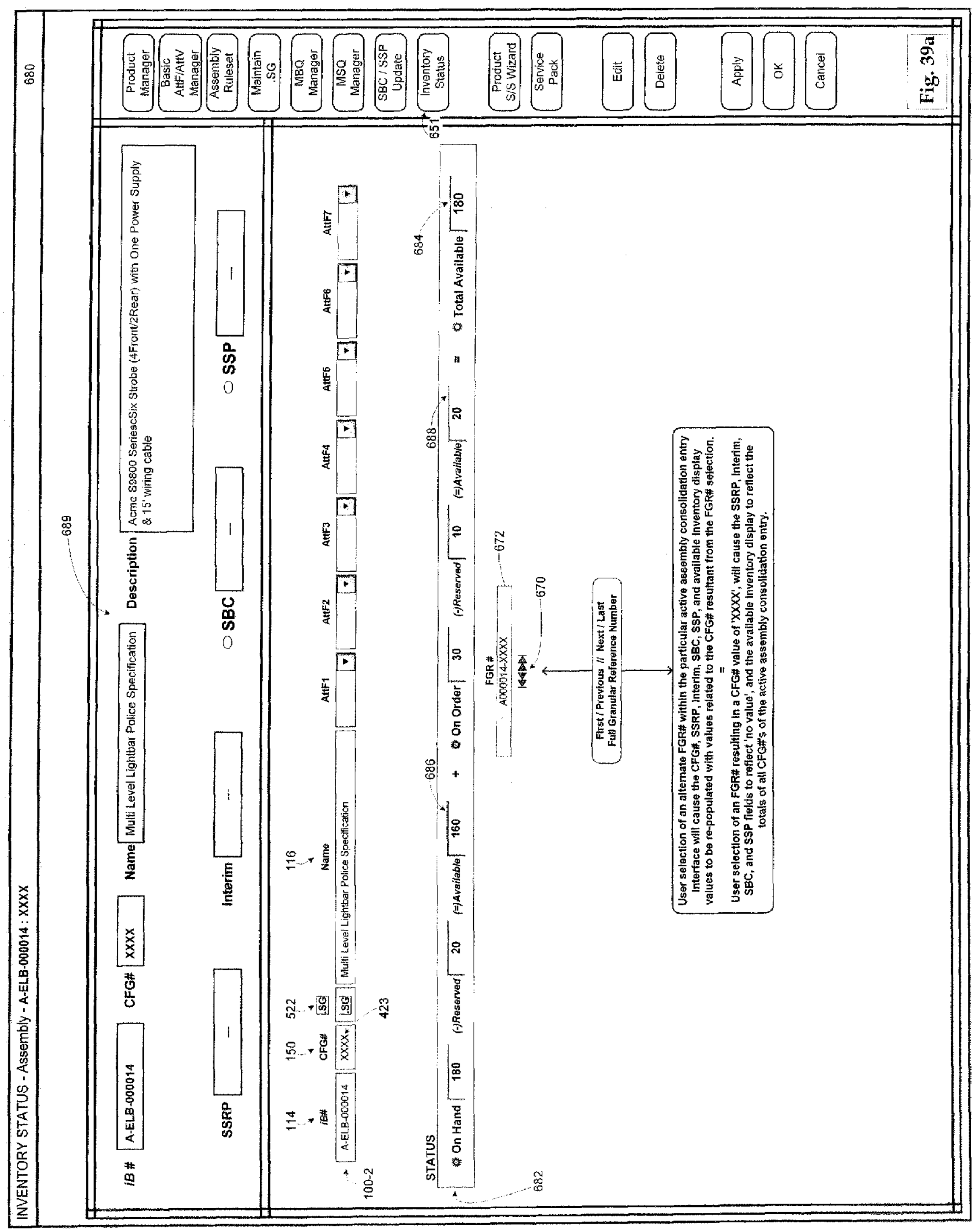
FIGS. 39*a* and 39*b* illustrate an inventory status assembly interface for an assembly type product as used by the computerized resource planning system of FIG. 1.

FIG. 39a illustrates an inventory status assembly interface 680 of the GUI 97 when the user selects a particular 'unconfigured' assembly type consolidation entry 100-2 (e.g., from the product search/select interface 520, as illustrated in FIG. 30), and activates an inventory status entry 651. The inventory status assembly interface 680 includes an active assembly reference display 689, a status display 682, a full granular reference number (FGR#) field 672, and an active assembly type consolidation entry 100-2 field which reflects an active assembly type consolidation entry number 114, a related CFG# 150 (e.g., default text value 423 of 'XXXX'), an active and related .SG (spec graphic) icon field 522 including an active and related .SG (spec graphic) icon, and a related name field 116 of a particular active (e.g., 'unconfigured') assembly type consolidation entry 100-2.

As illustrated in FIG. 39*a*, with an active assembly type consolidation entry 100-2 field reflecting a consolidation entry number 114 of 'A-ELB-000014', and a related CFG# 150 text value 423 of 'XXXX' (e.g., indicating an 'unconfigured' status), the status display 682 provides a user with total inventory availability information 684 that reflects the total number of product units available in all of the attributes configurations (e.g., as referenced by CFG#'s) of the particular assembly type product (e.g., represented by the particular assembly type consolidation entry 100-2 as referenced by the particular assembly type consolidation entry number 114-2 of "A-ELB-000014"). The status display 682 provides the total availability information 684 as the sum of an available "on hand" 686 number of product units (e.g., the number of product units held by the enterprise less the number of those held product units reserved for other purposes) and an available "on order" 688 number of product units (e.g., a number of product units to be received as ordered by the enterprise less a number of product units to be received by the enterprise reserved for other purposes).

Figure 39B:
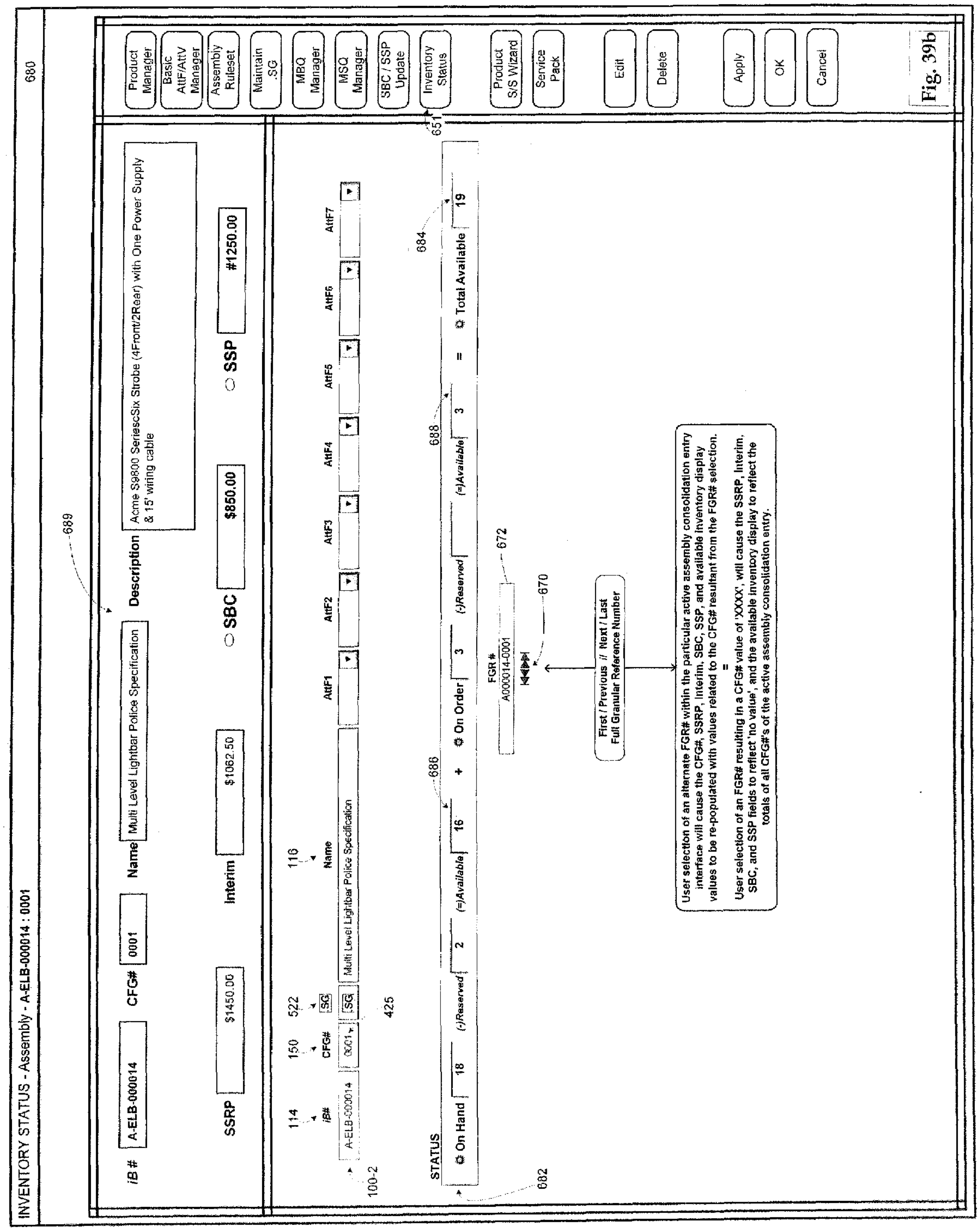

FIG. 39*b* illustrates an inventory status assembly interface 680 of the GUI 97 when the user selects a particular 'configured' assembly type consolidation entry 100-2 (e.g., from the product search/select interface 520, as illustrated in FIG. 30), and activates an inventory status entry 651. The inventory status assembly interface 680 includes an active assembly reference display 689, a status display 682, a full granular reference number (FGR#) field 672, and an active assembly type consolidation entry 100-2 field which reflects an active assembly type consolidation entry number 114, a related CFG# 150 (e.g., numerical value 425 of '0001'), an active and related .SG (spec graphic) icon field 522 including an active and related .SG (spec graphic) icon, and a related name field 116 of a particular active (e.g., 'configured') assembly type consolidation entry 100-2.

As illustrated in FIG. 39*b*, with an active assembly type consolidation entry 100-2 field reflecting a consolidation entry number 114 of 'A-ELB-000014', and a related CFG# 150 numerical value 425 of '0001' (e.g., indicating a 'configured' status), the status display 682 provides a user with total inventory availability information 684 that reflects the total number of product units available in a particular attributes configuration (e.g., as referenced by CFG# 150 numerical value 425 of '0001') of the particular assembly type product (e.g., represented by the particular assembly type consolidation entry 100-2 as referenced by the particular assembly type consolidation entry number 114-2 of "A-ELB-000014"). The status display 682 provides the total availability information 684 as the sum of an available "on hand" 686 number of product units (e.g., the number of product units held by the enterprise less the number of those held product units reserved for other purposes) and an available "on order" 688 number of product units (e.g., a number of product units to be received as ordered by the enterprise less a number of product units to be received by the enterprise reserved for other purposes).

Figure 40:
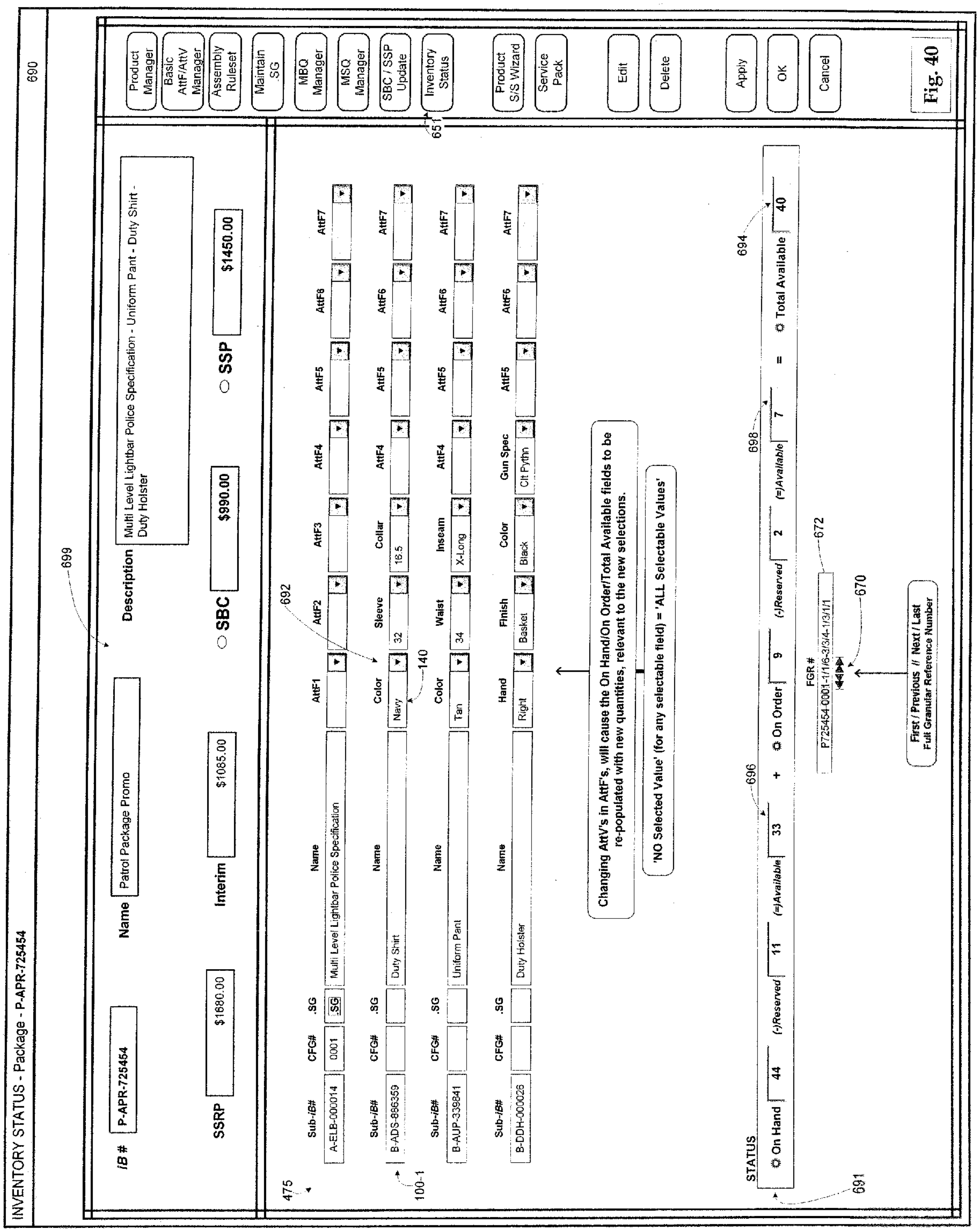
FIG. 40 illustrates an inventory status package interface for any package type product as used by the computerized resource planning system of FIG. 1.

FIG. 40 illustrates an inventory status package interface 690 of the GUI 97 when the user selects a particular package type consolidation entry (e.g., simple 100-3 and/or diverse 100-4 from the product search/select interface 520, as illustrated in FIG. 30), and activates an inventory status entry 651. The inventory status package interface 690 includes an active package reference display 699, sub-consolidation entries 475 (e.g., those representing the 'product componentry' of the active simple package type consolidation entry 100-3 or active diverse package type consolidation entry 100-4), a status display 691, a full granular reference number (FGR#) field 672, Where the sub-consolidation entries 475 include basic type consolidation entries 100-1, the inventory status interface 690 includes the associated attribute family fields 692 that allow a user to select particular attribute values 140 within the associated attribute family fields 692. Similar to the inventory status basic interface 650 described above and illustrated in FIG. 38, user-selection of particular attribute values 140 available within the associated attribute family fields 692 adjusts or modifies all total inventory availability information 694 relating to the number of product units of a particular selected attributes configuration of the particular and active package type product as reflected in the status display 691, and as available from the enterprise. A non-selection (e.g., essentially a user selection of 'no selected value') in any associated attribute family field 692 constitutes a selection of 'all selectable attribute values 140' in the particular associated attribute family field 692.

The status display 691 provides a user with total inventory availability information 694 that reflects the total number of product units available in a particular user-selected attributes configuration of the particular active package type product (e.g., represented by the particular diverse package type consolidation entry 100-4 as referenced by the particular diverse package type consolidation entry number "P-APR-725454") available from the enterprise. The package product inventory display 691 provides both an available "on hand" number of products 696 and an available "on order" 698 number of products, as described above. The status display 691 provides the total availability information 694 as the sum of an available "on hand" 696 number of product units (e.g., the number of product units held by the enterprise less the number of those held product units reserved for other purposes) and an available "on order" 698 number of product units (e.g., a number of product units to be received as ordered by the enterprise less a number of product units to be received by the enterprise reserved for other purposes).

The resource planning application 62 also allows a user the ability to associate a service with a consolidation entry 100, creating a new 'service-pack' type consolidation entry 718 (e.g., same data format/data element structure as simple 100-3 or diverse 100-4 package type consolidation entries) within the system 50, while still maintaining the originally selected consolidation entry 100 in it's original state within the system 50.

Figure 41:
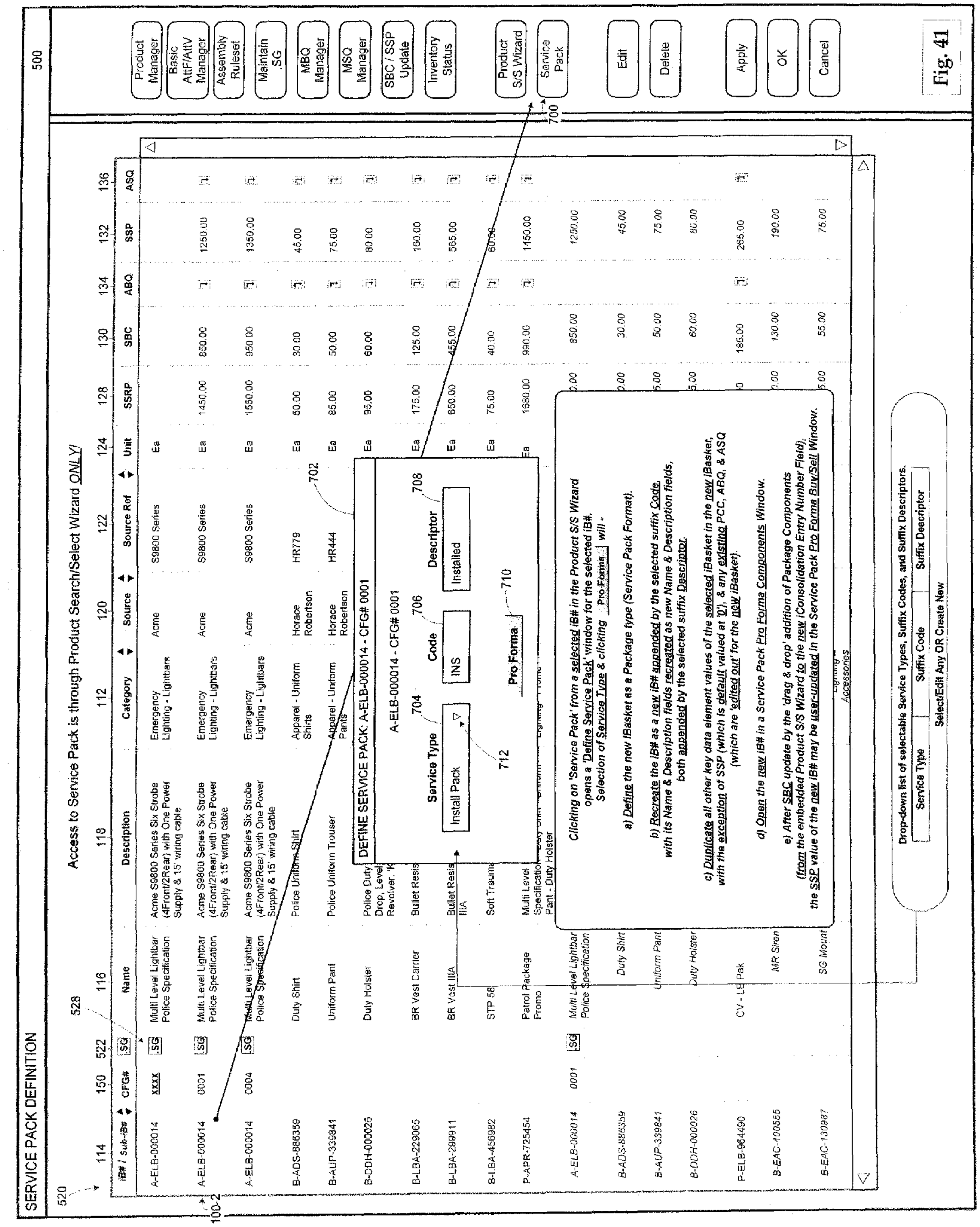
FIG. 41 illustrates an arrangement of the define service pack interface as accessed through the product search/select interface, having a service type entry as used by the computerized resource planning system of FIG. 1.

FIG. 41 illustrates an arrangement (e.g., service pack definition interface 500) of a product search/select interface 520 (e.g., as illustrated in FIG. 30) of the GUI 97 having a service pack entry 700. User selection of the service pack entry 700 allows a user to associate a service with a selected consolidation entry 100, creating a new 'serviced' version (e.g., a 'service-pack' type consolidation entry 718) from and in addition to the selected consolidation entry 100, which still remains within the system 50.

During operation, the user selects (e.g., from the product search/select interface 520) a consolidation entry 100. When the user selects the service entry 700, having first selected (e.g., hi-lighted) a particular consolidation entry 100, the resource planning application 62 provides the user with a define service pack display 702 that allows a user to define (e.g., select) a service to be associated with the selected consolidation entry 100. The define service pack display 702 includes a service type field 704, a code field 706, a descriptor field 708 and a pro form a entry 710. The user selects a service type from the service type field 704 (e.g., "Install Pack") from a drop-down list, which presents upon user-activation of a menu icon 712. The resource planning application 62 defaults related code and descriptor values (e.g., "INS" and "Installed") within the code 706 and descriptor 708 fields as a result of the selection. The user activates the pro form a entry 710 to add (e.g., associate) the defined (e.g., selected) service to the selected consolidation entry 100 (e.g., 'configured' assembly type consolidation entry 100-2 referenced by the particular consolidation entry number 114 "A-ELB-000014" and the particular associated CFG# 150 "0001"), and cause the resource planning application 62 to initiate the creation of a new 'serviced' version or 'service-pack' type consolidation entry 718, from and in addition to the selected consolidation entry 100 which still remains within the system 50.

Figure 42:
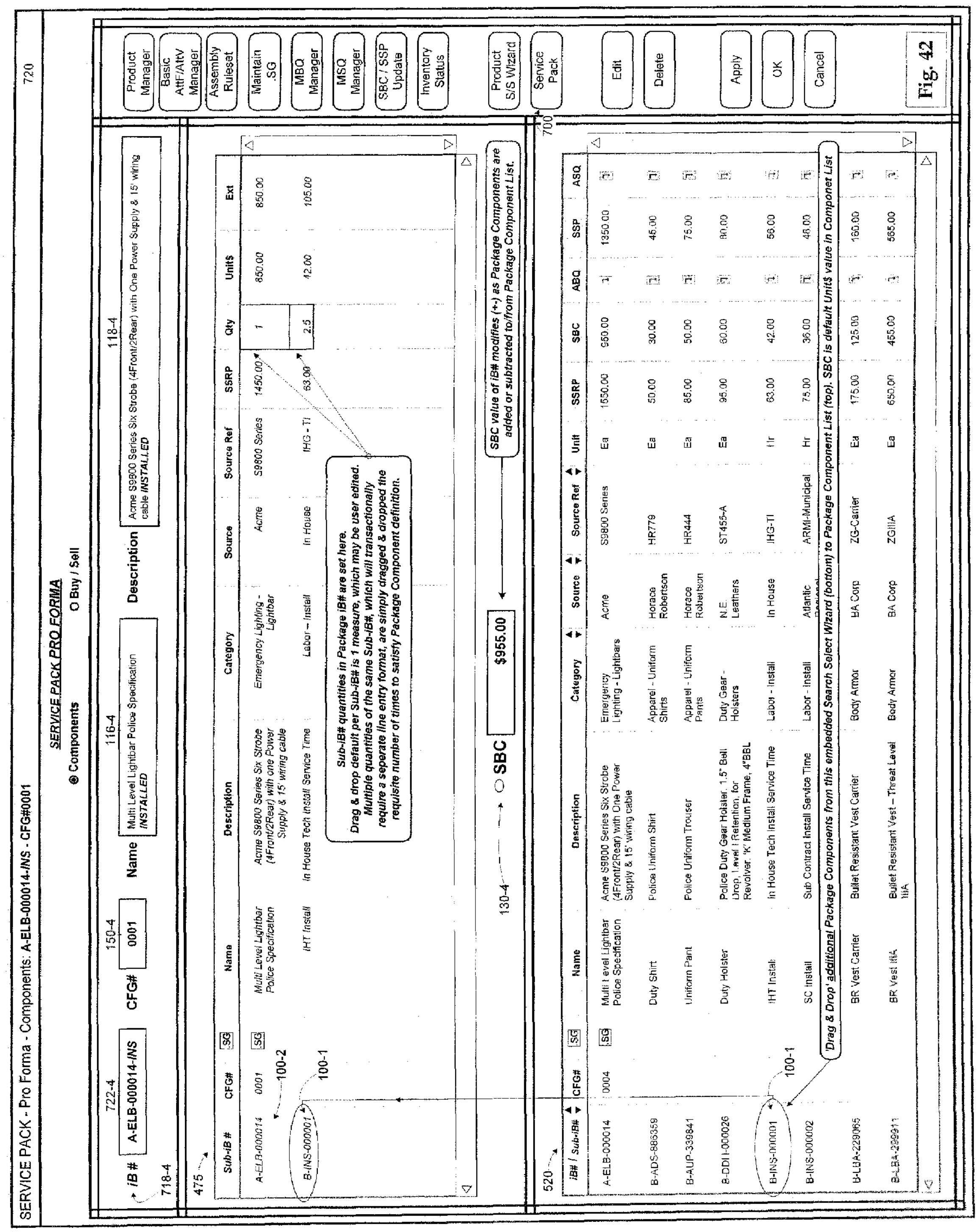
FIG. 42 illustrates a service pack pro form a components interface as used by the computerized resource planning system of FIG. 1.

As a result of the user engaging the pro form a entry 710, the resource planning application 62 initiates a 'pro form a' replication of the selected consolidation entry 100 (e.g., 'configured' assembly type consolidation entry 100-2 referenced by the particular consolidation entry number 114 "A-ELB-000014" and the particular associated CFG# 150 "0001") as a 'new' consolidation entry 100 (e.g., utilizing the same data format {e.g., data element structure} as either a simple package type consolidation entry 100-3 or a diverse package type consolidation entry 100-4) to be established within the system 50, and referred to as a 'service pack' type consolidation entry 718 (e.g., either a simple 'service-pack' type consolidation entry 718-3 or a diverse 'service-pack' type consolidation entry 718-4). Additionally, the resource planning application 62 creates adjusted (e.g., appended) versions of the consolidation entry number 114, name 116 and description 118 of the selected consolidation entry 100 to become the consolidation entry number (e.g., 114-3 or 114-4), name (e.g., 116-3 or 116-4), and description (e.g., 118-3 or 118-4) of the newly created 'service pack' type consolidation entry 718 (e.g., either a simple 'service-pack' type consolidation entry 718-3 or a diverse 'service-pack' type consolidation entry 718-4). For example, as illustrated in FIG. 42, the pro form a entry 710 having been engaged, the resource planning application 62 has initiated the 'pro forma' replication of the selected consolidation entry 100 (e.g., 'configured' assembly type consolidation entry 100-2 referenced by the particular consolidation entry number 114 "A-ELB-000014" and the particular associated CFG# 150 "0001") as a new diverse 'service-pack' type consolidation entry 718-4. The resource planning application 62 has referenced the newly created diverse 'service-pack' type consolidation entry 718-4 with a newly created diverse 'service-pack' consolidation entry number 722-4 by appending the selected consolidation entry number 114 of "A-ELB-000014" with the suffix "-INS" (e.g., from the code field 706 of the define service pack display 702 illustrated in FIG. 41)), thus creating the diverse 'service-pack' consolidation entry number 722-4 of "A-ELB-000014-INS" (e.g., while retaining the associated configuration number 150 of "0001"). Additionally, and in similar fashion, the resource planning application 62 has appended the selected name 116 and selected description 118 with the suffix "INSTALLED" (e.g., from the descriptor field 708 of the define service pack display 702 illustrated in FIG. 41), thus creating the new and associated (e.g., with the newly created diverse 'service-pack' type consolidation entry 718-4, as referenced by the newly created diverse 'service-pack' consolidation entry number 722-4 of "A-ELB-000014-INS") diverse 'service-pack' consolidation entry name 116-4 of " . . . . Specification INSTALLED" and description 118-4 of " . . . wiring cable INSTALLED".

Also as illustrated in FIG. 42, as part of initiating a 'pro form a' replication of the selected consolidation entry 100 as a 'service-pack' consolidation entry 718 within the system 50, the resource planning application 62 generates a 'service-pack' pro form a components interface 720 that allows a user to generate (e.g., 'build', 'construct', etc.) the 'product componentry' (e.g., sub-consolidation entry numbers) of the new 'service-pack' consolidation entry 718 to be established within the system 50. The 'service-pack' components pro form a interface 720, for example, includes a consolidation entry number field 475 and an embedded product search/select interface 520. The consolidation entry number field 475 lists, as sub-consolidation entries (e.g., Sub-iB numbers), the consolidation entry numbers for each of the consolidation entries 100 entered therein, that will represent the 'product componentry' (e.g., the sub-consolidation entries) of the new 'service-pack' consolidation entry 718 being established within the system 50. The product search/select interface 520 displays consolidation entries 100 (e.g., including service types) that are available within the system 50 for association with the particular 'service-pack' consolidation entry 718 being created.

During operation, the resource planning application 62 copies various data values (e.g., consolidation entry number 114, CFG# 150, name 116, description 118, etc.) associated with the selected consolidation entry 100 (e.g., as selected in FIG. 41) and lists them within the consolidation entry number field 475. A user then, for example, selects a consolidation entry 100 (e.g., representing a service type product) from the product search/select interface 520 and enters (e.g., 'drags and drops', as illustrated in FIG. 42) the particular consolidation entry 100 (e.g., as referenced by the particular basic type consolidation entry number 100-1 of "B-INS-000001") within the consolidation entry number field 475 to form part or all of the 'product componentry' of the new 'service-pack' type product (e.g. as represented by the newly created diverse 'service-pack' type consolidation entry 718-4, referenced by the newly created diverse 'service-pack' consolidation entry number 722-4 of "A-ELB-00001 4-INS").

Figure 43:
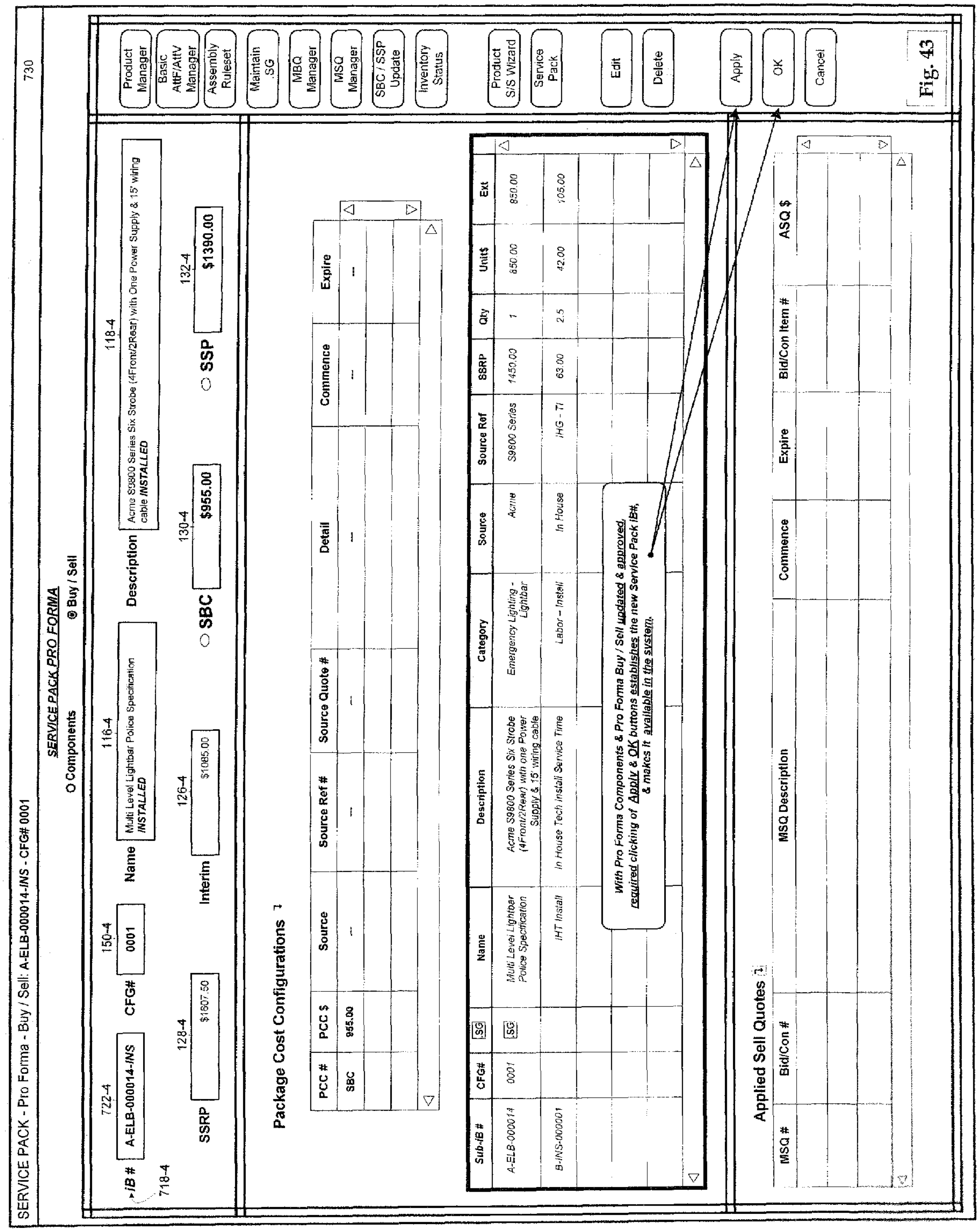
FIG. 43 illustrates a service pack pro form a buy/sell interface associated with the service pack pro form a components interface of FIG. 42 as used by the computerized resource planning system of FIG. 1.

As the user selects a particular consolidation entry 100 (e.g., as referenced by the particular consolidation entry number 100-1 of "B-INS-000001") from the product search/select interface 520 and enters it within the consolidation entry number field 475, the resource planning application 62 updates the standard buy cost 130 (e.g., "130-4") for the newly created 'service-pack' type consolidation entry 718 (e.g., "718-4") to indicate the additional cost associated with the inclusion of 'installation' in the newly formed 'service-pack' type consolidation entry 718 (e.g., "718-4"). Additionally, as shown within a 'service-pack' pro form a buy/sell interface 730, illustrated in FIG. 43, the resource planning application 62 updates the SSRP 128 (e.g., "128-4"), the interim cost 126 (e.g., "126-4"), the standard buy cost 130 (e.g., "130-4"), and the standard sell price 132 (e.g., "132-4", editable by the user or enterprise) fields to reflect the newly associated values resulting from the inclusion of some service type 'product componentry' (e.g., installation, customization, delivery, assembly, or other, etc.) in the newly formed 'service-pack' consolidation entry 718.

While this invention has been particularly shown and described with references to preferred embodiments thereof, it will be understood by those skilled in the art that various changes in form and details may be made therein without departing from the spirit and scope of the invention as defined by the appended claims.

For example, as regards those enterprise products that might be inherently 'non-configurable' (e.g., that is, having no attribute families and no attribute values as such; but instead having simply a singular form of descriptive data, which for instance, in conventional ERP systems is typically included in a description or other product-associated data field), the consolidation entry 100 as one embodiment of the invention, is very well suited to accommodate representation of such 'non-configurable' singular form descriptive products, by simply making use of the consolidation entry 100, and not employing the attribute family/attribute value functionality provided therein. One example of this would be introduction into the system 50 of a "Blue 40 watt light bulb" as a 'non-configurable' singular form product; which is 'evolved' into a 'configurable' enterprise product through employment of the attribute family/attribute value functionality provided by the consolidation entry 100. The association of attribute families (e.g., of 'color' and 'wattage') and the inclusion therein of selectable attribute values (e.g., respectively 'blue', 'clear', 'red', in 'color', and '40', '60', '100', in 'wattage') broadens the marketing life (e.g., "product life cycle") of the one enterprise product (e.g., "light bulb"), and the data entry time and labor costs to an enterprise, in terms of this implementation, is far less than what it typically is employing methods found in conventional ERP systems.

Additionally, as shown in FIG. 4, an assembly type consolidation entry 100-2 includes at least one unlimited number sequenced attribute family 138, the at least one unlimited number sequenced attribute family 138 having at least one cost variable referenced selectable attribute value 141, or at least one cost neutral referenced selectable attribute value 140, or at least one cost variable referenced selectable attribute value 141 and at least one cost neutral referenced selectable attribute value representing multiple configurable attribute characteristics permutations of the assembly product type In one arrangement, a configurator, separate from but integrated with application 62, is used to define or configure the attribute families and attribute values for the assembly type consolidation entry 100-2.

FIGS. 24 and 25, as described above, illustrate arrangements of the grafix files interface 440 having a display that includes a grafix file menu 444. The user activates the menu, via an icon 446 to select either an image (e.g., 2-dimensional or photo graphic) file associated with the 'active' consolidation entry 100, or a text file associated with the 'active' consolidation entry 100. FIGS. 24 and 25 were described with respect to assembly type consolidation entries 100-2 within the enterprise system. Such description was by way of example only. In one arrangement, a user or enterprise can also associate grafix files with basic type consolidation entries 100-1, simple package type consolidation entries 100-3, and diverse package consolidation entries 100-4.

As indicated above, for a basic type consolidation entry 100-1, the resource planning application 62 generates the FGR# 378 in the format XYYY######—&1$_{(1, \ldots, n)}$/&2$_{(1, \ldots n)}$/&3$_{(1, \ldots n)}$/ . . . /&7$_{(1, \ldots n)}$. However, the resource planning application 62 also generates FGR#'s 378 for particular attribute characteristics permutations (e.g., attributes configurations) of the assembly type 100-2, simple package type 100-3, and diverse package type 100-4 consolidation entries.

For attribute characteristics permutations (e.g., attributes configurations) of the assembly type consolidation entry 100-2, the resource planning application 62 generates the FGR# 378 in the format: XYYY######-CFG#$_n$. By way of example, a FGR# 378 for an 'unconfigured' assembly type consolidation entry 100-2, might be illustrated as "AELB000014-XXXX", with "XXXX" representing an 'unconfigured' status (e.g., no attributes configuration) while a FGR# 378 for a 'configured' assembly type consolidation entry 100-2, might be illustrated as "AELB000014-0001", with "0001" representing a 'configured' status (e.g., a particular attributes configuration).

For attribute characteristics permutations (e.g., attributes configurations) of the simple package type consolidation entry 100-3, the resource planning application 62 generates the FGR# 378 format: XYYY######—(&1$_{(1, \ldots, n)}$/&2$_{(1, \ldots n)}$/&3$_{(1, \ldots n)}$)$_1$—(&1$_{(1, \ldots, n)}$/&2$_{(1, \ldots n)}$/&3$_{(1, \ldots n)}$/ . . . /&7$_{(1, \ldots n)}$)$_2$— . . . (&1$_{(1, \ldots, n)}$/&2$_{(1, \ldots n)}$/&3$_{(1, \ldots n)}$/ . . . /&7$_{(1, \ldots n)}$)$_n$, where each "(&1$_{(1, \ldots, n)}$/&2$_{(1, \ldots n)}$/&3$_{(1, \ldots n)}$/ . . . /&7$_{(1, \ldots n)}$)" represents one particular selection (e.g., attributes configuration) from the sequenced associated attribute family/attribute value reference integers 361 of each sequential basic type sub-consolidation entry 100-1 within the particular simple package type consolidation entry 100-3.

For attribute characteristics permutations (e.g., attributes configurations) of the diverse package type consolidation entry 100-4, the resource planning application 62 generates either FGR# 378 format i): XYYY######-(CFG#$_n$)$_1$-(CFG#$_n$)$_2$-(CFG#$_n$)$_n$-(&1$_{(1, \ldots, n)}$/&2$_{(1, \ldots n)}$/&3$_{(1, \ldots n)}$/ . . . /&7$_{(1, \ldots n)}$)$_1$-(&1$_{(1 \ldots n)}$/&2$_{(1, \ldots n)}$/&3$_{(1 \ldots n)}$/ . . . /&7$_{(1, \ldots n)}$)$_2$- . . . (&1$_{(1, \ldots, n)}$/&2$_{(1, \ldots n)}$/&3$_{(1, \ldots n)}$/ . . . /&7$_{(1, \ldots n)}$)$_n$, or FGR# 378 format ii): XYYY######-(CFG#$_n$)$_1$-(CFG#$_n$)$_2$-(CFG#$_n$)$_n$ as required and based upon the particular sub-consolidation entry content within the particular diverse package type consolidation entry 100-4.

In format i), each "(CFG#$_n$)" represents one configuration number (CFG#) 150 (e.g., referencing one particular attributes configuration) for each sequential 'configured' assembly type sub-consolidation entry 100-2 within the particular diverse package type consolidation entry 100-3, and each "(&1$_{(1, \ldots, n)}$/&2$_{(1, \ldots n)}$/&3$_{(1, \ldots n)}$/ . . . /&7$_{(1, \ldots n)}$)" represents one particular selection (e.g., attributes configuration) from the sequenced associated attribute family/attribute value reference integers 361 of each sequential basic type sub-consolidation entry 100-1 within the particular diverse package type consolidation entry 100-4. In format ii), each "(CFG#$_n$)" represents one configuration number (CFG#) 150 (e.g., referencing one particular attributes configuration) for each sequential 'configured' assembly type sub-consolidation entry 100-2 within the particular diverse package type consolidation entry 100-4.

Additionally, it should be understood that the system 50 was described above as taking the form of computerized equipment running a single application by way of example only. This configuration is well suited in an implementation where a company wishing to obtain the system 50 purchases an "off-the-shelf" shrink-wrapped computer program product (e.g., see the computer program product 72 of FIG. 1) and installs the computer program product.

Other configurations are suitable for use as well by the invention. For example, in alternative configurations, the system 50 is a general purpose computer running multiple conventional computer program products which have been enhanced with embodiments of the invention by one or more software programming houses. In one particular configuration, the system 50 runs an enhanced (e.g., with embodiments of the invention) version of Axapta® which is offered by Microsoft Corporation of Redmond, Wash., and an enhanced (e.g., with embodiments of the invention) version of CS- Enterprise (formerly called e-Logia) which is offered by Configuration Solutions of Portage, Mich. The enhanced version of Axapta®, for example, provides the framework for the basic data type 90, the simple package data type 94, and part of the framework for the diverse package data type 98. The enhanced version of CS-Enterprise, for example, provides the framework for the assembly data type 92 and part of the diverse package data type 98. In conjunction with the above described enhancements to these two conventional products, as regards to data type framework, further enhancements with embodiments of the invention are required to provide the GUI 97 windows described in the above-mentioned figures. Nevertheless, the system 50 is capable of being implemented in this manner where the software is essentially an integration of a variety of conventional software packages that have been enhanced in a novel and unobvious manner to obtain the varied features of the invention.

What is claimed is:

1. A computer-implemented method for managing product data comprising:

receiving a product type selection associated with a product;

defining by a controller a configurable transactable consolidation entry associated with the product type selection, the configurable transactable consolidation entry having (i) a collection of associated attributes; sequenced attribute families, each attribute family having specifically included, referenced, cost defined, and selectable attribute values, representing multiple attribute characteristics permutations of the product, (ii) a single consolidation entry reference referring to the configurable transactable consolidation entry, (iii) core defining and descriptive data elements of the product; and storing the configurable transactable consolidation entry in a memory location.

2. The method of claim 1 wherein:

receiving comprises receiving a basic product type selection associated with a basic product type, the basic product type having at least one limited number sequenced attribute family representing a classification of a specific attribute of the basic product type; and defining comprises defining a basic type configurable transactable consolidation entry associated with the basic product type selection, the basic type configurable transactable consolidation entry having (i) at least one limited number sequenced attribute family, the at least one limited number sequenced attribute family having at least one cost neutral referenced selectable attribute value, a collection of the at least one limited number sequenced attribute family and the at least one cost neutral referenced selectable attribute value representing multiple configurable attribute characteristics permutations of the basic product type, (ii) a single basic type consolidation entry reference referring to the basic type configurable transactable consolidation entry, and (iii) core defining and descriptive data elements of the basic type product.

3. The method of claim 2 comprising:

receiving one transactional monetary value-default for each required transactional monetary value-default for every attribute characteristics permutation of the basic type configurable transactable consolidation entry, each transactional monetary value-default chosen from the group consisting of a source's suggested retail price, an interim cost, a standard buy cost, and a standard sell price; and associating each transactional monetary value-default with the basic type configurable transactable consolidation entry.

4. The method of claim 3 comprising:

retrieving an applied buy quote for the basic type configurable transactable consolidation entry from a master buy quote manager file using the basic type consolidation entry reference of the basic type configurable transactable consolidation entry; and associating the applied buy quote with the basic type configurable transactable consolidation entry, the applied buy quote configured to when retrieved, adjust the value-default standard buy cost associated with an attribute characteristics permutation of the basic type configurable transactable consolidation entry.

5. The method of claim 3 comprising:

retrieving an applied sell quote for the basic type configurable transactable consolidation entry from a master sell quote manager file using the basic type consolidation entry reference of the basic type configurable transactable consolidation entry; and associating the applied sell quote with the basic type configurable transactable consolidation entry, the applied sell quote configured to when retrieved, adjust the value-default standard sell price associated with an attribute characteristics permutation of the basic type configurable transactable consolidation entry.

6. The method of claim 1 wherein:

receiving comprises receiving an assembly product type selection associated with an assembly product type, the assembly product type having at least one unlimited number sequenced attribute family representing a classification of a specific attribute of the assembly product type; and defining comprises defining an assembly type configurable transactable consolidation entry associated with the assembly product type selection, the assembly type configurable transactable consolidation entry having (i) at least one unlimited number sequenced attribute family, the at least one unlimited number sequenced attribute family having at least one cost variable referenced selectable attribute value, or at least one cost neutral referenced selectable attribute value, or at least one cost variable referenced selectable attribute value and at least one cost neutral referenced selectable attribute value, a collection of the at least one unlimited number sequenced attribute family and the at least one cost variable referenced selectable attribute value, or at least one cost neutral referenced selectable attribute value, or at least one cost variable referenced selectable attribute value and at least one cost neutral referenced selectable attribute value, representing multiple configurable attribute characteristics permutations of the assembly product type, (ii) a single assembly type consolidation entry reference referring to the assembly type configurable transactable consolidation entry, (iii) an attributes configuration reference referring to an established unique and different attribute characteristics permutation of the assembly type configurable transactable consolidation entry, and (iv) core defining and descriptive data elements of the assembly type product.

7. The method of claim 6 comprising:

receiving one transactional monetary value-default for each required transactional monetary value-default for an attribute characteristics permutation of the assembly type configurable transactable consolidation entry, each transactional monetary value-default chosen from the group consisting of a source's suggested retail price, an interim cost, a standard buy cost, and a standard sell price; and associating each transactional monetary value-default for an attribute characteristics permutation of the assembly type configurable transactable consolidation entry with the assembly type configurable transactable consolidation entry.

8. The method of claim 7 comprising:

retrieving an applied buy quote for an attribute characteristics permutation of the assembly type configurable transactable consolidation entry from a master buy quote manager file using the assembly type consolidation entry reference and the attributes configuration reference of the assembly type configurable transactable consolidation entry; and associating the applied buy quote with the attribute characteristics permutation of the assembly type configurable transactable consolidation entry, the applied buy quote configured to when retrieved, adjust the value-default standard buy cost associated with the referenced attribute characteristics permutation of the assembly type configurable transactable consolidation entry.

9. The method of claim 7 comprising:

retrieving an applied sell quote for an attribute characteristics permutation of the assembly type configurable transactable consolidation entry from a master sell quote manager file using the assembly type consolidation entry reference and the attributes configuration reference of the assembly type configurable transactable consolidation entry; and associating the applied sell quote with the attribute characteristics permutation of the assembly type configurable transactable consolidation entry, the applied sell quote configured to when retrieved, adjust the value-default standard sell price associated with the referenced attribute characteristics permutation of the assembly type configurable transactable consolidation entry.

10. The method of claim 1 wherein:

receiving comprises receiving a package product type selection associated with a simple package product type, the simple package product type formed of a combination of at least two basic product types, each of the at least two basic product types having at least one limited number sequenced attribute family representing a classification of a specific attribute of the basic product type; and defining comprises defining a simple package type configurable transactable consolidation entry associated with the package product type selection, the simple package type configurable transactable consolidation entry (i) formed of at least two basic type configurable transactable consolidation entries, each of the at least two basic type configurable transactable consolidation entries having at least one limited number sequenced attribute family, the at least one limited number sequenced attribute family having at least one cost neutral referenced selectable attribute value, a collection of the at least one limited number sequenced attribute family and the at least one cost neutral referenced selectable attribute value for each of the at least two basic type configurable transactable consolidation entries, individually representing multiple configurable attribute characteristics permutations of each of the associated at least two basic product types, and collectively representing multiple configurable attribute characteristics permutations of the simple package product type, (ii) having a single package type consolidation entry reference referring to the simple package type configurable transactable consolidation entry, and (iii) having core defining and descriptive data elements of the simple package type product.

11. The method of claim 1 wherein:

receiving comprises receiving a package product type selection associated with a diverse package I product type, the diverse package I product type formed of a combination of at least one basic product type, the at least one basic product type having at least one limited number sequenced attribute family representing a classification of a specific attribute of the basic product type, and at least one assembly product type, the at least one assembly product type having at least one unlimited number sequenced attribute family representing a classification of a specific attribute of the assembly product type; and defining comprises defining a diverse package I type configurable transactable consolidation entry associated with the package product type selection, the diverse package I type configurable transactable consolidation entry (i) formed of at least one basic type configurable transactable consolidation entry, the at least one basic type configurable transactable consolidation entry having at least one limited number sequenced attribute family, the at least one limited number sequenced attribute family having at least one cost neutral referenced selectable attribute value, a collection of the at least one limited number sequenced attribute family and the at least one cost neutral referenced selectable attribute value representing multiple configurable attribute characteristics permutations of the at least one basic product type, and (ii) formed of at least one assembly type configurable transactable consolidation entry, the at least one assembly type configurable transactable consolidation entry having at least one unlimited number sequenced attribute family, the at least one unlimited number sequenced attribute family having at least one cost variable referenced selectable attribute value, or at least one cost neutral referenced selectable attribute value, or at least one cost variable referenced selectable attribute value and at least one cost neutral referenced selectable attribute value, and having an attributes configuration reference referring to an established unique and different attribute characteristics permutation of the assembly type configurable transactable consolidation entry, a collection of the at least one unlimited number sequenced attribute family and the at least one cost variable referenced selectable attribute value, or at least one cost neutral referenced selectable attribute value, or at least one cost variable referenced selectable attribute value and at least one cost neutral referenced selectable attribute value, and the attributes configuration reference referring to an established unique and different attribute characteristics permutation of the assembly type configurable transactable consolidation entry, representing an attribute characteristics permutation of the assembly product type; the collection of the at least one limited number sequenced attribute family and the at least one cost neutral referenced selectable attribute value associated with the at least one basic type configurable transactable consolidation entry, and the at least one unlimited number sequenced attribute family, the at least one cost variable referenced selectable attribute value, or at least one cost neutral referenced selectable attribute value, or at least one cost variable referenced selectable attribute value and at least one cost neutral referenced selectable attribute value, and the attributes configuration reference referring to an established unique and different attribute characteristics permutation of the assembly type configurable transactable consolidation entry associated with the at least one assembly type configurable transactable consolidation entry, representing multiple configurable attribute characteristics permutations of the diverse package I product type and (ii) having a single package type consolidation entry reference referring to the diverse package I type configurable transactable consolidation entry, and (iii) having core defining and descriptive data elements of the diverse package I type product.

12. The method of claim 1 wherein:

receiving comprises receiving a package product type selection associated with a diverse package II product type, the diverse package II product type formed of a combination of at least two assembly product types, each of the at least two assembly product types having at least one unlimited number sequenced attribute family representing a classification of a specific attribute of the assembly product type; and defining comprises defining a diverse package II type pre-configured transactable consolidation entry associated with the package product type selection, the diverse package II type pre-configured transactable consolidation entry (i) formed of at least two assembly type configurable transactable consolidation entries, each of the at least two assembly type configurable transactable consolidation entries having at least one unlimited number sequenced attribute family, the at least one unlimited number sequenced attribute family having at least one cost variable referenced selectable attribute value, or at least one cost neutral referenced selectable attribute value, or at least one cost variable referenced selectable attribute value and at least one cost neutral referenced selectable attribute value, each of the at least two assembly type configurable transactable consolidation entries also having an attributes configuration reference referring to an established unique and different attribute characteristics permutation of the associated assembly type configurable transactable consolidation entry, a collection of the at least one unlimited number sequenced attribute family and the at least one cost variable referenced selectable attribute value, or at least one cost neutral referenced selectable attribute value, or at least one cost variable referenced selectable attribute value and at least one cost neutral referenced selectable attribute value for each of the at least two assembly type configurable transactable consolidation entries, as well as the attributes configuration reference in each of the at least two assembly type configurable transactable consolidation entries referring to an established unique and different attribute characteristics permutation of the associated assembly type configurable transactable consolidation entry, representing an attribute characteristics permutation of the diverse package II product type, (ii) having a single package type consolidation entry reference referring to the diverse package II type configurable transactable consolidation entry, and (iii) having of core defining and descriptive data elements of the diverse package II type product.

13. The method of claim 1 wherein:

receiving comprises receiving a package product type selection associated with a package product type; and defining comprises:

displaying a series of selectable consolidation entries inclusive of at least two basic type configurable transactable consolidation entries, or at least two assembly type configurable transactable consolidation entries, or at least one basic type configurable transactable consolidation entry and at least one assembly type configurable transactable consolidation entry, each basic type configurable transactable consolidation entry having (i) at least one limited number sequenced attribute family, the at least one limited number sequenced attribute family having at least one cost neutral referenced selectable attribute value, the collection of the at least one limited number sequenced attribute family and the at least one cost neutral referenced selectable attribute value representing multiple configurable attribute characteristics permutations of the basic product type, (ii) a single basic type consolidation entry reference referring to the basic type configurable transactable consolidation entry, and (iii) core defining and descriptive data elements of the basic type product and/or each assembly type configurable transactable consolidation entry having (i) at least one unlimited number sequenced attribute family, the at least one unlimited number sequenced attribute family having at least one cost variable referenced selectable attribute value, or at least one cost neutral referenced selectable attribute value, or at least one cost variable referenced selectable attribute value and at least one cost neutral referenced selectable attribute value, the collection of the at least one unlimited number sequenced attribute family and the at least one cost variable referenced selectable attribute value, or at least one cost neutral referenced selectable attribute value, or at least one cost variable referenced selectable attribute value and at least one cost neutral referenced selectable attribute value representing multiple configurable attribute characteristics permutations of the assembly product type and (ii) a single assembly type consolidation entry reference referring to the assembly type configurable transactable consolidation entry, (iii) an attributes configuration reference referring to an established unique and different attribute characteristics permutation of the assembly type configurable transactable consolidation entry, and (iv) core defining and descriptive data elements of the assembly type product;

receiving at least two consolidation entry selections from the display of the series of consolidation entries; and creating a simple package type configurable transactable, or a diverse package I type configurable transactable, or a diverse package II type pre-configured transactable consolidation entry based upon the at least two consolidation entry selections, the simple package type configurable transactable, or the diverse package I type configurable transactable, or the diverse package II type pre-configured transactable consolidation entry having a package type consolidation entry reference referring to the simple package type configurable transactable, or the diverse package I type configurable transactable, or the diverse package II type pre-configured transactable consolidation entry.

14. The method of claim 13 comprising:

displaying one total transactional monetary value-default for each required total transactional monetary value-default for every characteristics permutation of the simple package type configurable transactable, or diverse package I type configurable transactable, or diverse package II type pre-configured transactable consolidation entry, each total transactional monetary value-default chosen from the group consisting of a source's suggested retail price, an interim cost, a standard buy cost, and a standard sell price, and each representing the sum of each of the corresponding required transactional monetary value-defaults of each of the at least two consolidation entry selections; and associating each total transactional monetary value-default with the simple package type configurable transactable, or diverse package I type configurable transactable, or diverse package II type pre-configured transactable consolidation entry when displaying the one total transactional monetary value-default for each required total transactional monetary value-default for every characteristics permutation of the simple package type configurable transactable, or diverse package I type configurable transactable, or diverse package II type pre-configured transactable consolidation entry, allowing user adjustment of the displayed standard sell price.

15. The method of claim 14 comprising:

receiving a retrievable package cost configuration for a simple package type configurable transactable, or a diverse package I type configurable transactable, or a diverse package II type pre-configured transactable consolidation entry, the package cost configuration using an applied buy quote for at least one of the at least two consolidation entry selections; and associating the package cost configuration with the simple package type configurable transactable, or the diverse package I type configurable transactable, or the diverse package II type pre-configured transactable consolidation entry, the package cost configuration configured to when retrieved, adjust the value-default standard buy cost associated with every attribute characteristics permutation of the simple package type configurable transactable, or the diverse package I type configurable transactable, or the diverse package II type pre-configured transactable consolidation entry.

16. The method of claim 14 comprising:

retrieving an applied sell quote for a simple package type configurable transactable, or a diverse package I type configurable transactable, or a diverse package II type pre-configured transactable consolidation entry from a master sell quote manager file using the simple package type configurable transactable, or the diverse package I type configurable transactable, or the diverse package II type pre-configured transactable consolidation entry; and associating the applied sell quote with the simple package type configurable transactable, or the diverse package I type configurable transactable, or the diverse package II type pre-configured transactable consolidation entry, the applied sell quote configured to when retrieved, adjust the value-default standard sell price associated with every attribute characteristics permutation of the simple package type configurable transactable, or the diverse package I type configurable transactable, or the diverse package II type pre-configured transactable consolidation entry.

17. The method of claim 1 comprising:

generating a full granular reference number for a particular characteristics permutation of the configurable transactable consolidation entry, the full granular reference number based upon the consolidation entry reference, and any sequenced attribute family-attribute value reference integers, or any sequenced attributes configuration references, or any sequenced attribute family-attribute value reference integers and any sequenced attributes configuration references associated with the particular characteristics permutation of the configurable transactable consolidation entry; and associating the full granular reference number with the particular characteristics permutation of the configurable transactable consolidation entry.

18. The method of claim 1 comprising:

retrieving and displaying or outputting independently or as a file attachment a graphic representation of the product associated with the configurable transactable consolidation entry and a particular characteristics permutation of the configurable transactable consolidation entry, the graphic representation chosen from the group consisting of at least one graphic image and at least one textual information file; and associating the graphic representation with the configurable transactable consolidation entry and/or one or more of the particular characteristics permutations of the consolidation entry.

19. The method of claim 1 comprising:

receiving a service selection for the consolidation entry, the service selection indicating association of a service with the consolidation entry;

defining a service pack type consolidation entry in response to receiving the service selection, the service pack type consolidation entry having (i) the original consolidation entry, (ii) at least one additional consolidation entry selected from a displayed series of consolidation entries, (iii) one total transactional monetary value-default for each required total transactional monetary value-default for every characteristics permutation of the service pack type consolidation entry, each total transactional monetary value-default representing the sum of each of the corresponding required transactional monetary value-defaults of the originating and each of the at least one additional consolidation entry forming the service pack type consolidation entry, (iv) received of service selection indicators, and (v) a single consolidation entry reference referring to the service pack type consolidation entry; and storing the service pack type consolidation entry in a memory location.

20. The method of claim 1 comprising:

displaying a transactional monetary value-default of each required transactional monetary value-default of at least one selected consolidation entry, each transactional monetary value-default chosen from the group consisting of a source's suggested retail price, a standard buy cost, and a standard sell price;

receiving a user adjustment to any of each of the transactional monetary value-defaults of each of the at least one selected consolidation entry to form an updated transactional monetary value-default; and associating each of the updated transactional monetary value-defaults with each of the at least one selected consolidation entry.

21. The method of claim 1 comprising displaying one or more consolidation entries within a particular and dynamic search/select interface.

22. The method of claim 20 comprising:
receiving a selection of a consolidation entry from the particular and dynamic search/select interface;
inserting the selected consolidation entry into a particular and dynamic transactional order interface; and
receiving attribute and other information related to the selected consolidation entry, the attribute information defining a specific attribute characteristics permutation or multiple attribute characteristics permutations of a product.

23. The method of claim 20 comprising:
receiving a selection of a consolidation entry from the particular and dynamic search/select interface or from another active system interface;
calculating available inventory values for a selection of attribute characteristics permutations of the product represented by the consolidation entry, the step of calculating comprising:
detecting and displaying an on hand less reserved on hand available on hand number for the selection of attribute characteristics permutations of the product;
detecting and displaying an on order less reserved on order available on order number for the selection of attribute characteristics permutations of the product; and
summing and displaying the available on hand number with the available on order number to form a total available number for the selection of attribute characteristics permutations of the product.

24. A computerized device comprising:
a communications interface;
a controller; and
an interconnection mechanism coupling the communications interface and the controller,
wherein the controller is configured to:
receive a product type selection associated with a product;
define a configurable transactable consolidation entry associated with the product type selection, the configurable transactable consolidation entry having (i) a collection of associated attributes; sequenced attribute families, each attribute family having specifically included, referenced, cost defined, and selectable attribute values, representing multiple attribute characteristics permutations of the product, (ii) a single consolidation entry reference referring to the configurable transactable consolidation entry, (iii) core defining and descriptive data elements of the product; and
store the configurable transactable consolidation entry in a memory location.

25. A computer program product having a computer-readable medium including computer program logic stored thereon that, when performed on a computerized device, causes the computerized device to:
receive a product type selection associated with a product;
define a configurable transactable consolidation entry associated with the product type selection, the configurable transactable consolidation entry having (i) a collection of associated attributes; sequenced attribute families, each attribute family having specifically included, referenced, cost defined, and selectable attribute values, representing multiple attribute characteristics permutations of the product, (ii) a single consolidation entry reference referring to the configurable transactable consolidation entry, (iii) core defining and descriptive data elements of the product; and
store the configurable transactable consolidation entry in a memory location.

26. A computer-implemented method for managing product data comprising:
receiving a product type selection associated with a product;
defining by a controller a configurable consolidation entry associated with the product type selection, the configurable consolidation entry having (i) a collection of associated attributes representing multiple attribute characteristics permutations of the product and (ii) a single consolidation entry reference referring to the configurable consolidation entry; and
storing the configurable consolidation entry in a memory location.

* * * * *